United States Patent
Funaya et al.

(10) Patent No.: US 10,336,838 B2
(45) Date of Patent: Jul. 2, 2019

(54) PROCESS FOR PRODUCING OLEFIN POLYMER AND OLEFIN POLYMER

(71) Applicant: MITSUI CHEMICALS, INC., Tokyo (JP)

(72) Inventors: Munehito Funaya, Ichihara (JP); Atsushi Sakuma, Hatsukaichi (JP); Ikuko Ebisawa, Chiba (JP); Shinsuke Kinoshita, Moriyama (JP); Akiko Matsumoto, Hessen (DE); Hirokazu Tanaka, Ichihara (JP); Shinya Tanaka, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 58 days.

(21) Appl. No.: 15/608,587

(22) Filed: May 30, 2017

(65) Prior Publication Data

US 2017/0327611 A1 Nov. 16, 2017

Related U.S. Application Data

(62) Division of application No. 15/195,426, filed on Jun. 28, 2016, now Pat. No. 9,896,526, which is a division (Continued)

(30) Foreign Application Priority Data

Sep. 25, 2012 (JP) ................. 2012-211234

(51) Int. Cl.
*C08F 136/08* (2006.01)
*C08F 236/08* (2006.01)
(Continued)

(52) U.S. Cl.
CPC ........ *C08F 110/14* (2013.01); *C08F 4/65927* (2013.01); *C08F 10/00* (2013.01);
(Continued)

(58) Field of Classification Search
CPC ............................ C08F 136/08; C08F 236/08
See application file for complete search history.

(56) References Cited

U.S. PATENT DOCUMENTS

| 4,960,878 A | 10/1990 | Malpass |
| 4,990,640 A | 2/1991 | Tsutsui |

(Continued)

FOREIGN PATENT DOCUMENTS

| CA | 2350563 | 5/2001 |
| CN | 1965001 | 5/2007 |

(Continued)

OTHER PUBLICATIONS

Angew. Chem. Int. Ed. Engl., vol. 24, No. 6, pp. 507-508 (1985).

(Continued)

*Primary Examiner* — Caixia Lu
(74) *Attorney, Agent, or Firm* — Rankin, Hill & Clark LLP

(57) ABSTRACT

[Problem to be solved]
There is provided a process for producing an olefin polymer that is capable of producing an olefin polymer having high heat resistance and high molecular weight with excellent catalytic activity.
[Solution to problem]
The process for producing an olefin polymer includes a step of polymerizing at least one olefin selected from ethylene and α-olefins having 4 to 30 carbon atoms in the presence of an olefin polymerization catalyst containing a transition metal compound represented by the general formula [I], the olefin polymer including constituent units derived from ethylene and α-olefins having 4 to 30 carbon atoms in a total amount between more than 50 mol % and not more than 100 mol %, (Continued)

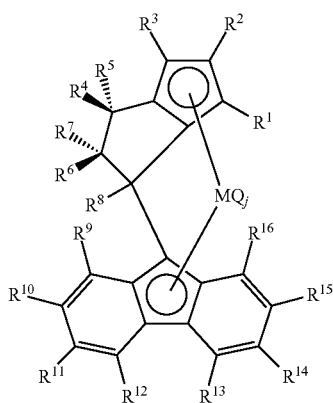

[in the formula [I], $R^1$, $R^3$ and $R^5$ to $R^{16}$ are each independently a hydrogen atom, a hydrocarbon group or the like; $R^2$ is a hydrocarbon group or the like; $R^4$ is a hydrogen atom; M is a transition metal of Group IV; Q is a halogen atom or the like; and j is an integer of 1 to 4].

1 Claim, 2 Drawing Sheets

Related U.S. Application Data of application No. 14/429,917, filed as application No. PCT/JP2013/075714 on Sep. 24, 2013, now Pat. No. 9,458,257.

(51) Int. Cl.
| | |
|---|---|
| C08F 4/6592 | (2006.01) |
| C08F 110/14 | (2006.01) |
| C08F 110/04 | (2006.01) |
| C08F 210/14 | (2006.01) |
| C08F 10/00 | (2006.01) |
| C08F 10/08 | (2006.01) |
| C08F 10/14 | (2006.01) |
| C08F 110/08 | (2006.01) |
| C08F 4/659 | (2006.01) |

(52) U.S. Cl.
CPC .............. *C08F 10/08* (2013.01); *C08F 10/14* (2013.01); *C08F 110/04* (2013.01); *C08F 110/08* (2013.01); *C08F 136/08* (2013.01); *C08F 210/14* (2013.01); *C08F 236/08* (2013.01); *C08F 4/65912* (2013.01); *C08F 4/65916* (2013.01)

(56) References Cited

U.S. PATENT DOCUMENTS

| | | | |
|---|---|---|---|
| 5,036,034 A | 7/1991 | Ewen | |
| 5,041,584 A | 8/1991 | Malpass | |
| 5,155,080 A | 10/1992 | Razavi | |
| 5,321,106 A | 6/1994 | LaPointe | |
| 5,387,568 A | 2/1995 | Ewen | |
| 5,416,228 A | 5/1995 | Elder | |
| 5,455,365 A | 10/1995 | Winter | |
| 5,519,100 A | 5/1996 | Elder | |
| 5,561,092 A | 10/1996 | Ewen | |
| 5,731,254 A | 3/1998 | Spaleck | |
| 6,063,949 A | 5/2000 | Aulbach et al. | |
| 6,316,558 B1 | 11/2001 | Kaneko | |
| 6,410,661 B1 | 6/2002 | Kaminsky | |
| 6,559,089 B1 | 5/2003 | Bellia | |
| 6,984,743 B1 | 1/2006 | Schiemenz | |
| 2003/0069320 A1 | 4/2003 | Kanamaru | |
| 2005/0228155 A1 | 10/2005 | Kawai | |
| 2006/0276607 A1 | 12/2006 | Mori | |
| 2007/0249792 A1 | 10/2007 | Kawahara | |
| 2008/0027190 A1 | 1/2008 | Tonti | |
| 2008/0038498 A1 | 2/2008 | Kadosaka | |
| 2008/0097055 A1 | 4/2008 | Marubayashi | |
| 2009/0234084 A1 | 9/2009 | Jones | |
| 2009/0317615 A1 | 12/2009 | Hashizume | |
| 2012/0049391 A1 | 3/2012 | Funaya | |
| 2012/0220728 A1 | 8/2012 | Uekusa et al. | |

FOREIGN PATENT DOCUMENTS

| | | |
|---|---|---|
| CN | 101020728 | 8/2007 |
| CN | 101501128 | 8/2009 |
| EP | 1754724 | 2/2007 |
| JP | 1502036 | 7/1989 |
| JP | 278687 | 3/1990 |
| JP | 2274703 | 11/1990 |
| JP | 3179005 | 8/1991 |
| JP | 3179006 | 8/1991 |
| JP | 3193796 | 8/1991 |
| JP | 3207703 | 9/1991 |
| JP | 3207704 | 9/1991 |
| JP | 4268304 | 9/1992 |
| JP | 6122718 | 5/1994 |
| JP | 6157661 | 6/1994 |
| JP | 2003292518 | 6/1994 |
| JP | 10226694 | 8/1998 |
| JP | 2001515911 | 9/2001 |
| JP | 2001525801 | 12/2001 |
| JP | 2001526730 | 12/2001 |
| JP | 2002529555 | 9/2002 |
| JP | 200451676 | 2/2004 |
| JP | 2009500371 | 1/2009 |
| JP | 2010150433 | 7/2010 |
| JP | 201236411 | 2/2012 |
| WO | 8805792 | 8/1988 |
| WO | 8805793 | 8/1988 |
| WO | 1501950 | 7/1989 |
| WO | 0027894 | 5/2000 |
| WO | 2001027124 | 4/2001 |
| WO | 2003082879 | 10/2003 |
| WO | 2004050724 | 6/2004 |
| WO | 2004087775 | 10/2004 |
| WO | 2004099269 | 11/2004 |
| WO | 2005066191 | 7/2005 |
| WO | 2005121192 | 12/2005 |
| WO | 2006/008212 | 1/2006 |
| WO | 2006025540 | 3/2006 |
| WO | 2006068308 | 6/2006 |
| WO | 2007131010 | 11/2007 |
| WO | 2009072505 | 6/2009 |

OTHER PUBLICATIONS

J. Am. Chem. Soc., vol. 110, No. 18, pp. 6255-6256 (1988).
Organometallics, vol. 21, No. 5, pp. 934-945 (2002).
Kaminsky et al., Metalorganic Catalysts for Synthesis and Polymerization, Springer-Verlag: Berlin, 1999, pp. 170-179.
Chem. Rev. vol. 100, No. 4, (2000), pp. 1253-1345.
Macromolecules., vol. 29, No. 8, (1996), pp. 2729-2737.
J. Org. Chem., vol. 54, No. 21, 1989, pp. 4981-4982.
Angew. Chem. internal. Edit., vol. 9, No. 11, 1970, pp. 892-893.
J. Am. Chem. SOC., vol. 107, No. 18, 1985, 107, pp. 5308-5309.
J. Org. Chem., vol. 55, No. 15, 1990, pp. 4504-4506.
K. Matsuzaki, T. Uryu, T. Asakura., NMR Spectroscopy and Stereoregularity of Polymers, Japan Scientific Societies Press, 1996, pp. 25-40.
International Search Report dated Dec. 10, 2013 filed in PCT/JP2013/075714.
Chinese Office Action dated Dec. 23, 2015 issued in Chinese patent application No. 201380049380.1.

(56) References Cited

OTHER PUBLICATIONS

Extended European Search Report dated May 11, 2016 issued in European patent application No. 13841245.7.

Claudio De Rosa et al: "Crystallization Properties and Polymorphic Behavior of Isotactic Poly(1-Butene) from Metallocene Catalysts: The Crystallization of Form I from the Melt", Macromolecules, vol. 42, No. 21, Nov. 10, 2009 (Nov. 10, 2009), pp. 8286-8297; Cited in EESR.

Kazuo Soga et al: "Extremely Highly Isospecific Polymerization of Olefins Using Solvay-Type TICL3 and CP2TIME2 As Catalyst", Dec. 1, 1988 (Dec. 1, 1988), Makromolekulare Chemie, Macromolecular Chemistry and Physics, Wiley-V C H Verlag GMBH & Co. KGAA, pp. 2839-2846; Cited in EESR.

[FIG. 1A]
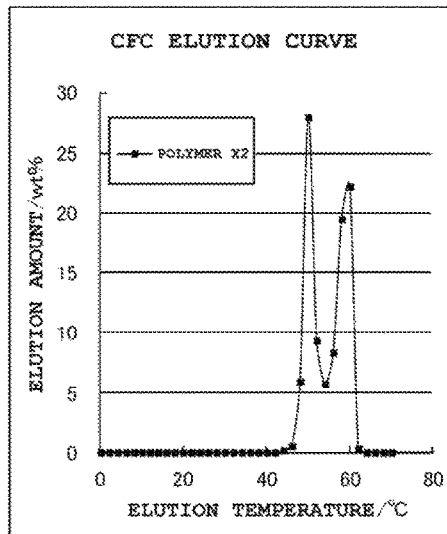
[FIG. 1B]
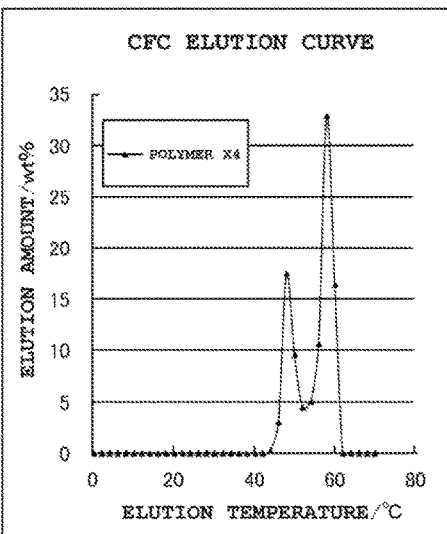
[FIG. 2]
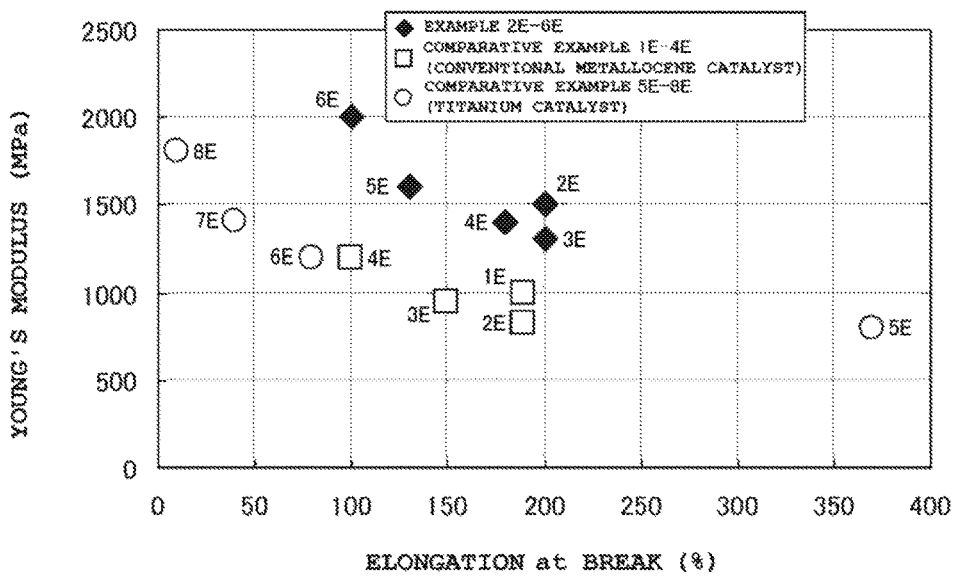

[FIG. 3]
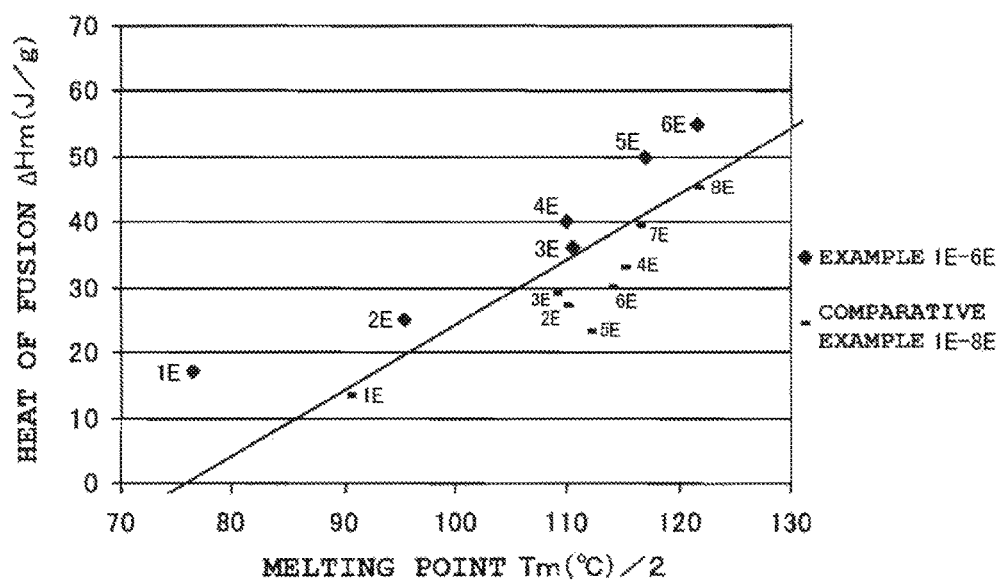

US 10,336,838 B2

PROCESS FOR PRODUCING OLEFIN POLYMER AND OLEFIN POLYMER

TECHNICAL FIELD

The present invention relates to processes for producing an olefin polymer using an olefin polymerization catalyst including a specific transition metal compound, to olefin polymers obtained by the processes, and to novel 1-butene polymers and 4-methyl-1-pentene polymers.

BACKGROUND ART

[Metallocene Compounds]

In recent years, metallocene compounds are well known as homogeneous catalysts for olefin polymerization. After the report of isotactic polymerization by W. Kaminsky et al. (see Non Patent Literature 1), many studies have been made on olefin polymerization, in particular, stereoregular α-olefin polymerization using metallocene compounds.

In α-olefin polymerization using metallocene compounds, it is known that the stereoregularity and the molecular weights of the obtainable α-olefin polymers are greatly varied by the introduction of substituents into the cyclopentadienyl ring ligands of the metallocene compounds or by the bridging of the two cyclopentadienyl rings.

[Bridged Metallocene Compounds]

For example, there are the following reports as to propylene polymerization catalyzed by metallocene compounds which have a ligand in which a cyclopentadienyl ring and a fluorenyl ring is bridged to each other.

From the viewpoint of stereoregularity, dimethylmethylene (cyclopentadienyl) (fluorenyl)zirconium dichloride affords syndiotactic polypropylene (see Non Patent Literature 2);

dimethylmethylene(3-methylcyclopentadienyl) (fluorenyl) zirconium dichloride having a methyl group at the 3-position of the cyclopentadienyl ring affords hemiisotactic polypropylene (see Patent Literature 1); and dimethylmethylene(3-tert-butylcyclopentadienyl) (fluorenyl) zirconium dichloride having a tert-butyl group at the 3-position of the cyclopentadienyl ring affords isotactic polypropylene (see Patent Literature 2).

Dimethylmethylene(3-tert-butyl-5-methylcyclopentadienyl) (3,6-di-tert-butylfluorenyl)zirconium dichloride having tert-butyl groups at the 3- and 6-positions of the fluorenyl ring affords polypropylene with higher isotactic stereoregularity than obtained with dimethylmethylene(3-tert-butyl-5-methylcyclopentadienyl) (fluorenyl)zirconium dichloride (see Patent Literature 3).

From the viewpoint of molecular weights, diphenylmethylene (cyclopentadienyl) (fluorenyl)zirconium dichloride having a cyclopentadienyl ring and a fluorenyl ring bridged via diphenylmethylene affords syndiotactic polypropylene having a higher molecular weight than obtained with dimethylmethylene (cyclopentadienyl) (fluorenyl)zirconium dichloride (see Patent Literature 4);

diphenylmethylene (3-(2-adamantyl)-cyclopentadienyl) (fluorenyl) zirconium dichloride having a diphenylmethylene bridge affords isotactic-hemiisotactic polypropylene having a higher molecular weight than obtained with dimethylmethylene (3-(2-adamantyl)-cyclopentadienyl) (fluorenyl) zirconium dichloride (see Non Patent Literature 3); and dimethylmethylene(3-tert-butyl-5-methylcyclopentadienyl) (fluorenyl)zirconium dichloride having a methyl group at the 5-position of the cyclopentadienyl ring (the α-position relative to the bridge) affords isotactic polypropylene having a higher molecular weight than obtained with dimethylmethylene(3-tert-butylcyclopentadienyl) (fluorenyl) zirconium dichloride (see Patent Literature 5).

Further, dimethylmethylene(3-tert-butyl-2-methylcyclopentadienyl) (fluorenyl)zirconium dichloride and diphenylmethylene (3,4-dimethylcyclopentadienyl) (fluorenyl) zirconium dichloride having substituents at two adjacent positions on the cyclopentadienyl ring afford polypropylene having a lower molecular weight than obtained with dimethylmethylene(3-tert-butyl-5-methylcyclopentadienyl) (fluorenyl)zirconium dichloride and diphenylmethylene(3-methylcyclopentadienyl) (fluorenyl) zirconium dichloride, respectively (see Patent Literatures 5 and 6).

[5-Membered Ring-Bridged Metallocene Compounds]

A study reports the polymerization of propylene catalyzed by a metallocene compound in which a cyclopentadienyl ring and a fluorenyl ring are bridged via a 5-membered ring. However, such metallocene compounds have low usefulness in industry because of the fact that the stereoregularity of the obtainable polypropylenes is very low (see Non Patent Literature 4).

A recent study reports a metallocene compound having a cyclopentadienyl ring and a fluorenyl ring bridged via a 5-membered ring which can afford polypropylene having relatively high stereoregularity (see Patent Literature 7).

These metallocene compounds mentioned above exhibit excellent polymerization performance. In some applications, however, the catalysts are often required to afford polymers having still higher stereoregularity or still higher molecular weight with higher economic efficiency, namely, with high catalytic activity even under high-temperature polymerization conditions. Improvements are thus required.

[Metallocene Compounds Having Substituted Indenyl Ligands]

According to reports, metallocene compounds having substituted indenyl ligands afford relatively high stereoregularity or molecular weight (see Patent Literatures 8 and 9). However, such compounds are unsatisfactory in terms of performance under economically efficient polymerization conditions.

Because metallocene compounds are soluble in reaction media, they are generally used to catalyze polymerization in the form of supported catalyst systems in slurry polymerization or gas phase polymerization. Specifically, the metallocene compounds are supported on solid carriers. However, it is known that the polymerization performances such as stereoregularity control of the aforementioned compounds are markedly decreased when they are used in the supported form on carriers as compared to in the absence of carriers.

[Metallocene Compounds Having Substituted Azulenyl Groups]

To solve such problems, for example, a recent study reports a metallocene compound having a substituted azulenyl group as a ligand (see Patent Literature 10). However, even such catalysts do not achieve sufficient performances such as stereoregularity control when the polymerization temperature is elevated to obtain economic efficiency or when the compounds are supported on solid carriers.

Under these circumstances, there have been demands for further improvements in the catalytic performances such as polymerization activity, stereoregularity control and molecular weight control of polymerization catalysts including metallocene compounds (hereinafter, also written as "metallocene catalysts").

[Reports of Polymerization Using Metallocene Catalysts]

Regarding the polymerization of monomers other than propylene with use of metallocene catalysts, for example, there are studies reporting the polymerization of 1-butene catalyzed by a metallocene compound having an indene ring as a ligand (see Patent Literatures 11 and 12).

Further, the polymerization of 1-butene catalyzed by a metallocene compound having a fluorene ring as a ligand has been reported. Specifically, the polymerization using isopropylidene(3-t-butyl-5-methylcyclopentadienyl) (fluorenyl)zirconium dichloride has been disclosed (see Patent Literature 13). According to this report, the obtainable polybutene has lower regioirregularity due to 4,1-insertions and exhibits higher heat resistance and mechanical strength as compared to when the polymerization is catalyzed by a metallocene compound having an indene ring as a ligand. In some applications, however, the catalysts are often required to afford polymers having still higher stereoregularity or still higher molecular weight under more economically efficient conditions. Improvements are thus required.

A study reports the polymerization of 4-methyl-1-pentene as a main monomer (see Patent Literature 14). Patent Literature 14 describes that metallocene-catalyzed polymers outperform conventional Ziegler-Natta-catalyzed polymers in the balance of properties such as heat resistance and are thus highly useful in industry. However, applications sometimes require that the polymers have a still higher melting point/stereoregularity or have a still higher molecular weight.

In general, increasing the polymerization temperature enhances economic efficiency but at the same time tends to decrease the molecular weight or the melting point/stereoregularity of the obtainable polymers. Thus, there have been demands for the development of novel polymerization processes capable of producing polymers having a higher molecular weight and a higher melting point/higher stereoregularity.

CITATION LIST

Patent Literature

Patent Literature 1: JP-A-H03-193796
Patent Literature 2: JP-A-H06-122718
Patent Literature 3: WO 2001/027124
Patent Literature 4: JP-A-H02-274703
Patent Literature 5: JP-A-2001-526730
Patent Literature 6: JP-A-H10-226694
Patent Literature 7: WO 2006/068308
Patent Literature 8: JP-A-H04-268304
Patent Literature 9: JP-A-H06-157661
Patent Literature 10: JP-A-2003-292518
Patent Literature 11: WO 2004/099269
Patent Literature 12: WO 2004/050724
Patent Literature 13: JP-A-2010-150433
Patent Literature 14: WO 2005/121192

Non Patent Literature

Non Patent Literature 1: Angew. Chem. Int. Ed. Engl., 24, 507 (1985)
Non Patent Literature 2: J. Am. Chem. Soc., 110, 6255 (1988)
Non Patent Literature 3: Organometallics, 21, 934 (2002)
Non Patent Literature 4: Metalorganic Catalysts for Synthesis and Polymerization, Springer-Verlag: Berlin, 1999; p. 170.

SUMMARY OF INVENTION

Technical Problem

An object of the invention is to provide olefin polymer production processes capable of producing olefin polymers having high heat resistance and high molecular weight with excellent catalytic activity, and to provide olefin polymers obtained by the processes. Another object of the invention is to provide novel 1-butene polymers having high heat resistance and high molecular weight, for example, 1-butene polymers having an excellent balance between rigidity and yield stress. A further object of the invention is to provide novel 4-methyl-1-pentene polymers, for example, crystalline 4-methyl-1-pentene polymers having an excellent balance between rigidity and toughness, and amorphous or low-crystalline 4-methyl-1-pentene polymers having an excellent balance in viscoelastic properties.

Solution to Problem

The present inventors carried out extensive studies to achieve the above objects. As a result, the present inventors have found that the objects may be achieved by using olefin polymerization catalysts which include a transition metal compound having a configuration described below, or may be achieved with 1-butene polymers and 4-methyl-1-pentene polymers having configurations described below. The present invention has been completed based on the finding.

An aspect of the present invention resides in a process for producing an olefin polymer including a step of polymerizing at least one olefin selected from ethylene and α-olefins having 4 to 30 carbon atoms, and propylene as needed, in the presence of an olefin polymerization catalyst including at least one transition metal compound (A) selected from transition metal compounds represented by the general formula [I] and enantiomers thereof, the olefin polymer including constituent units derived from the at least one selected from ethylene and α-olefins having 4 to 30 carbon atoms in a total amount between more than 50 mol % and not more than 100 mol %, and constituent units derived from propylene in an amount between 0 mol % and less than 50 mol % (wherein the content of the constituent units derived from ethylene and α-olefins having 4 to 30 carbon atoms and the content of the constituent units derived from propylene total 100 mol %).

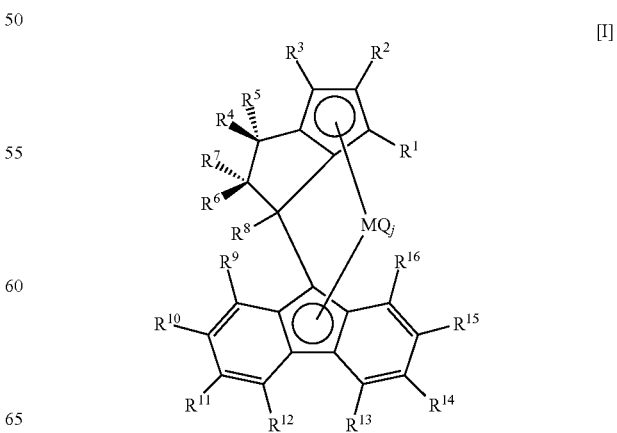

[I]

[In the formula [I], $R^1$, $R^3$, $R^5$, $R^6$, $R^7$, $R^8$, $R^9$, $R^{10}$, $R^{11}$, $R^{12}$, $R^{13}$, $R^{14}$, $R^{15}$ and $R^{16}$ are each independently a hydrogen atom, a hydrocarbon group, a hetero atom-containing hydrocarbon group, or a silicon-containing group; $R^2$ is a hydrocarbon group, a hetero atom-containing hydrocarbon group, or a silicon-containing group; $R^4$ is a hydrogen atom; any two substituents of the substituents $R^1$ to $R^{16}$ except $R^4$ may be bonded to each other to form a ring; M is a transition metal of Group IV; Q is a halogen atom, a hydrocarbon group, an anionic ligand, or a neutral ligand coordinatable with a lone electron pair; j is an integer of 1 to 4; and when j is an integer of 2 or greater, Qs may be the same or different from one another].

In the general formula [I], $R^1$ and $R^3$ are preferably hydrogen atoms; $R^2$ is preferably a hydrocarbon group having 1 to 20 carbon atoms; $R^2$ is preferably a substituent in which a carbon bonded to the cyclopentadienyl ring is a tertiary carbon; $R^5$ and $R^7$ are preferably bonded to each other to form a ring; $R^9$, $R^{12}$, $R^{13}$ and $R^{16}$ are preferably hydrogen atoms; and $R^{10}$, $R^{11}$, $R^{14}$ and $R^{15}$ are preferably hydrocarbon groups, or $R^{10}$ and $R^{11}$ are preferably bonded to each other to form a ring and $R^{14}$ and $R^{15}$ are preferably bonded to each other to form a ring.

Preferably, the olefin polymerization catalyst further includes at least one compound (B) selected from (B-1) organometallic compounds, (B-2) organoaluminum-oxy compounds, and (B-3) compounds that react with the transition metal compound (A) to form an ion pair.

Preferably, the olefin polymerization catalyst further includes a carrier (C), and the transition metal compound (A) that is supported on the carrier (C) is used.

Another aspect of the invention resides in an olefin polymer obtained by the above production process. The olefin polymer is preferably a 1-butene polymer or a 4-methyl-1-pentene polymer.

Another aspect of the invention resides in a 1-butene polymer which has a meso pentad fraction as measured by $^{13}$C-NMR of 98.0% to 99.8%.

In the 1-butene polymer, it is preferable that the accumulated elution amount at a temperature $[T_X]$ be 40% by weight or more relative to the whole elution amount as measured by cross fractionation chromatography (CFC) using o-dichlorobenzene as an eluent, provided that $[T_X]$ is defined as $([T_S]+[T_E])/2$ wherein $[T_S]$ is an elution start temperature (a temperature at which the accumulated elution weight percent reaches 0.5% by weight), and $[T_E]$ is an elution end temperature (a temperature at which the accumulated elution weight percent reaches 99% by weight).

Another aspect of the invention resides in a 4-methyl-1-pentene polymer fulfilling the following requirements (a) to (c):
(a) the amount of constituent units derived from 4-methyl-1-pentene is 100 to 80 mol %, and the amount of constituent units derived from at least one selected from olefins having 2 to 30 carbon atoms (except 4-methyl-1-pentene) is 0 to 20 mol %;
(b) the meso diad fraction (m) as measured by $^{13}$C-NMR is 98.5% to 100%; and
(c) the heat of fusion ΔHm (unit: J/g) and the melting point Tm (unit: ° C.) as measured by Differential Scanning calorimetry (DSC) fulfill the following relation (1):

$$\Delta Hm \geq 0.5 \times Tm - 76.$$  Relation (1):

Another aspect of the invention resides in a 4-methyl-1-pentene polymer fulfilling the following requirements (d) to (f):
(d) the amount of constituent units derived from 4-methyl-1-pentene is more than 50 mol % and less than 80 mol %, and the amount of constituent units derived from at least one selected from olefins having 2 to 30 carbon atoms (except 4-methyl-1-pentene) is more than 20 mol % and less than 50 mol %;
(e) the meso diad fraction (m) as measured by $^{13}$C-NMR is 98.5% to 100%; and
(f) the melting point Tm as measured by Differential Scanning calorimetry (DSC) is lower than 100° C. or is substantially absent.

Advantageous Effects of Invention

According to the present invention, there may be provided olefin polymer production processes capable of producing olefin polymers having high heat resistance and high molecular weight with excellent catalytic activity, and further may be provided olefin polymers obtained by the processes. Further, the invention can provide novel 1-butene polymers having high heat resistance and high molecular weight, for example, 1-butene polymers having an excellent balance between rigidity and yield stress. Furthermore, the invention can provide novel 4-methyl-1-pentene polymers, for example, crystalline 4-methyl-1-pentene polymers having an excellent balance between rigidity and toughness, and amorphous or low-crystalline 4-methyl-1-pentene polymers having an excellent balance in viscoelastic properties.

BRIEF DESCRIPTION OF DRAWINGS

FIG. 1A is a graph illustrating a CFC elution curve of a 1-butene polymer obtained in Example, and FIG. 1B is a graph illustrating a CFC elution curve of a 1-butene polymer obtained in Comparative Example.

FIG. 2 is a graph which plots the Young's modulus of crystalline 4-methyl-1-pentene polymers obtained in Examples and Comparative Examples versus elongation at break.

FIG. 3 is a graph which plots the heat of fusion ΔHm of crystalline 4-methyl-1-pentene polymers obtained in Examples and Comparative Examples versus melting point Tm. The straight line on the graph indicates ΔHm=0.5×Tm−76.

DESCRIPTION OF EMBODIMENTS

Hereinbelow, there will be sequentially described transition metal compounds represented by the general formula [I] and enantiomers thereof used in production processes of the invention, processes for producing such compounds, olefin polymerization catalysts including at least one of such compounds, olefin polymer production processes using the olefin polymerization catalyst, olefin polymers, and shaped articles including the olefin polymer.

In the specification, compounds represented by formula (X) (X: formula number) are also written as "compounds (X)". In the description of polymers, constituent units derived from compound A are also written as "compound A units", and the content thereof may be written as "compound A content".

[Transition Metal Compounds (A)]

The transition metal compound (A) used in the invention is at least one selected from transition metal compounds represented by the general formula [I] and enantiomers thereof. Although the specification does not specifically mention the enantiomers, the transition metal compounds (A) include all the enantiomers of the transition metal compounds [I], for example, transition metal compounds represented by the general formula [I'], without departing from the spirit of the invention.

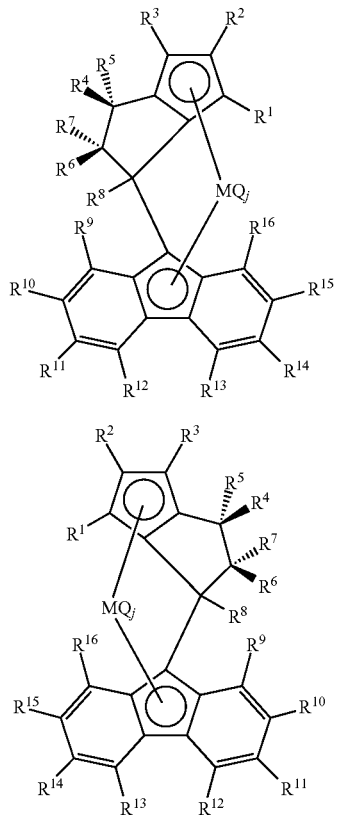

In the formula [I], $R^1$, $R^3$, $R^5$, $R^6$, $R^7$, $R^8$, $R^9$, $R^{10}$, $R^{12}$, $R^{13}$, $R^{14}$, $R^{15}$ and $R^{16}$ are each independently a hydrogen atom, a hydrocarbon group, a hetero atom-containing hydrocarbon group, or a silicon-containing group; $R^2$ is a hydrocarbon group, a hetero atom-containing hydrocarbon group, or a silicon-containing group; $R^4$ is a hydrogen atom; and any two substituents of the substituents $R^1$ to $R^{16}$ except $R^4$ may be bonded to each other to form a ring.

In the formula [I], M is a transition metal of Group IV; Q is a halogen atom, a hydrocarbon group, an anionic ligand, or a neutral ligand coordinatable with a lone electron pair; j is an integer of 1 to 4; and when j is an integer of 2 or greater, Qs may be the same or different from one another.

In the formulae [I] and [I'], the $MQ_j$ moiety comes out of the plane of the paper, and the bridge goes back behind the plane of the paper. Specifically, the transition metal compounds (A) are such that the hydrogen atom ($R^4$) is bonded to the α-position relative to the cyclopentadiene ring (relative to the carbon atom substituted with the bridge) on the same side as the central metal.

The transition metal compounds [I] are such that $R^2$ is not a hydrogen atom and $R^4$ is a hydrogen atom. This configuration removes the difficulties encountered with the conventional metallocene compounds in producing olefin polymers which have high stereoregularity and a high melting point and further have a high molecular weight even under economically efficient polymerization conditions.

The reasons why the transition metal compounds [I] exhibit excellent performance will be explained based on an estimated polymerization mechanism below. As an example, the influence on the molecular weights of polymers will be discussed.

Polymerization reaction produces a polymer having a high molecular weight when the insertion of a monomer between a central metal of a catalyst and a polymer chain, namely, the growth reaction takes place at a much higher rate than chain transfer reaction which stops the growth of the polymer chain. Two main chain transfer reactions that are known in metallocene-catalyzed olefin polymerization reaction are β-hydrogen transfer in which a hydrogen atom transfers to a central metal M of a catalyst, and β-hydrogen transfer in which a hydrogen atom transfers to a monomer, and the latter β-hydrogen transfer is said to be the main dominant transfer (see, for example, Chem. Rev. (2000), 100, 1253).

Transition states of these transfers are schematically illustrated in the formulae (i) to (iii). Ligands of the catalyst are omitted. In the formulae (i) to (iii), M' represents the active central metal of the catalyst, and P indicates the polymer chain.

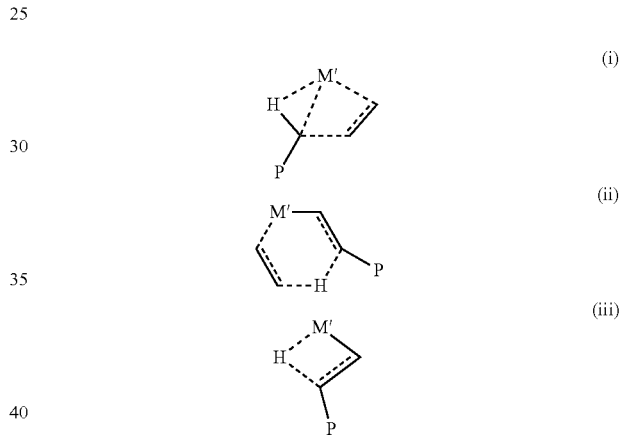

The structure in the transition state in the β-hydrogen transfer to the monomer is an M'-centered, six-membered ring structure (formula (ii)). In the monomer insertion reaction, a five-membered ring structure is formed as a result of the coordination of the α-hydrogen to M' (formula (i)). The narrowing of the space near M' by the ligands of the catalyst renders the six-membered ring structure in the transition state requiring a larger space less stable than the five-membered ring structure in the transition state. That is, the reaction rate of the β-hydrogen transfer to the monomer is decreased, and the reaction rate of the insertion of the monomer is relatively increased. As a result, the molecular weight of the resultant polymer is increased (see Macromolecules (1996), 29, 2729).

On the other hand, the structure in the transition state in the β-hydrogen transfer to the central metal M is a four-membered ring structure (formula (iii)) occupying a smaller space than the structure in the transition state in the monomer insertion reaction. As a result, excessive narrowing of the space near M' by the ligands will cause a relative increase in the reaction rate of the β-hydrogen transfer to the central metal M, and consequently the molecular weight of the resultant polymer is expected to be low.

The above reaction mechanism is applied to the transition metal compound [I]. The transition metal compound [I] has a five-membered ring structure as the bridge between the cyclopentadiene ring and the fluorene ring. If the skeleton is such that $R^2$ is not a hydrogen atom and $R^4$ is a substituent larger than a hydrogen atom, namely, a substituent other than a hydrogen atom, the space near the central metal M is narrowed. Although such a structure may suppress the β-hydrogen transfer to the monomer which proceeds via the transition state with the six-membered ring structure, it is probable that the reaction rate of the monomer insertion reaction via the transition state with the five-membered ring structure will be decreased at the same time. As a result, the β-hydrogen transfer to the central metal M via the transition state with the four-membered ring structure is promoted, and the polymer is not grown to a sufficiently high molecular weight.

In contrast, a skeleton in which $R^2$ is not a hydrogen atom and $R^4$ is a hydrogen atom is considered to be able to suppress the β-hydrogen transfer to the monomer alone without inhibiting the monomer insertion reaction, and consequently the polymer may be grown to a higher molecular weight.

The mechanism described above is probably the reason why the catalyst exhibits excellent performance only when the bridge between the cyclopentadiene ring and the fluorene ring includes a five-membered ring structure and $R^2$ is not a hydrogen atom while $R^4$ is a hydrogen atom.

⟨ $R^4$ to $R^{46}$ ⟩

Examples of the hydrocarbon groups represented by any of $R^1$ to $R^{16}$ (except $R^4$) include linear hydrocarbon groups, branched hydrocarbon groups, cyclic saturated hydrocarbon groups, cyclic unsaturated hydrocarbon groups, and groups resulting from the substitution of one, or two or more hydrogen atoms in saturated hydrocarbon groups with cyclic unsaturated hydrocarbon groups. The number of carbon atoms in the hydrocarbon groups is usually 1 to 20, preferably 1 to 15, and more preferably 1 to 10.

Examples of the linear hydrocarbon groups include linear alkyl groups such as methyl group, ethyl group, n-propyl group, n-butyl group, n-pentyl group, n-hexyl group, n-heptyl group, n-octyl group, n-nonyl group and n-decanyl group; and linear alkenyl groups such as allyl group.

Examples of the branched hydrocarbon groups include branched alkyl groups such as isopropyl group, tert-butyl group, tert-amyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group and 1-methyl-1-isopropyl-2-methylpropyl group.

Examples of the cyclic saturated hydrocarbon groups include cycloalkyl groups such as cyclopentyl group, cyclohexyl group, cycloheptyl group, cyclooctyl group and methylcyclohexyl group; and polycyclic groups such as norbornyl group, adamantyl group and methyladamantyl group.

Examples of the cyclic unsaturated hydrocarbon groups include aryl groups such as phenyl group, tolyl group, naphthyl group, biphenyl group, phenanthryl group and anthracenyl group; cycloalkenyl groups such as cyclohexenyl group; and polycyclic unsaturated alicyclic groups such as 5-bicyclo[2.2.1]hept-2-enyl group.

Examples of the groups resulting from the substitution of one, or two or more hydrogen atoms in saturated hydrocarbon groups with cyclic unsaturated hydrocarbon groups include groups resulting from the substitution of one, or two or more hydrogen atoms in alkyl groups with aryl groups, such as benzyl group, cumyl group, 1,1-diphenylethyl group and triphenylmethyl group.

Examples of the hetero atom-containing hydrocarbon groups represented by any of $R^2$ to $R^{16}$ (except $R^4$) include oxygen atom-containing hydrocarbon groups, for example, alkoxy groups such as methoxy group and ethoxy group, aryloxy groups such as phenoxy group, and furyl group; nitrogen atom-containing hydrocarbon groups, for example, amino groups such as N-methylamino group, N,N-dimethylamino group and N-phenylamino group, and pyrryl group; and sulfur atom-containing hydrocarbon groups, for example, thienyl group. The number of carbon atoms in the hetero atom-containing hydrocarbon groups is usually 1 to 20, preferably 2 to 18, and more preferably 2 to 15. Silicon-containing groups are excluded from the hetero atom-containing hydrocarbon groups.

Examples of the silicon-containing groups represented by any of $R^2$ to $R^{16}$ (except $R^4$) include groups represented by —SiR$_3$ (wherein Rs are each independently an alkyl group having 1 to 15 carbon atoms or a phenyl group), such as trimethylsilyl group, triethylsilyl group, dimethylphenylsilyl group, diphenylmethylsilyl group and triphenylsilyl group.

Of the substituents $R^2$ to $R^{16}$ except $R^4$, any two adjacent substituents (for example: $R^1$ and $R^2$, $R^2$ and $R^3$, $R^5$ and $R^7$, $R^6$ and $R^8$, $R^7$ and $R^8$, $R^9$ and $R^{10}$, $R^{10}$ and $R^{11}$, $R^{11}$ and $R^{12}$, $R^{13}$ and $R^{14}$, $R^{14}$ and $R^{15}$, and $R^{15}$ and $R^{16}$) may be bonded to each other to form a ring. $R^6$ and $R^7$ may be bonded to each other to form a ring, $R^1$ and $R^8$ may be bonded to each other to form a ring, and $R^3$ and $R^5$ may be bonded to each other to form a ring. Two or more such rings may be present in the molecule.

In the specification, examples of the rings formed by the bonding of two substituents (the additional rings) include alicyclic rings, aromatic rings and hetero rings. Specific examples include a cyclohexane ring; a benzene ring; a hydrogenated benzene ring; a cyclopentene ring; and hetero rings such as a furan ring and a thiophene ring, and corresponding hydrogenated hetero rings. A cyclohexane ring; and a benzene ring and a hydrogenated benzene ring are preferable. Such a ring structure may further have a substituent such as an alkyl group on the ring.

From the viewpoint of stereoregularity control, $R^1$ and $R^3$ are preferably hydrogen atoms.

At least one selected from $R^5$, $R^6$ and $R^7$ is preferably a hydrocarbon group, a hetero atom-containing hydrocarbon group or a silicon-containing group. It is more preferable that $R^5$ be a hydrocarbon group. $R^5$ is more preferably an alkyl group having 2 or more carbon atoms such as a linear alkyl group or a branched alkyl group, or a cycloalkyl group or a cycloalkenyl group. Particularly preferably, $R^5$ is an alkyl group having 2 or more carbon atoms. From the viewpoint of synthesis, it is also preferable that $R^6$ and $R^7$ be hydrogen atoms. More preferably, $R^5$ and $R^7$ are bonded to each other to form a ring, and the ring is particularly preferably a six-membered ring such as a cyclohexane ring.

$R^8$ is preferably a hydrocarbon group, and is particularly preferably an alkyl group.

From the viewpoint of stereoregularity control, $R^2$ is preferably a hydrocarbon group, more preferably a hydrocarbon group having 1 to 20 carbon atoms, still more preferably a hydrocarbon group other than aryl groups, further preferably a linear hydrocarbon group, a branched hydrocarbon group or a cyclic saturated hydrocarbon group, and particularly preferably a substituent in which the free valence carbon (the carbon bonded to the cyclopentadienyl ring) is tertiary carbon.

Specific examples of $R^2$ include methyl group, ethyl group, isopropyl group, tert-butyl group, tert-pentyl group, tert-amyl group, 1-methylcyclohexyl group and 1-adamantyl group. More preferred substituents are those in which the free valence carbon is tertiary carbon, such as tert-butyl group, tert-pentyl group, 1-methylcyclohexyl group and 1-adamantyl group. Particularly preferred substituents are tert-butyl group and 1-adamantyl group.

In the general formula [I], the fluorene ring moiety is not particularly limited as long as the structure is formed of a known fluorene derivative. From the viewpoint of the controlling of stereoregularity and molecular weight, however, it is preferable that $R^9$, $R^{12}$, $R^{13}$ and $R^{16}$ be hydrogen atoms.

$R^{10}$, $R^{11}$, $R^{14}$ and $R^{15}$ are preferably hydrogen atoms, hydrocarbon groups, oxygen atom-containing hydrocarbon groups or nitrogen atom-containing hydrocarbon groups, more preferably hydrocarbon groups, and still more preferably hydrocarbon groups having 1 to 20 carbon atoms.

$R^{10}$ and $R^{11}$ may be bonded to each other to form a ring, and $R^{14}$ and $R^{15}$ may be bonded to each other to form a ring. Examples of such substituted fluorenyl groups include benzofluorenyl group, dibenzofluorenyl group, octahydrodibenzofluorenyl group, 1,1,4,4,7,7,10,10-octamethyl-2,3,4,7,8,9,10,12-octahydro-1H-dibenzo[b, h]fluorenyl group, 1,1,3,3,6,6,8,8-octamethyl-2,3,6,7,8,10-hexahydro-1H-dicyclopenta[b,h]fluorenyl group and 1',1',3',6',8',8'-hexamethyl-1'H,8'H-dicyclopenta[b, h]fluorenyl group, with 1,1,4,4,7,7,10,10-octamethyl-2,3,4,7,8,9,10,12-octahydro-1H-dibenzo[b,h]fluorenyl group being particularly preferable.

⟨ M, Q and j ⟩

M is a Group IV transition metal, preferably Ti, Zr or Hf, more preferably Zr or Hf, and particularly preferably Zr.

Examples of the halogen atoms which may be represented by Q include fluorine, chlorine, bromine and iodine.

Examples of the hydrocarbon groups which may be represented by Q include groups similar to the hydrocarbon groups represented by any of $R^1$ to $R^{16}$ (except $R^4$), with alkyl groups such as linear alkyl groups and branched alkyl groups being preferable.

Examples of the anionic ligands which may be represented by Q include alkoxy groups such as methoxy and tert-butoxy; aryloxy groups such as phenoxy; carboxylate groups such as acetate and benzoate; sulfonate groups such as mesylate and tosylate; and amide groups such as dimethylamide, diisopropylamide, methylanilide and diphenylamide.

Examples of the neutral ligands coordinatable with a lone electron pair which may be represented by Q include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane.

It is preferable that at least one Q be a halogen atom or an alkyl group.

The letter j is preferably 2.

Some preferred embodiments of the configurations of the transition metal compounds [I], namely, $R^1$ to $R^{16}$, M, Q and j are described hereinabove. In the invention, any combinations of these preferred embodiments are also preferable.

⟨ Examples of Preferred Transition Metal Compounds ⟩

In the following examples, 1,1,4,4,7,7,10,10-octamethyl-2,3,4,7,8,9,10,12-octahydro-1H-dibenzo[b,h]fluorene is written as octamethylfluorene, and 1',1',3',6',8',8'-hexamethyl-1'H,8'H-dicyclopenta[b,h]fluorene as hexamethyldicyclopentafluorene.

Preferred examples of the transition metal compound used in the present invention include:

[1-(fluorene-9'-yl) (1,2,3,4-tetrahydropentalene)]zirconium dichloride,

[1-(2',7'-di-tert-butylfluorene-9'-yl) (1,2,3,4-tetrahydropentalene)]zirconiumdichloride,

[1-(3',6'-di-tert-butylfluorene-9'-yl) (1,2,3,4-tetrahydropentalene)]zirconiumdichloride,

[1-(3',6'-di-(1-adamantyl)-fluorene-9'-yl) (1,2,3,4-tetrahydropentalene)]zirconiumdichloride,

[1-(3',6'-di-tert-butyl-2',7'-dimethylfluorene-9'-yl) (1,2,3,4-tetrahydropentalene)]zirconiumdichloride,

[1-(octamethylfluorene-12'-yl) (1,2,3,4-tetrahydropentalene)]zirconiumdichloride,

[1-(hexamethyldicyclopentafluorene-10'-yl) (1,2,3,4-tetrahydropentalene)]zirconiumdichloride,

[1-(fluorene-9'-yl) (5-tert-butyl-1-methyl-1,2,3,4-tetrahydropentalene)]zirconiumdichloride,

[1-(2',7'-di-tert-butylfluorene-9'-yl) (5-tert-butyl-1-methyl-1,2,3,4-tetrahydropentalene)]zirconiumdichloride,

[1-(3',6'-di-tert-butylfluorene-9'-yl) (5-tert-butyl-1-methyl-1,2,3,4-tetrahydropentalene)]zirconiumdichloride,

[1-(3',6'-di-(1-adamantyl)-fluorene-9'-yl) (5-tert-butyl-1-methyl-1,2,3,4-tetrahydropentalene)]zirconiumdichloride,

[1-(3',6'-di-tert-butyl-2',7'-dimethylfluorene-9'-yl) (5-tert-butyl-1-methyl-1,2,3,4-tetrahydropentalene)]zirconiumdichloride,

[1-(octamethylfluorene-12'-yl) (5-tert-butyl-1-methyl-1,2,3,4-tetrahydropentalene)]zirconiumdichloride,

[1-(hexamethyldicyclopentafluorene-10'-yl) (5-tert-butyl-1-methyl-1,2,3,4-tetrahydropentalene)]zirconiumdichloride,

[1-(fluorene-9'-yl) (5-tert-butyl-1-phenyl-1,2,3,4-tetrahydropentalene)]zirconiumdichloride,

[1-(2',7'-di-tert-butylfluorene-9'-yl) (5-tert-butyl-1-phenyl-1,2,3,4-tetrahydropentalene)]zirconiumdichloride,

[1-(3',6'-di-tert-butylfluorene-9'-yl) (5-tert-butyl-1-phenyl-1,2,3,4-tetrahydropentalene)]zirconiumdichloride,

[1-(3',6'-di-(1-adamantyl)-fluorene-9'-yl) (5-tert-butyl-1-phenyl-1,2,3,4-tetrahydropentalene)]zirconiumdichloride,

[1-(3',6'-di-tert-butyl-2',7'-dimethylfluorene-9'-yl) (5-tert-butyl-1-phenyl-1,2,3,4-tetrahydropentalene)]zirconiumdichloride,

[1-(octamethylfluorene-12'-yl) (5-tert-butyl-1-phenyl-1,2,3,4-tetrahydropentalene)]zirconiumdichloride,

[1-(hexamethyldicyclopentafluorene-10'-yl) (5-tert-butyl-1-phenyl-1,2,3,4-tetrahydropentalene)]zirconiumdichloride,

[1-(fluorene-9'-yl) (5-adamantane-1-yl-1-methyl-1,2,3,4-tetrahydropentalene)]zirconiumdichloride,

[1-(2',7'-di-tert-butylfluorene-9'-yl) (5-adamantane-1-yl-1-methyl-1,2,3,4-tetrahydropentalene)]zirconiumdichloride,

[1-(3',6'-di-tert-butylfluorene-9'-yl) (5-adamantane-1-yl-1-methyl-1,2,3,4-tetrahydropentalene)]zirconiumdichloride,

[1-(3',6'-di-(1-adamantyl)-fluorene-9'-yl) (5-adamantane-1-yl-1-methyl-1,2,3,4-tetrahydropentalene)]zirconiumdichloride,

[1-(3',6'-di-tert-butyl-2',7'-dimethylfluorene-9'-yl) (5-adamantane-1-yl-1-methyl-1,2,3,4-tetrahydropentalene)]zirconiumdichloride,

[1-(octamethylfluorene-12'-yl) (5-adamantane-1-yl-1-methyl-1,2,3,4-tetrahydropentalene)]zirconiumdichloride,

[1-(hexamethyldicyclopentafluorene-10'-yl) (5-adamantane-1-yl-1-methyl-1,2,3,4-tetrahydropentalene)]zirconiumdichloride,
[1-(fluorene-9'-yl) (5-(1-methylcylohexyl)-1-methyl-1,2,3,4-tetrahydropentalene)]zirconiumdichloride,
[1-(2',7'-di-tert-butylfluorene-9'-yl) (5-(1-methylcylohexyl)-1-methyl-1,2,3,4-tetrahydropentalene)]zirconiumdichloride,
[1-(3',6'-di-tert-butylfluorene-9'-yl) (5-(1-methylcylohexyl)-1-methyl-1,2,3,4-tetrahydropentalene)]zirconiumdichloride,
[1-(3',6'-di-(1-adamantyl)-fluorene-9'-yl) (5-(1-methylcylohexyl)-1-methyl-1,2,3,4-tetrahydropentalene)]zirconiumdichloride,
[1-(3',6'-di-tert-butyl-2',7'-dimethylfluorene-9'-yl) (5-(1-methylcylohexyl)-1-methyl-1,2,3,4-tetrahydropentalene)]zirconiumdichloride,
[1-(octamethylfluorene-12'-yl) (5-(1-methylcylohexyl)-1-methyl-1,2,3,4-tetrahydropentalene)]zirconiumdichloride,
[1-(hexamethyldicyclopentafluorene-10'-yl) (5-(1-methylcylohexyl)-1-methyl-1,2,3,4-tetrahydropentalene)]zirconiumdichloride,
[1-(fluorene-9'-yl) (5-tert-butyl-1-ethyl-1,2,3,4-tetrahydropentalene)]zirconiumdichloride,
[1-(2',7'-di-tert-butylfluorene-9'-yl) (5-tert-butyl-1-ethyl-1,2,3,4-tetrahydropentalene)]zirconiumdichloride,
[1-(3',6'-di-tert-butylfluorene-9'-yl) (5-tert-butyl-1-ethyl-1,2,3,4-tetrahydropentalene)]zirconiumdichloride,
[1-(3',6'-di-(1-adamantyl)-fluorene-9'-yl) (5-tert-butyl-1-ethyl-1,2,3,4-tetrahydropentalene)]zirconiumdichloride,
[1-(3',6'-di-tert-butyl-2',7'-dimethylfluorene-9'-yl) (5-tert-butyl-1-ethyl-1,2,3,4-tetrahydropentalene)]zirconiumdichloride,
[1-(octamethylfluorene-12'-yl) (5-tert-butyl-1-ethyl-1,2,3,4-tetrahydropentalene)]zirconiumdichloride,
[1-(hexamethyldicyclopentafluorene-10'-yl) (5-tert-butyl-1-ethyl-1,2,3,4-tetrahydropentalene)]zirconiumdichloride,
[1-(fluorene-9'-yl) (5-tert-butyl-1-iso-propyl-1,2,3,4-tetrahydropentalene)]zirconiumdichloride,
[1-(2',7'-di-tert-butylfluorene-9'-yl) (5-tert-butyl-1-iso-propyl-1,2,3,4-tetrahydropentalene)]zirconiumdichloride,
[1-(3',6'-di-tert-butylfluorene-9'-yl) (5-tert-butyl-1-iso-propyl-1,2,3,4-tetrahydropentalene)]zirconiumdichloride,
[1-(3',6'-di-(1-adamantyl)-fluorene-9'-yl) (5-tert-butyl-1-iso-propyl-1,2,3,4-tetrahydropentalene)]zirconiumdichloride,
[1-(3',6'-di-tert-butyl-2',7'-dimethylfluorene-9'-yl) (5-tert-butyl-1-iso-propyl-1,2,3,4-tetrahydropentalene)]zirconiumdichloride,
[1-(octamethylfluorene-12'-yl) (5-tert-butyl-1-iso-propyl-1,2,3,4-tetrahydropentalene)]zirconiumdichloride,
[1-(hexamethyldicyclopentafluorene-10'-yl) (5-tert-butyl-1-iso-propyl-1,2,3,4-tetrahydropentalene)]zirconiumdichloride,
[1-(fluorene-9'-yl) (5-adamantane-1-yl-1-iso-propyl-1,2,3,4-tetrahydropentalene)]zirconiumdichloride,
[1-(2',7'-di-tert-butylfluorene-9'-yl) (5-adamantane-1-yl-1-iso-propyl-1,2,3,4-tetrahydropentalene)]zirconiumdichloride,
[1-(3',6'-di-tert-butylfluorene-9'-yl) (5-adamantane-1-yl-1-iso-propyl-1,2,3,4-tetrahydropentalene)]zirconiumdichloride,
[1-(3',6'-di-(1-adamantyl)-fluorene-9'-yl) (5-adamantane-1-yl-1-iso-propyl-1,2,3,4-tetrahydropentalene)]zirconiumdichloride,
[1-(3',6'-di-tert-butyl-2',7'-dimethylfluorene-9'-yl) (5-adamantane-1-yl-1-iso-propyl-1,2,3,4-tetrahydropentalene)]zirconiumdichloride,
[1-(octamethylfluorene-12'-yl) (5-adamantane-1-yl-1-iso-propyl-1,2,3,4-tetrahydropentalene)]zirconiumdichloride,
[1-(hexamethyldicyclopentafluorene-10'-yl) (5-adamantane-1-yl-1-iso-propyl-1,2,3,4-tetrahydropentalene)]zirconiumdichloride,
[1-(fluorene-9'-yl) (1,5-di-tert-butyl-1,2,3,4-tetrahydropentalene)]zirconiumdichloride,
[1-(2',7'-di-tert-butylfluorene-9'-yl) (1,5-di-tert-butyl-1,2,3,4-tetrahydropentalene)]zirconiumdichloride,
[1-(3',6'-di-tert-butylfluorene-9'-yl) (1,5-di-tert-butyl-1,2,3,4-tetrahydropentalene)]zirconiumdichloride,
[1-(3',6'-di-(1-adamantyl)-fluorene-9'-yl) (1,5-di-tert-butyl-1,2,3,4-tetrahydropentalene)]zirconiumdichloride,
[1-(3',6'-di-tert-butyl-2',7'-dimethylfluorene-9'-yl) (1,5-di-tert-butyl-1,2,3,4-tetrahydropentalene)]zirconiumdichloride,
[1-(octamethylfluorene-12'-yl) (1,5-di-tert-butyl-1,2,3,4-tetrahydropentalene)]zirconiumdichloride,
[1-(hexamethyldicyclopentafluorene-10'-yl) (1,5-di-tert-butyl-1,2,3,4-tetrahydropentalene)]zirconiumdichloride,
[1-(fluorene-9'-yl) (5-tert-butyl-1-tert-butyl-1,2,3,4-tetrahydropentalene)]zirconiumdichloride,
[1-(2',7'-di-tert-butylfluorene-9'-yl) (5-tert-butyl-1-tert-butyl-1,2,3,4-tetrahydropentalene)]zirconiumdichloride,
[1-(3',6'-di-tert-butylfluorene-9'-yl) (5-tert-butyl-1-tert-butyl-1,2,3,4-tetrahydropentalene)]zirconiumdichloride,
[1-(3',6'-di-(1-adamantyl)-fluorene-9'-yl) (5-tert-butyl-1-tert-butyl-1,2,3,4-tetrahydropentalene)]zirconiumdichloride,
[1-(3',6'-di-tert-butyl-2',7'-dimethylfluorene-9'-yl) (5-tert-butyl-1-tert-butyl-1,2,3,4-tetrahydropentalene)]zirconiumdichloride,
[1-(octamethylfluorene-12'-yl) (5-tert-butyl-1-tert-butyl-1,2,3,4-tetrahydropentalene)]zirconiumdichloride,
[1-(hexamethyldicyclopentafluorene-10'-yl) (5-tert-butyl-1-tert-butyl-1,2,3,4-tetrahydropentalene)]zirconiumdichloride,
[1-(fluorene-9'-yl) (5-tert-butyl-1,3-dimethyl-1,2,3,4-tetrahydropentalene)]zirconiumdichloride,
[1-(2',7'-di-tert-butylfluorene-9'-yl) (5-tert-butyl-1,3-dimethyl-1,2,3,4-tetrahydropentalene)]zirconiumdichloride,
[1-(3',6'-di-tert-butylfluorene-9'-yl) (5-tert-butyl-1,3-dimethyl-1,2,3,4-tetrahydropentalene)]zirconiumdichloride,
[1-(3',6'-di-(1-adamantyl)-fluorene-9'-yl) (5-tert-butyl-1,3-dimethyl-1,2,3,4-tetrahydropentalene)]zirconiumdichloride,
[1-(3',6'-di-tert-butyl-2',7'-dimethylfluorene-9'-yl) (5-tert-butyl-1,3-dimethyl-1,2,3,4-tetrahydropentalene)]zirconiumdichloride,
[1-(octamethylfluorene-12'-yl) (5-tert-butyl-1,3-dimethyl-1,2,3,4-tetrahydropentalene)]zirconiumdichloride,
[1-(hexamethyldicyclopentafluorene-10'-yl) (5-tert-butyl-1,3-dimethyl-1,2,3,4-tetrahydropentalene)]zirconiumdichloride,
[1-(fluorene-9'-yl) (5-tert-butyl-1-iso-propyl-3-methyl-1,2,3,4-tetrahydropentalene)]zirconiumdichloride,
[1-(2',7'-di-tert-butylfluorene-9'-yl) (5-tert-butyl-1-iso-propyl-3-methyl-1,2,3,4-tetrahydropentalene)]zirconiumdichloride,
[1-(3',6'-di-tert-butylfluorene-9'-yl) (5-tert-butyl-1-iso-propyl-3-methyl-1,2,3,4-tetrahydropentalene)]zirconiumdichloride,

[1-(3',6'-di-(1-adamantyl)-fluorene-9'-yl) (5-tert-butyl-1-iso-propyl-3-methyl-1,2,3,4-tetrahydropentalene)]zirconiumdichloride,

[1-(3',6'-di-tert-butyl-2',7'-dimethylfluorene-9'-yl) (5-tert-butyl-1-iso-propyl-3-methyl-1,2,3,4-tetrahydropentalene)]zirconiumdichloride,

[1-(octamethylfluorene-12'-yl) (5-tert-butyl-1-iso-propyl-3-methyl-1,2,3,4-tetrahydropentalene)]zirconiumdichloride,

[1-(hexamethyldicyclopentafluorene-10'-yl) (5-tert-butyl-1-iso-propyl-3-methyl-1,2,3,4-tetrahydropentalene)]zirconiumdichloride,

[1-(fluorene-9'-yl) (1,5-di-tert-butyl-3-methyl-1,2,3,4-tetrahydropentalene)]zirconiumdichloride,

[1-(2',7'-di-tert-butylfluorene-9'-yl) (1,5-di-tert-butyl-3-methyl-1,2,3,4-tetrahydropentalene)]zirconiumdichloride,

[1-(3',6'-di-tert-butylfluorene-9'-yl) (1,5-di-tert-butyl-3-methyl-1,2,3,4-tetrahydropentalene)]zirconiumdichloride,

[1-(3',6'-di-(1-adamantyl)-fluorene-9'-yl) (1,5-di-tert-butyl-3-methyl-1,2,3,4-tetrahydropentalene)]zirconiumdichloride,

[1-(3',6'-di-tert-butyl-2',7'-dimethylfluorene-9'-yl) (1,5-di-tert-butyl-3-methyl-1,2,3,4-tetrahydropentalene)]zirconiumdichloride,

[1-(octamethylfluorene-12'-yl) (1,5-di-tert-butyl-3-methyl-1,2,3,4-tetrahydropentalene)]zirconiumdichloride,

[1-(hexamethyldicyclopentafluorene-10'-yl) (1,5-di-tert-butyl-3-methyl-1,2,3,4-tetrahydropentalene)]zirconiumdichloride,

[1-(fluorene-9'-yl) (5-tert-butyl-1-methyl-3-iso-propyl-1,2,3,4-tetrahydropentalene)]zirconiumdichloride,

[1-(2',7'-di-tert-butylfluorene-9'-yl) (5-tert-butyl-1-methyl-3-iso-propyl-1,2,3,4-tetrahydropentalene)]zirconiumdichloride,

[1-(3',6'-di-tert-butylfluorene-9'-yl) (5-tert-butyl-1-methyl-3-iso-propyl-1,2,3,4-tetrahydropentalene)]zirconiumdichloride,

[1-(3',6'-di-(1-adamantyl)-fluorene-9'-yl) (5-tert-butyl-1-methyl-3-iso-propyl-1,2,3,4-tetrahydropentalene)]zirconiumdichloride,

[1-(3',6'-di-tert-butyl-2',7'-dimethylfluorene-9'-yl) (5-tert-butyl-1-methyl-3-iso-propyl-1,2,3,4-tetrahydropentalene)]zirconiumdichloride,

[1-(octamethylfluorene-12'-yl) (5-tert-butyl-1-methyl-3-iso-propyl-1,2,3,4-tetrahydropentalene)]zirconiumdichloride,

[1-(hexamethyldicyclopentafluorene-10'-yl) (5-tert-butyl-1-methyl-3-iso-propyl-1,2,3,4-tetrahydropentalene)]zirconiumdichloride, [1-(fluorene-9'-yl) (5-adamantane-1-yl-1,3-di-iso-propyl-1,2,3,4-tetrahydropentalene)]zirconiumdichloride,

[1-(2',7'-di-tert-butylfluorene-9'-yl) (5-adamantane-1-yl-1,3-di-iso-propyl-1,2,3,4-tetrahydropentalene)]zirconiumdichloride,

[1-(3',6'-di-tert-butylfluorene-9'-yl) (5-adamantane-1-yl-1,3-di-iso-propyl-1,2,3,4-tetrahydropentalene)]zirconiumdichloride,

[1-(3',6'-di-(1-adamantyl)-fluorene-9'-yl) (5-adamantane-1-yl-1,3-di-iso-propyl-1,2,3,4-tetrahydropentalene)]zirconiumdichloride,

[1-(3',6'-di-tert-butyl-2',7'-dimethylfluorene-9'-yl) (5-adamantane-1-yl-1,3-di-iso-propyl-1,2,3,4-tetrahydropentalene)]zirconiumdichloride, [1-(octamethylfluorene-12'-yl) (5-adamantane-1-yl-1,3-di-iso-propyl-1,2,3,4-tetrahydropentalene)]zirconiumdichloride,

[1-(hexamethyldicyclopentafluorene-10'-yl) (5-adamantane-1-yl-1,3-di-iso-propyl-1,2,3,4-tetrahydropentalene)]zirconiumdichloride,

[1-(fluorene-9'-yl) (5-tert-butyl-1-ethyl-3-iso-propyl-1,2,3,4-tetrahydropentalene)]zirconiumdichloride,

[1-(2',7'-di-tert-butylfluorene-9'-yl) (5-tert-butyl-1-ethyl-3-iso-propyl-1,2,3,4-tetrahydropentalene)]zirconiumdichloride,

[1-(3',6'-di-tert-butylfluorene-9'-yl) (5-tert-butyl-1-ethyl-3-iso-propyl-1,2,3,4-tetrahydropentalene)]zirconiumdichloride,

[1-(3',6'-di-(1-adamantyl)-fluorene-9'-yl) (5-tert-butyl-1-ethyl-3-iso-propyl-1,2,3,4-tetrahydropentalene)]zirconiumdichloride,

[1-(3',6'-di-tert-butyl-2',7'-dimethylfluorene-9'-yl) (5-tert-butyl-1-ethyl-3-iso-propyl-1,2,3,4-tetrahydropentalene)]zirconiumdichloride,

[1-(octamethylfluorene-12'-yl) (5-tert-butyl-1-ethyl-3-iso-propyl-1,2,3,4-tetrahydropentalene)]zirconiumdichloride,

[1-(hexamethyldicyclopentafluorene-10'-yl) (5-tert-butyl-1-ethyl-3-iso-propyl-1,2,3,4-tetrahydropentalene)]zirconiumdichloride, [1-(fluorene-9'-yl) (5-tert-butyl-1,3-di-iso-propyl-1,2,3,4-tetrahydropentalene)]zirconiumdichloride,

[1-(2',7'-di-tert-butylfluorene-9'-yl) (5-tert-butyl-1,3-di-iso-propyl-1,2,3,4-tetrahydropentalene)]zirconiumdichloride,

[1-(3',6'-di-tert-butylfluorene-9'-yl) (5-tert-butyl-1,3-di-iso-propyl-1,2,3,4-tetrahydropentalene)]zirconiumdichloride,

[1-(3',6'-di-(1-adamantyl)-fluorene-9'-yl) (5-tert-butyl-1,3-di-iso-propyl-1,2,3,4-tetrahydropentalene)]zirconiumdichloride,

[1-(3',6'-di-tert-butyl-2',7'-dimethylfluorene-9'-yl) (5-tert-butyl-1,3-di-iso-propyl-1,2,3,4-tetrahydropentalene)]zirconiumdichloride, [1-(octamethylfluorene-12'-yl) (5-tert-butyl-1,3-di-iso-propyl-1,2,3,4-tetrahydropentalene)]zirconiumdichloride,

[1-(hexamethyldicyclopentafluorene-10'-yl) (5-tert-butyl-1,3-di-iso-propyl-1,2,3,4-tetrahydropentalene)]zirconiumdichloride,

[1-(fluorene-9'-yl) (1,5-di-tert-butyl-3-iso-propyl-1,2,3,4-tetrahydropentalene)]zirconiumdichloride,

[1-(2',7'-di-tert-butylfluorene-9'-yl) (1,5-di-tert-butyl-3-iso-propyl-1,2,3,4-tetrahydropentalene)]zirconiumdichloride,

[1-(3',6'-di-tert-butylfluorene-9'-yl) (1,5-di-tert-butyl-3-iso-propyl-1,2,3,4-tetrahydropentalene)]zirconiumdichloride,

[1-(3',6'-di-(1-adamantyl)-fluorene-9'-yl) (1,5-di-tert-butyl-3-iso-propyl-1,2,3,4-tetrahydropentalene)]zirconiumdichloride,

[1-(3',6'-di-tert-butyl-2',7'-dimethylfluorene-9'-yl) (1,5-di-tert-butyl-3-iso-propyl-1,2,3,4-tetrahydropentalene)]zirconiumdichloride,

[1-(octamethylfluorene-12'-yl) (1,5-di-tert-butyl-3-iso-propyl-1,2,3,4-tetrahydropentalene)]zirconiumdichloride,

[1-(hexamethyldicyclopentafluorene-10'-yl) (1,5-di-tert-butyl-3-iso-propyl-1,2,3,4-tetrahydropentalene)]zirconiumdichloride,

[1-(fluorene-9'-yl) (3,5-tert-butyl-1-methyl-1,2,3,4-tetrahydropentalene)]zirconiumdichloride,

[1-(2',7'-di-tert-butylfluorene-9'-yl) (3,5-tert-butyl-1-methyl-1,2,3,4-tetrahydropentalene)]zirconiumdichloride,

[1-(3',6'-di-tert-butylfluorene-9'-yl) (3,5-tert-butyl-1-methyl-1,2,3,4-tetrahydropentalene)]zirconiumdichloride,

[1-(3',6'-di-(1-adamantyl)-fluorene-9'-yl) (3,5-tert-butyl-1-methyl-1,2,3,4-tetrahydropentalene)]zirconiumdichloride,

[1-(3',6'-di-tert-butyl-2',7'-dimethylfluorene-9'-yl) (3,5-tert-butyl-1-methyl-1,2,3,4-tetrahydropentalene)]zirconiumdichloride,

[1-(octamethylfluorene-12'-yl) (3,5-tert-butyl-1-methyl-1,2,3,4-tetrahydropentalene)]zirconiumdichloride,

[1-(hexamethyldicyclopentafluorene-10'-yl) (3,5-tert-butyl-1-methyl-1,2,3,4-tetrahydropentalene)]zirconiumdichloride,

[1-(fluorene-9'-yl) (5-adamantane-1-yl-1-iso-propyl-3-tert-butyl-1,2,3,4-tetrahydropentalene)]zirconiumdichloride,

[1-(2',7'-di-tert-butylfluorene-9'-yl) (5-adamantane-1-yl-1-iso-propyl-3-tert-butyl-1,2,3,4-tetrahydropentalene)]zirconiumdichloride,

[1-(3',6'-di-tert-butylfluorene-9'-yl) (5-adamantane-1-yl-1-iso-propyl-3-tert-butyl-1,2,3,4-tetrahydropentalene)]zirconiumdichloride,

[1-(3',6'-di-(1-adamantyl)-fluorene-9'-yl) (5-adamantane-1-yl-1-iso-propyl-3-tert-butyl-1,2,3,4-tetrahydropentalene)]zirconiumdichloride,

[1-(3',6'-di-tert-butyl-2',7'-dimethylfluorene-9'-yl) (5-adamantane-1-yl-1-iso-propyl-3-tert-butyl-1,2,3,4-tetrahydropentalene)]zirconiumdichloride,

[1-(octamethylfluorene-12'-yl) (5-adamantane-1-yl-1-iso-propyl-3-tert-butyl-1,2,3,4-tetrahydropentalene)]zirconiumdichloride,

[1-(hexamethyldicyclopentafluorene-10'-yl) (5-adamantane-1-yl-1-iso-propyl-3-tert-butyl-1,2,3,4-tetrahydropentalene)]zirconiumdichloride,

[1-(fluorene-9'-yl) (3,5-tert-butyl-1-ethyl-1,2,3,4-tetrahydropentalene)]zirconiumdichloride,

[1-(2',7'-di-tert-butylfluorene-9'-yl) (3,5-tert-butyl-1-ethyl-1,2,3,4-tetrahydropentalene)]zirconiumdichloride,

[1-(3',6'-di-tert-butylfluorene-9'-yl) (3,5-tert-butyl-1-ethyl-1,2,3,4-tetrahydropentalene)]zirconiumdichloride,

[1-(3',6'-di-(1-adamantyl)-fluorene-9'-yl) (3,5-tert-butyl-1-ethyl-1,2,3,4-tetrahydropentalene)]zirconiumdichloride,

[1-(3',6'-di-tert-butyl-2',7'-dimethylfluorene-9'-yl) (3,5-tert-butyl-1-ethyl-1,2,3,4-tetrahydropentalene)]zirconiumdichloride,

[1-(octamethylfluorene-12'-yl) (3,5-tert-butyl-1-ethyl-1,2,3,4-tetrahydropentalene)]zirconiumdichloride,

[1-(hexamethyldicyclopentafluorene-10'-yl) (3,5-tert-butyl-1-ethyl-1,2,3,4-tetrahydropentalene)]zirconiumdichloride,

[1-(fluorene-9'-yl) (3,5-tert-butyl-1-iso-propyl-1,2,3,4-tetrahydropentalene)]zirconiumdichloride,

[1-(2',7'-di-tert-butylfluorene-9'-yl) (3,5-tert-butyl-1-iso-propyl-1,2,3,4-tetrahydropentalene)]zirconiumdichloride,

[1-(3',6'-di-tert-butylfluorene-9'-yl) (3,5-tert-butyl-1-iso-propyl-1,2,3,4-tetrahydropentalene)]zirconiumdichloride,

[1-(3',6'-di-(1-adamantyl)-fluorene-9'-yl) (3,5-tert-butyl-1-iso-propyl-1,2,3,4-tetrahydropentalene)]zirconiumdichloride,

[1-(3',6'-di-tert-butyl-2',7'-dimethylfluorene-9'-yl) (3,5-tert-butyl-1-iso-propyl-1,2,3,4-tetrahydropentalene)]zirconiumdichloride,

[1-(octamethylfluorene-12'-yl) (3,5-tert-butyl-1-iso-propyl-1,2,3,4-tetrahydropentalene)]zirconiumdichloride,

[1-(hexamethyldicyclopentafluorene-10'-yl) (3,5-tert-butyl-1-iso-propyl-1,2,3,4-tetrahydropentalene)]zirconiumdichloride,

[1-(fluorene-9'-yl) (5-tert-butyl-1-methyl-3-cylohexyl-1,2,3,4-tetrahydropentalene)]zirconiumdichloride,

[1-(2',7'-di-tert-butylfluorene-9'-yl) (5-tert-butyl-1-methyl-3-cylohexyl-1,2,3,4-tetrahydropentalene)]zirconiumdichloride,

[1-(3',6'-di-tert-butylfluorene-9'-yl) (5-tert-butyl-1-methyl-3-cylohexyl-1,2,3,4-tetrahydropentalene)]zirconiumdichloride,

[1-(3',6'-di-(1-adamantyl)-fluorene-9'-yl) (5-tert-butyl-1-methyl-3-cylohexyl-1,2,3,4-tetrahydropentalene)]zirconiumdichloride,

[1-(3',6'-di-tert-butyl-2',7'-dimethylfluorene-9'-yl) (5-tert-butyl-1-methyl-3-cylohexyl-1,2,3,4-tetrahydropentalene)]zirconiumdichloride,

[1-(octamethylfluorene-12'-yl) (5-tert-butyl-1-methyl-3-cylohexyl-1,2,3,4-tetrahydropentalene)]zirconiumdichloride,

[1-(hexamethyldicyclopentafluorene-10'-yl) (5-tert-butyl-1-methyl-3-cylohexyl-1,2,3,4-tetrahydropentalene)]zirconiumdichloride,

[1-(fluorene-9'-yl) (5-adamantane-1-yl-1-iso-propyl-3-cylohexyl-1,2,3,4-tetrahydropentalene)]zirconiumdichloride,

[1-(2',7'-di-tert-butylfluorene-9'-yl) (5-adamantane-1-yl-1-iso-propyl-3-cylohexyl-1,2,3,4-tetrahydropentalene)]zirconiumdichloride,

[1-(3',6'-di-tert-butylfluorene-9'-yl) (5-adamantane-1-yl-1-iso-propyl-3-cylohexyl-1,2,3,4-tetrahydropentalene)]zirconiumdichloride,

[1-(3',6'-di-(1-adamantyl)-fluorene-9'-yl) (5-adamantane-1-yl-1-iso-propyl-3-cylohexyl-1,2,3,4-tetrahydropentalene)]zirconiumdichloride,

[1-(3',6'-di-tert-butyl-2',7'-dimethylfluorene-9'-yl) (5-adamantane-1-yl-1-iso-propyl-3-cylohexyl-1,2,3,4-tetrahydropentalene)]zirconiumdichloride,

[1-(octamethylfluorene-12'-yl) (5-adamantane-1-yl-1-iso-propyl-3-cylohexyl-1,2,3,4-tetrahydropentalene)]zirconiumdichloride,

[1-(hexamethyldicyclopentafluorene-10'-yl) (5-adamantane-1-yl-1-iso-propyl-3-cylohexyl-1,2,3,4-tetrahydropentalene)]zirconiumdichloride,

[1-(fluorene-9'-yl) (5-tert-butyl-1-ethyl-3-cylohexyl-1,2,3,4-tetrahydropentalene)]zirconiumdichloride,

[1-(2',7'-di-tert-butylfluorene-9'-yl) (5-tert-butyl-1-ethyl-3-cylohexyl-1,2,3,4-tetrahydropentalene)]zirconiumdichloride,

[1-(3',6'-di-tert-butylfluarene-9'-yl) (5-tert-butyl-1-ethyl-3-cylohexyl-1,2,3,4-tetrahydropentalene)]zirconiumdichloride,

[1-(3',6'-di-(1-adamantyl)-fluarene-9'-yl) (5-tert-butyl-1-ethyl-3-cylohexyl-1,2,3,4-tetrahydropentalene)]zirconiumdichloride,

[1-(3',6'-di-tert-butyl-2',7'-dimethylfluarene-9'-yl) (5-tert-butyl-1-ethyl-3-cylohexyl-1,2,3,4-tetrahydropentalene)]zirconiumdichloride,

[1-(actamethylfluarene-12'-yl) (5-tert-butyl-1-ethyl-3-cylohexyl-1,2,3,4-tetrahydropentalene)]zirconiumdichloride,

[1-(hexamethyldicyclopentafluorene-10'-yl) (5-tert-butyl-1-ethyl-3-cylohexyl-1,2,3,4-tetrahydropentalene)]zirconiumdichloride,

[1-(fluarene-9'-yl) (5-tert-butyl-1-iso-propyl-3-cylohexyl-1,2,3,4-tetrahydropentalene)]zirconiumdichloride,

[1-(2',7'-di-tert-butylfluarene-9'-yl) (5-tert-butyl-1-iso-propyl-3-cylohexyl-1,2,3,4-tetrahydropentalene)]zirconiumdichloride,

[1-(3',6'-di-tert-butylfluarene-9'-yl) (5-tert-butyl-1-iso-propyl-3-cylohexyl-1,2,3,4-tetrahydropentalene)]zirconiumdichloride,

[1-(3',6'-di-(1-adamantyl)-fluarene-9'-yl) (5-tert-butyl-1-iso-propyl-3-cylohexyl-1,2,3,4-tetrahydropentalene)]zirconiumdichloride,

[1-(3',6'-di-tert-butyl-2',7'-dimethylfluorene-9'-yl) (5-tert-butyl-1-iso-propyl-3-cylohexyl-1,2,3,4-tetrahydropentalene)]zirconiumdichloride,

[1-(octamethylfluorene-12'-yl) (5-tert-butyl-1-iso-propyl-3-cylohexyl-1,2,3,4-tetrahydropentalene)]zirconiumdichloride,

[1-(hexamethyldicyclopentafluorene-10'-yl) (5-tert-butyl-1-iso-propyl-3-cylohexyl-1,2,3,4-tetrahydropentalene)]zirconiumdichloride,

[1-(fluorene-9'-yl) (5-tert-butyl-1-methyl-3-(3-cyclohexenyl)-1,2,3,4-tetrahydropentalene)]zirconiumdichloride,

[1-(2',7'-di-tert-butylfluorene-9'-yl) (5-tert-butyl-1-methyl-3-(3-cyclohexeny))-1,2,3,4-tetrahydropentalene)]zirconiumdichloride,

[1-(3',6'-di-tert-butylfluorene-9'-yl) (5-tert-butyl-1-methyl-3-(3-cyclohexeny))-1,2,3,4-tetrahydropentalene)]zirconiumdichloride,

[1-(3',6'-di-(1-adamantyl)-fluorene-9'-yl) (5-tert-butyl-1-methyl-3-(3-cyclohexeny))-1,2,3,4-tetrahydropentalene)]zirconiumdichloride,

[1-(3',6'-di-tert-butyl-2',7'-dimethylfluorene-9'-yl) (5-tert-butyl-1-methyl-3-(3-cyclohexeny))-1,2,3,4-tetrahydropentalene)]zirconiumdichloride,

[1-(octamethylfluorene-12'-yl) (5-tert-butyl-1-methyl-3-(3-cyclohexenyl)-1,2,3,4-tetrahydropentalene)]zirconiumdichloride,

[1-(hexamethyldicyclopentafluorene-10'-yl) (5-tert-butyl-1-methyl-3-(3-cyclohexenyl)-1,2,3,4-tetrahydropentalene)]zirconiumdichloride,

[1-(fluorene-9'-yl) (5-adamantane-1-yl-1-iso-propyl-3-(3-cyclohexenyl)-1,2,3,4-tetrahydropentalene)]zirconiumdichloride,

[1-(2',7'-di-tert-butylfluorene-9'-yl) (5-adamantane-1-yl-1-iso-propyl-3-(3-cyclohexenyl)-1,2,3,4-tetrahydropentalene)]zirconiumdichloride,

[1-(3',6'-di-tert-butylfluorene-9'-yl) (5-adamantane-1-yl-1-iso-propyl-3-(3-cyclohexenyl)-1,2,3,4-tetrahydropentalene)]zirconiumdichloride,

[1-(3',6'-di-(1-adamantyl)-fluorene-9'-yl) (5-adamantane-1-yl-1-iso-propyl-3-(3-cyclohexenyl)-1,2,3,4-tetrahydropentalene)]zirconiumdichloride,

[1-(3',6'-di-tert-butyl-2',7'-dimethylfluorene-9'-yl) (5-adamantane-1-yl-1-iso-propyl-3-(3-cyclohexenyl)-1,2,3,4-tetrahydropentalene)]zirconiumdichloride,

[1-(octamethylfluorene-12'-yl) (5-adamantane-1-yl-1-iso-propyl-3-(3-cyclohexenyl)-1,2,3,4-tetrahydropentalene)]zirconiumdichloride,

[1-(hexamethyldicyclopentafluorene-10'-yl) (5-adamantane-1-yl-1-iso-propyl-3-(3-cyclohexenyl)-1,2,3,4-tetrahydropentalene)]zirconiumdichloride,

[1-(fluorene-9'-yl) (5-tert-butyl-1-ethyl-3-(3-cyclohexenyl)-1,2,3,4-tetrahydropentalene)]zirconiumdichloride,

[1-(2',7'-di-tert-butylfluorene-9'-yl) (5-tert-butyl-1-ethyl-3-(3-cyclohexenyl)-1,2,3,4-tetrahydropentalene)]zirconiumdichloride,

[1-(3',6'-di-tert-butylfluorene-9'-yl) (5-tert-butyl-1-ethyl-3-(3-cyclohexenyl)-1,2,3,4-tetrahydropentalene)]zirconiumdichloride,

[1-(3',6'-di-(1-adamantyl)-fluorene-9'-yl) (5-tert-butyl-1-ethyl-3-(3-cyclohexenyl)-1,2,3,4-tetrahydropentalene)]zirconiumdichloride,

[1-(3',6'-di-tert-butyl-2',7'-dimethylfluorene-9'-yl) (5-tert-butyl-1-ethyl-3-(3-cyclohexenyl)-1,2,3,4-tetrahydropentalene)]zirconiumdichloride,

[1-(octamethylfluorene-12'-yl) (5-tert-butyl-1-ethyl-3-(3-cyclohexenyl)-1,2,3,4-tetrahydropentalene)]zirconiumdichloride,

[1-(hexamethyldicyclopentafluorene-10'-yl) (5-tert-butyl-1-ethyl-3-(3-cyclohexenyl)-1,2,3,4-tetrahydropentalene)]zirconiumdichloride,

[1-(fluorene-9'-yl) (5-tert-butyl-1-iso-propyl-3-(3-cyclohexenyl)-1,2,3,4-tetrahydropentalene)]zirconiumdichloride,

[1-(2',7'-di-tert-butylfluorene-9'-yl) (5-tert-butyl-1-iso-propyl-3-(3-cyclohexenyl)-1,2,3,4-tetrahydropentalene)]zirconiumdichloride,

[1-(3',6'-di-tert-butylfluorene-9'-yl) (5-tert-butyl-1-iso-propyl-3-(3-cyclohexenyl)-1,2,3,4-tetrahydropentalene)]zirconiumdichloride,

[1-(3',6'-di-(1-adamantyl)-fluorene-9'-yl) (5-tert-butyl-1-iso-propyl-3-(3-cyclohexenyl)-1,2,3,4-tetrahydropentalene)]zirconiumdichloride,

[1-(3',6'-di-tert-butyl-2',7'-dimethylfluorene-9'-yl) (5-tert-butyl-1-iso-propyl-3-(3-cyclohexenyl)-1,2,3,4-tetrahydropentalene)]zirconiumdichloride,

[1-(octamethylfluorene-12'-yl) (5-tert-butyl-1-iso-propyl-3-(3-cyclohexenyl)-1,2,3,4-tetrahydropentalene)]zirconiumdichloride,

[1-(hexamethyldicyclopentafluorene-10'-yl) (5-tert-butyl-1-iso-propyl-3-(3-cyclohexenyl)-1,2,3,4-tetrahydropentalene)]zirconiumdichloride,

[1-(fluorene-9'-yl) (5-tert-butyl-1-methyl-3-(bicyclo[2.2.1]hepta-5-ene-2-yl)-1,2,3,4-tetrahydropentalene)]zirconiumdichloride,

[1-(2',7'-di-tert-butylfluorene-9'-yl) (5-tert-butyl-1-methyl-3-(bicyclo[2.2.1]hepta-5-ene-2-yl)-1,2,3,4-tetrahydropentalene)]zirconiumdichloride,

[1-(3',6'-di-tert-butylfluorene-9'-yl) (5-tert-butyl-1-methyl-3-(bicyclo[2.2.1]hepta-5-ene-2-yl)-1,2,3,4-tetrahydropentalene)]zirconiumdichloride,

[1-(3',6'-di-(1-adamantyl)-fluorene-9'-yl) (5-tert-butyl-1-methyl-3-(bicyclo[2.2.1]hepta-5-ene-2-yl)-1,2,3,4-tetrahydropentalene)]zirconiumdichloride,

[1-(3',6'-di-tert-butyl-2',7'-dimethylfluorene-9'-yl) (5-tert-butyl-1-methyl-3-(bicyclo[2.2.1]hepta-5-ene-2-yl)-1,2,3,4-tetrahydropentalene)]zirconiumdichloride,

[1-(octamethylfluorene-12'-yl) (5-tert-butyl-1-methyl-3-(bicyclo[2.2.1]hepta-5-ene-2-yl)-1,2,3,4-tetrahydropentalene)]zirconiumdichloride,

[1-(hexamethyldicyclopentafluorene-10'-yl) (5-tert-butyl-1-methyl-3-(bicyclo[2.2.1]hepta-5-ene-2-yl)-1,2,3,4-tetrahydropentalene)]zirconiumdichloride,

[1-(fluorene-9'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(2',7'-di-tert-butylfluorene-9'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(3',6'-di-tert-butylfluorene-9'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(3',6'-di-(1-adamantyl)-fluorene-9'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(3',6'-di-tert-butyl-2',7'-dimethylfluorene-9'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(octamethylfluorene-12'-yl) (5-adamantane-1-yl-iso-propyl-3-(bicyclo[2.2.1]hepta-5-ene-2-yl)-1,2,3,4-tetrahydropentalene)]zirconiumdichloride,

[1-(hexamethyldicyclopentafluorene-10'-yl) (5-adamantane-1-yl-1-iso-propyl-3-(bicyclo[2.2.1]hepta-5-ene-2-yl)-1,2,3,4-tetrahydropentalene)]zirconiumdichloride,

[1-(fluorene-9'-yl) (5-tert-butyl-1-iso-propyl-3-(bicyclo[2.2.1]hepta-5-ene-2-yl)-1,2,3,4-tetrahydropentalene)]zirconiumdichloride,
[1-(2',7'-di-tert-butylfluorene-9'-yl) (5-tert-butyl-1-iso-propyl-3-(bicyclo[2.2.1]hepta-5-ene-2-yl)-1,2,3,4-tetrahydropentalene)]zirconiumdichloride,
[1-(3',6'-di-tert-butylfluorene-9'-yl) (5-tert-butyl-1-iso-propyl-3-(bicyclo[2.2.1]hepta-5-ene-2-yl)-1,2,3,4-tetrahydropentalene)]zirconiumdichloride,
[1-(3',6'-di-(1-adamantyl)-fluorene-9'-yl) (5-tert-butyl-1-iso-propyl-3-(bicyclo[2.2.1]hepta-5-ene-2-yl)-1,2,3,4-tetrahydropentalene)]zirconiumdichloride,
[1-(3',6'-di-tert-butyl-2',7'-dimethylfluorene-9'-yl) (5-tert-butyl-1-iso-propyl-3-(bicyclo[2.2.1]hepta-5-ene-2-yl)-1,2,3,4-tetrahydropentalene)]zirconiumdichloride,
[1-(octamethylfluorene-12'-yl) (5-tert-butyl-1-iso-propyl-3-(bicyclo[2.2.1]hepta-5-ene-2-yl)-1,2,3,4-tetrahydropentalene)]zirconiumdichloride,
[1-(hexamethyldicyclopentafluorene-10'-yl) (5-tert-butyl-1-iso-propyl-3-(bicyclo[2.2.1]hepta-5-ene-2-yl)-1,2,3,4-tetrahydropentalene)]zirconiumdichloride,
[8-(fluorene-9'-yl) (3,3b,4,5,6,7,7a,8-octahydrocyclopenta[a]indene)]zirconiumdichloride,
[8-(2',7'-di-tert-butylfluorene-9'-yl) (3,3b,4,5,6,7,7a,8-octahydrocyclopenta[a]indene)]zirconiumdichloride,
[8-(3',6'-di-tert-butylfluorene-9'-yl) (3,3b,4,5,6,7,7a,8-octahydrocyclopenta[a]indene)]zirconiumdichloride,
[8-(3',6'-di-(1-adamantyl)-fluorene-9'-yl) (3,3b,4,5,6,7,7a,8-octahydrocyclopenta[a]indene)]zirconiumdichloride,
[8-(3',6'-di-tert-butyl-2',7'-dimethylfluorene-9'-yl) (3,3b,4,5,6,7,7a,8-octahydrocyclopenta[a]indene)]zirconiumdichloride,
[8-(octamethylfluorene-12'-yl) (3,3b,4,5,6,7,7a,8-octahydrocyclopenta[a]indene)]zirconiumdichloride,
[8-(hexamethyldicyclopentafluorene-10'-yl) (3,3b,4,5,6,7,7a,8-octahydrocyclopenta[a]indene)]zirconiumdichloride,
[8-(fluorene-9'-yl) (2-tert-butyl-8-methyl-3,3b,4,5,6,7,7a,8-octahydrocyclopenta[a]indene)]zirconiumdichloride,
[8-(2',7'-di-tert-butylfluorene-9'-yl) (2-tert-butyl-8-methyl-3,3b,4,5,6,7,7a,8-octahydrocyclopenta[a]indene)]zirconiumdichloride,
[8-(3',6'-di-tert-butylfluorene-9'-yl) (2-tert-butyl-8-methyl-3,3b,4,5,6,7,7a,8-octahydrocyclopenta[a]indene)]zirconiumdichloride,
[8-(3',6'-di-(1-adamantyl)-fluorene-9'-yl) (2-tert-butyl-8-methyl-3,3b,4,5,6,7,7a,8-octahydrocyclopenta[a]indene)]zirconiumdichloride,
[8-(3',6'-di-tert-butyl-2',7'-dimethylfluorene-9'-yl) (2-tert-butyl-8-methyl-3,3b,4,5,6,7,7a,8-octahydrocyclopenta[a]indene)]zirconiumdichloride,
[8-(octamethylfluorene-12'-yl) (2-tert-butyl-8-methyl-3,3b,4,5,6,7,7a,8-octahydrocyclopenta[a]indene)]zirconiumdichloride,
[8-(hexamethyldicyclopentafluorene-10'-yl) (2-tert-butyl-8-methyl-3,3b,4,5,6,7,7a,8-octahydrocyclopenta[a]indene)]zirconiumdichloride,
[8-(fluorene-9'-yl) (2-tert-butyl-8-iso-propyl-3,3b,4,5,6,7,7a,8-octahydrocyclopenta[a]indene)]zirconiumdichloride,
[8-(2',7'-di-tert-butylfluorene-9'-yl) (2-tert-butyl-8-iso-propyl-3,3b,4,5,6,7,7a,8-octahydrocyclopenta[a]indene)]zirconiumdichloride,
[8-(3',6'-di-tert-butylfluorene-9'-yl) (2-tert-butyl-8-iso-propyl-3,3b,4,5,6,7,7a,8-octahydrocyclopenta[a]indene)]zirconiumdichloride,
[8-(3',6'-di-(1-adamantyl)-fluorene-9'-yl) (2-tert-butyl-8-iso-propyl-3,3b,4,5,6,7,7a,8-octahydrocyclopenta[a]indene)]zirconiumdichloride,
[8-(3',6'-di-tert-butyl-2',7'-dimethylfluorene-9'-yl) (2-tert-butyl-8-iso-propyl-3,3b,4,5,6,7,7a,8-octahydrocyclopenta[a]indene)]zirconiumdichloride,
[8-(octamethylfluorene-12'-yl) (2-tert-butyl-8-iso-propyl-3,3b,4,5,6,7,7a,8-octahydrocyclopenta[a]indene)]zirconiumdichloride,
[8-(hexamethyldicyclopentafluorene-10'-yl) (2-tert-butyl-8-iso-propyl-3,3b,4,5,6,7,7a,8-octahydrocyclopenta[a]indene)]zirconiumdichloride,
[8-(fluorene-9'-yl) (2-tert-butyl-8-phenyl-3,3b,4,5,6,7,7a,8-octahydrocyclopenta[a]indene)]zirconiumdichloride,
[8-(2',7'-di-tert-butylfluorene-9'-yl) (2-tert-butyl-8-phenyl-3,3b,4,5,6,7,7a,8-octahydrocyclopenta[a]indene)]zirconiumdichloride,
[8-(3',6'-di-tert-butylfluorene-9'-yl) (2-tert-butyl-8-phenyl-3,3b,4,5,6,7,7a,8-octahydrocyclopenta[a]indene)]zirconiumdichloride,
[8-(3',6'-di-(1-adamantyl)-fluorene-9'-yl) (2-tert-butyl-8-phenyl-3,3b,4,5,6,7,7a,8-octahydrocyclopenta[a]indene)]zirconiumdichloride,
[8-(3',6'-di-tert-butyl-2',7'-dimethylfluorene-9'-yl) (2-tert-butyl-8-phenyl-3,3b,4,5,6,7,7a,8-octahydrocyclopenta[a]indene)]zirconiumdichloride,
[8-(octamethylfluorene-12'-yl) (2-tert-butyl-8-phenyl-3,3b,4,5,6,7,7a,8-octahydrocyclopenta[a]indene)]zirconiumdichloride,
[8-(hexamethyldicyclopentafluorene-10'-yl) (2-tert-butyl-8-phenyl-3,3b,4,5,6,7,7a,8-octahydrocyclopenta[a]indene)]zirconiumdichloride,
[8-(fluorene-9'-yl) (2-tert-butyl-5,8-dimethyl-3,3b,4,5,6,7,7a,8-octahydrocyclopenta[a]indene)]zirconiumdichloride,
[8-(2',7'-di-tert-butylfluorene-9'-yl) (2-tert-butyl-5,8-dimethyl-3,3b,4,5,6,7,7a,8-octahydrocyclopenta[a]indene)]zirconiumdichloride,
[8-(3',6'-di-tert-butylfluorene-9'-yl) (2-tert-butyl-5,8-dimethyl-3,3b,4,5,6,7,7a,8-octahydrocyclopenta[a]indene)]zirconiumdichloride,
[8-(3',6'-di-(1-adamantyl)-fluorene-9'-yl) (2-tert-butyl-5,8-dimethyl-3,3b,4,5,6,7,7a,8-octahydrocyclopenta[a]indene)]zirconiumdichloride,
[8-(3',6'-di-tert-butyl-2',7'-dimethylfluorene-9'-yl) (2-tert-butyl-5,8-dimethyl-3,3b,4,5,6,7,7a,8-octahydrocyclopenta[a]indene)]zirconiumdichloride,
[8-(octamethylfluorene-12'-yl) (2-tert-butyl-5,8-dimethyl-3,3b,4,5,6,7,7a,8-octahydrocyclopenta[a]indene)]zirconiumdichloride,
[8-(hexamethyldicyclopentafluorene-10'-yl) (2-tert-butyl-5,8-dimethyl-3,3b,4,5,6,7,7a,8-octahydrocyclopenta[a]indene)]zirconiumdichloride,
[8-(fluorene-9'-yl) (2-tert-butyl-8-(3-cyclohexenyl)-3,3b,4,5,6,7,7a,8-octahydrocyclopenta[a]indene)]zirconiumdichloride,
[8-(2',7'-di-tert-butylfluorene-9'-yl) (2-tert-butyl-8-(3-cyclohexenyl)-3,3b,4,5,6,7,7a,8-octahydrocyclopenta[a]indene)]zirconiumdichloride,
[8-(3',6'-di-tert-butylfluorene-9'-yl) (2-tert-butyl-8-(3-cyclohexenyl)-3,3b,4,5,6,7,7a,8-octahydrocyclopenta[a]indene)]zirconiumdichloride,
[8-(3',6'-di-(1-adamantyl)-fluorene-9'-yl) (2-tert-butyl-8-(3-cyclohexenyl)-3,3b,4,5,6,7,7a,8-octahydrocyclopenta[a]indene)]zirconiumdichloride,

[8-(3',6'-di-tert-butyl-2',7'-dimethylfluorene-9'-yl) (2-tert-butyl-8-(3-cyclohexenyl)-3,3b,4,5,6,7,7a,8-octahydrocyclopenta[a]indene)]zirconiumdichloride,

[8-(octamethylfluorene-12'-yl) (2-tert-butyl-8-(3-cyclohexenyl)-3,3b,4,5,6,7,7a,8-octahydrocyclopenta[a]indene)]zirconiumdichloride,

[8-(hexamethyldicyclopentafluorene-10'-yl) (2-tert-butyl-8-(3-cyclohexenyl)-3,3b,4,5,6,7,7a,8-octahydrocyclopenta[a]indene)]zirconiumdichloride,

[8-(fluorene-9'-yl) (2-(1-adamantyl)-8-methyl-3,3b,4,5,6,7,7a,8-octahydrocyclopenta[a]indene)]zirconiumdichloride,

[8-(2',7'-di-tert-butylfluorene-9'-yl) (2-(1-adamantyl)-8-methyl-3,3b,4,5,6,7,7a,8-octahydrocyclopenta[a]indene)]zirconiumdichloride,

[8-(3',6'-di-tert-butylfluorene-9'-yl) (2-(1-adamantyl)-8-methyl-3,3b,4,5,6,7,7a,8-octahydrocyclopenta[a]indene)]zirconiumdichloride,

[8-(3',6'-di-(1-adamantyl)-fluorene-9'-yl) (2-(1-adamantyl)-8-methyl-3,3b,4,5,6,7,7a,8-octahydrocyclopenta[a]indene)]zirconiumdichloride,

[8-(3',6'-di-tert-butyl-2',7'-dimethylfluorene-9'-yl) (2-(1-adamantyl)-8-methyl-3,3b,4,5,6,7,7a,8-octahydrocyclopenta[a]indene)]zirconiumdichloride,

[8-(octamethylfluorene-12'-yl) (2-(1-adamantyl)-8-methyl-3,3b,4,5,6,7,7a,8-octahydrocyclopenta[a]indene)]zirconiumdichloride,

[8-(hexamethyldicyclopentafluorene-10'-yl) (2-(1-adamantyl)-8-methyl-3,3b,4,5,6,7,7a,8-octahydrocyclopenta[a]indene)]zirconiumdichloride,

[8-(fluorene-9'-yl) (2-(1-adamantyl)-8-iso-propyl-3,3b,4,5,6,7,7a,8-octahydrocyclopenta[a]indene)]zirconiumdichloride,

[8-(2',7'-di-tert-butylfluorene-9'-yl) (2-(1-adamantyl)-8-iso-propyl-3,3b,4,5,6,7,7a,8-octahydrocyclopenta[a]indene)]zirconiumdichloride,

[8-(3',6'-di-tert-butylfluorene-9'-yl) (2-(1-adamantyl)-8-iso-propyl-3,3b,4,5,6,7,7a,8-octahydrocyclopenta[a]indene)]zirconiumdichloride,

[8-(3',6'-di-(1-adamantyl)-fluorene-9'-yl) (2-(1-adamantyl)-8-iso-propyl-3,3b,4,5,6,7,7a,8-octahydrocyclopenta[a]indene)]zirconiumdichloride,

[8-(3',6'-di-tert-butyl-2',7'-dimethylfluorene-9'-yl) (2-(1-adamantyl)-8-iso-propyl-3,3b,4,5,6,7,7a,8-octahydrocyclopenta[a]indene)]zirconiumdichloride,

[8-(octamethylfluorene-12'-yl) (2-(1-adamantyl)-8-iso-propyl-3,3b,4,5,6,7,7a,8-octahydrocyclopenta[a]indene)]zirconiumdichloride,

[8-(hexamethyldicyclopentafluorene-10'-yl) (2-(1-adamantyl)-8-iso-propyl-3,3b,4,5,6,7,7a,8-octahydrocyclopenta[a]indene)]zirconiumdichloride,

[7-(fluorene-9'-yl) (2,3,3a,4,7,7a-hexahydro-1H-cyclopenta[a]pentalene)]zirconiumdichloride,

[7-(2',7'-di-tert-butylfluorene-9'-yl) (2,3,3a,4,7,7a-hexahydro-1H-cyclopenta[a]pentalene)]zirconiumdichloride,

[7-(3',6'-di-tert-butylfluorene-9'-yl) (2,3,3a,4,7,7a-hexahydro-1H-cyclopenta[a]pentalene)]zirconiumdichloride,

[7-(3',6'-di-(1-adamantyl)-fluorene-9'-yl) (2,3,3a,4,7,7a-hexahydro-1H-cyclopenta[a]pentalene)]zirconiumdichloride,

[7-(3',6'-di-tert-butyl-2',7'-dimethylfluorene-9'-yl) (2,3,3a,4,7,7a-hexahydro-1H-cyclopenta[a]pentalene)]zirconiumdichloride,

[7-(octamethylfluorene-12'-yl) (2,3,3a,4,7,7a-hexahydro-1H-cyclopenta[a]pentalene)]zirconiumdichloride,

[7-(hexamethyldicyclopentafluorene-10'-yl) (2,3,3a,4,7,7a-hexahydro-1H-cyclopenta[a]pentalene)]zirconiumdichloride,

[7-(fluorene-9'-yl) (5-tert-butyl-7-methyl-2,3,3a,4,7,7a-hexahydro-1H-cyclopenta[a]pentalene)]zirconiumdichloride,

[7-(2',7'-di-tert-butylfluorene-9'-yl) (5-tert-butyl-7-methyl-2,3,3a,4,7,7a-hexahydro-1H-cyclopenta[a]pentalene)]zirconiumdichloride,

[7-(3',6'-di-tert-butylfluorene-9'-yl) (5-tert-butyl-7-methyl-2,3,3a,4,7,7a-hexahydro-1H-cyclopenta[a]pentalene)]zirconiumdichloride,

[7-(3',6'-di-(1-adamantyl)-fluorene-9'-yl) (5-tert-butyl-7-methyl-2,3,3a,4,7,7a-hexahydro-1H-cyclopenta[a]pentalene)]zirconiumdichloride,

[7-(3',6'-di-tert-butyl-2',7'-dimethylfluorene-9'-yl) (5-tert-butyl-7-methyl-2,3,3a,4,7,7a-hexahydro-1H-cyclopenta[a]pentalene)]zirconiumdichloride,

[7-(octamethylfluorene-12'-yl) (5-tert-butyl-7-methyl-2,3,3a,4,7,7a-hexahydro-1H-cyclopenta[a]pentalene)]zirconiumdichloride,

[7-(hexamethyldicyclopentafluorene-10'-yl) (5-tert-butyl-7-methyl-2,3,3a,4,7,7a-hexahydro-1H-cyclopenta[a]pentalene)]zirconiumdichloride,

[7-(fluorene-9'-yl) (5-tert-butyl-7-iso-propyl-2,3,3a,4,7,7a-hexahydro-1H-cyclopenta[a]pentalene)]zirconiumdichloride,

[7-(2',7'-di-tert-butylfluorene-9'-yl) (5-tert-butyl-7-iso-propyl-2,3,3a,4,7,7a-hexahydro-1H-cyclopenta[a]pentalene)]zirconiumdichloride,

[7-(3',6'-di-tert-butylfluorene-9'-yl) (5-tert-butyl-7-iso-propyl-2,3,3a,4,7,7a-hexahydro-1H-cyclopenta[a]pentalene)]zirconiumdichloride,

[7-(3',6'-di-(1-adamantyl)-fluorene-9'-yl) (5-tert-butyl-7-iso-propyl-2,3,3a,4,7,7a-hexahydro-1H-cyclopenta[a]pentalene)]zirconiumdichloride,

[7-(3',6'-di-tert-butyl-2',7'-dimethylfluorene-9'-yl) (5-tert-butyl-7-iso-propyl-2,3,3a,4,7,7a-hexahydro-1H-cyclopenta[a]pentalene)]zirconiumdichloride,

[7-(octamethylfluorene-12'-yl) (5-tert-butyl-7-iso-propyl-2,3,3a,4,7,7a-hexahydro-1H-cyclopenta[a]pentalene)]zirconiumdichloride,

[7-(hexamethyldicyclopentafluorene-10'-yl) (5-tert-butyl-7-iso-propyl-2,3,3a,4,7,7a-hexahydro-1H-cyclopenta[a]pentalene)]zirconiumdichloride,

[7-(fluorene-9'-yl) (2-tert-butyl-8-phenyl-2,3,3a,4,7,7a-hexahydro-1H-cyclopenta[a]pentalene)]zirconiumdichloride,

[7-(2',7'-di-tert-butylfluorene-9'-yl) (2-tert-butyl-8-phenyl-2,3,3a,4,7,7a-hexahydro-1H-cyclopenta[a]pentalene)]zirconiumdichloride,

[7-(3',6'-di-tert-butylfluorene-9'-yl) (2-tert-butyl-8-phenyl-2,3,3a,4,7,7a-hexahydro-1H-cyclopenta[a]pentalene)]zirconiumdichloride,

[7-(3',6'-di-(1-adamantyl)-fluorene-9'-yl) (2-tert-butyl-8-phenyl-2,3,3a,4,7,7a-hexahydro-1H-cyclopenta[a]pentalene)]zirconiumdichloride,

[7-(3',6'-di-tert-butyl-2',7'-dimethylfluorene-9'-yl) (2-tert-butyl-8-phenyl-2,3,3a,4,7,7a-hexahydro-1H-cyclopenta[a]pentalene)]zirconiumdichloride,

[7-(octamethylfluorene-12'-yl) (2-tert-butyl-8-phenyl-2,3,3a,4,7,7a-hexahydro-1H-cyclopenta[a]pentalene)]zirconiumdichloride,

[7-(hexamethyldicyclopentafluorene-10'-yl) (2-tert-butyl-8-phenyl-2,3,3a,4,7,7a-hexahydro-1H-cyclopenta[a]pentalene)]zirconiumdichloride,

[7-(fluorene-9'-yl) (5-tert-butyl-7-cylohexyl-2,3,3a,4,7,7a-hexahydro-1H-cyclopenta[a]pentalene)]zirconiumdichloride,
[7-(2',7'-di-tert-butylfluorene-9'-yl) (5-tert-butyl-7-cylohexyl-2,3,3a,4,7,7a-hexahydro-1H-cyclopenta[a]pentalene)]zirconiumdichloride,
[7-(3',6'-di-tert-butylfluorene-9'-yl) (5-tert-butyl-7-cylohexyl-2,3,3a,4,7,7a-hexahydro-1H-cyclopenta[a]pentalene)]zirconiumdichloride,
[7-(3',6'-di-(1-adamantyl)-fluorene-9'-yl) (5-tert-butyl-7-cylohexyl-2,3,3a,4,7,7a-hexahydro-1H-cyclopenta[a]pentalene)]zirconiumdichloride,
[7-(3',6'-di-tert-butyl-2',7'-dimethylfluorene-9'-yl) (5-tert-butyl-7-cylohexyl-2,3,3a,4,7,7a-hexahydro-1H-cyclopenta[a]pentalene)]zirconiumdichloride,
[7-(octamethylfluorene-12'-yl) (5-tert-butyl-7-cylohexyl-2,3,3a,4,7,7a-hexahydro-1H-cyclopenta[a]pentalene)]zirconiumdichloride,
[7-(hexamethyldicyclopentafluorene-10'-yl) (5-tert-butyl-7-cylohexyl-2,3,3a,4,7,7a-hexahydro-1H-cyclopenta[a]pentalene)]zirconiumdichloride,
[7-(fluorene-9'-yl) (5-adamantane-1-yl-7-methyl-2,3,3a,4,7,7a-hexahydro-1H-cyclopenta[a]pentalene)]zirconiumdichloride,
[7-(2',7'-di-tert-butylfluorene-9'-yl) (5-adamantane-1-yl-7-methyl-2,3,3a,4,7,7a-hexahydro-1H-cyclopenta[a]pentalene)]zirconiumdichloride,
[7-(3',6'-di-tert-butylfluorene-9'-yl) (5-adamantane-1-yl-7-methyl-2,3,3a,4,7,7a-hexahydro-1H-cyclopenta[a]pentalene)]zirconiumdichloride,
[7-(3',6'-di-(1-adamantyl)-fluorene-9'-yl) (5-adamantane-1-yl-7-methyl-2,3,3a,4,7,7a-hexahydro-1H-cyclopenta[a]pentalene)]zirconiumdichloride,
[7-(3',6'-di-tert-butyl-2',7'-dimethylfluorene-9'-yl) (5-adamantane-1-yl-7-methyl-2,3,3a,4,7,7a-hexahydro-1H-cyclopenta[a]pentalene)]zirconiumdichloride,
[7-(octamethylfluorene-12'-yl) (5-adamantane-1-yl-7-methyl-2,3,3a,4,7,7a-hexahydro-1H-cyclopenta[a]pentalene)]zirconiumdichloride,
[7-(hexamethyldicyclopentafluorene-10'-yl) (5-adamantane-1-yl-7-methyl-2,3,3a,4,7,7a-hexahydro-1H-cyclopenta[a]pentalene)]zirconiumdichloride,
[7-(fluorene-9'-yl) (5-adamantane-1-yl-7-iso-propyl-2,3,3a,4,7,7a-hexahydro-1H-cyclopenta[a]pentalene)]zirconiumdichloride,
[7-(2',7'-di-tert-butylfluorene-9'-yl) (5-adamantane-1-yl-7-iso-propyl-2,3,3a,4,7,7a-hexahydro-1H-cyclopenta[a]pentalene)]zirconiumdichloride,
[7-(3',6'-di-tert-butylfluorene-9'-yl) (5-adamantane-1-yl-7-iso-propyl-2,3,3a,4,7,7a-hexahydro-1H-cyclopenta[a]pentalene)]zirconiumdichloride,
[7-(3',6'-di-(1-adamantyl)-fluorene-9'-yl) (5-adamantane-1-yl-7-iso-propyl-2,3,3a,4,7,7a-hexahydro-1H-cyclopenta[a]pentalene)]zirconiumdichloride,
[7-(3',6'-di-tert-butyl-2',7'-dimethylfluorene-9'-yl) (5-adamantane-1-yl-7-iso-propyl-2,3,3a,4,7,7a-hexahydro-1H-cyclopenta[a]pentalene)]zirconiumdichloride,
[7-(octamethylfluorene-12'-yl) (5-adamantane-1-yl-7-iso-propyl-2,3,3a,4,7,7a-hexahydro-1H-cyclopenta[a]pentalene)]zirconiumdichloride, and
[7-(hexamethyldicyclopentafluorene-10'-yl) (5-adamantane-1-yl-7-iso-propyl-2,3,3a,4,7,7a-hexahydro-1H-cyclopenta[a]pentalene)]zirconiumdichloride.

The transition metal compounds [I] may be titanium derivatives or hafnium derivatives of the above-mentioned compounds. The transition metal compounds [I] are not limited to the above-mentioned compounds.

The position numbers used in the nomenclature of the above compounds will be explained with reference to Formula [I-1] and Formula [I-2] illustrating exemplary enantiomers of

[1-(1',1',4',4',7',7',10',10'-octamethyloctahydrodibenzo[b,h]fluoren-12'-yl) (5-tert-butyl-1-methyl-3-iso-propyl-1,2,3,4-tetrahydropentalene)]zirconium dichloride and

[8-(1',1',4',4',7',7',10',10'-octamethyloctahydrodibenzo[b,h]fluoren-12'-yl) (2-tert-butyl-8-methyl-3,3b,4,5,6,7,7a,8-octahydrocyclopenta[a]indene)]zirconium dichloride, respectively.

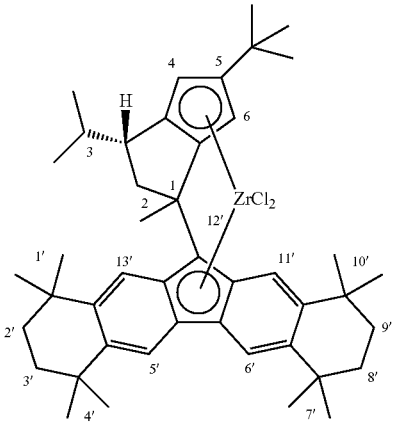

[I-1]

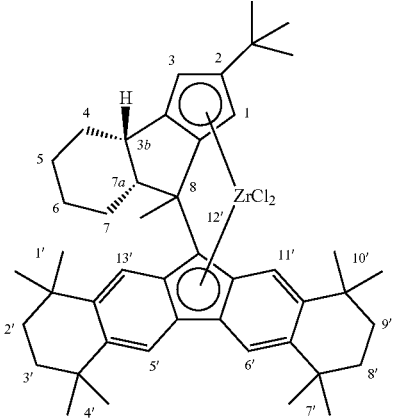

[I-2]

[Processes for Producing Transition Metal Compounds]

The transition metal compounds used in the invention may be produced by known processes without limitation. In the following, an example of the processes for producing the transition metal compounds [I] used in the invention will be described. Enantiomers of the compounds may be produced in the similar manner.

For example, the process for producing the transition metal compound [I] includes a step (1) of preparing a pentalene compound represented by General Formula (1a). The pentalene compound (1a) may be an appropriate isomer having a steric configuration corresponding to the target transition metal compound [I].

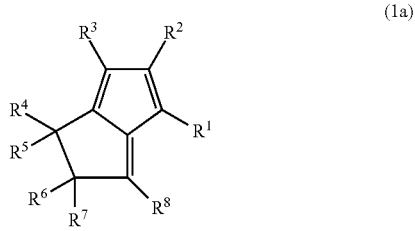
(1a)

In Formula (1a), $R^1$, $R^3$, $R^5$, $R^6$, $R^7$ and $R^8$ are each independently a hydrogen atom, a hydrocarbon group, a hetero atom-containing hydrocarbon group, or a silicon-containing group; $R^2$ is a hydrocarbon group, a hetero atom-containing hydrocarbon group, or a silicon-containing group; $R^4$ is a hydrogen atom; and any two substituents of the substituents $R^1$ to $R^8$ except $R^4$ may be bonded to each other to form a ring. Preferred embodiments of the configurations are the same as described with respect to General Formula [I].

In an embodiment, the step (1) is followed by a step (2) in which the pentalene compound (1a) is reacted with a fluorene derivative (2a) to form a precursor compound (3a) of a transition metal compound [I], and a step (3) in which a transition metal compound [I] is obtained from the precursor compound (3a).

⟨ Step (1)⟩

For example, the pentalene compound (1a) may be synthesized by, as illustrated in Reaction [A], reacting a cyclopentadiene derivative (1a-1) with an α,β-unsaturated carbonyl compound (1a-2); or by, as illustrated in Reaction [B], reacting a cyclopentadiene derivative (1a-1) with a carbonyl compound (1a-3) and an aldehyde compound (1a-4).

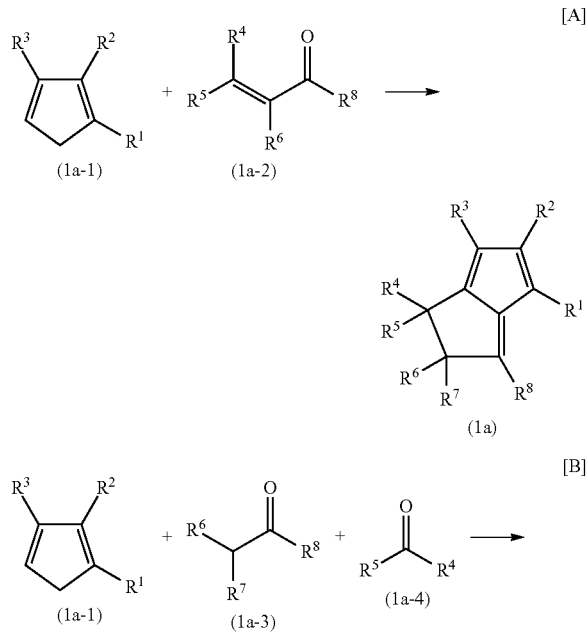

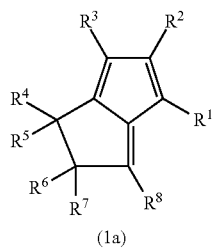
(1a)

In Reaction [A], $R^1$ to $R^6$ and $R^8$ are as defined in General Formula [I], and $R^7$ is a hydrogen atom. In Reaction [B], $R^1$ to $R^8$ are as defined in General Formula [I]. Preferred embodiments of the configurations are the same as described with respect to General Formula [I]. The raw material compounds may be appropriate isomers having a steric configuration corresponding to the target pentalene compound (1a).

The cyclopentadiene derivative (1a-1), and the fluorene derivative (2a) and the precursor compound (3a) described later have isomeric forms having double bonds at different positions in the cyclopentadienyl ring. The reactions here illustrate only one exemplary form of such isomers. The cyclopentadiene derivative (1a-1), and the fluorene derivative (2a) and the precursor compound (3a) described later may be other isomers having double bonds at different positions in the cyclopentadienyl ring, or may be mixtures of such isomers.

⟨ Reaction [A]⟩

Based on Reaction [A], the pentalene compound (1a) may be produced by reacting a cyclopentadiene derivative (1a-1) with an α,β-unsaturated carbonyl compound (1a-2) under known conditions (see, for example, J. Org. Chem. 1989, 54, 4981-4982).

Alternatively, the pentalene compound (1a) may be produced based on Reaction [A] by a process (process A') in which a cyclopentadiene derivative (1a-1) is treated with a base and is allowed to undergo 1,4-addition to an α,β-unsaturated carbonyl compound (1a-2) to give a ketone or an aldehyde, which is thereafter dehydration condensed.

The base used in the process A' may be a conventional base, with examples including alkali metals such as sodium, potassium and lithium; alkali metal or alkaline earth metal salts such as potassium hydroxide, sodium hydroxide, potassium carbonate, sodium hydrogen carbonate, barium hydroxide, sodium alkoxide, potassium alkoxide, magnesium hydroxide, magnesium alkoxide, potassium hydride and sodium hydride; nitrogen-containing bases such as diethylamine, ammonia, pyrrolidine, piperidine, aniline, methylaniline, triethylamine, lithiumdiisopropylamide and sodium amide; organic alkali metal compounds such as butyllithium, methyllithium and phenyllithium; and Grignard reagents such as methylmagnesium chloride, methylmagnesium bromide and phenylmagnesium chloride.

The process A' may involve a catalyst to perform the reaction more efficiently. The catalyst may be a conventional catalyst, with examples including phase transfer catalysts, specifically, crown ethers such as 18-crown-6-ether and 15-crown-5-ether; cryptands; quaternary ammonium salts such as tetrabutylammonium fluoride, methyltrioctylammonium chloride and tricaprylmethylammonium chloride; phosphonium salts such as methyltriphenylphosphonium bromide and tetrabutylphosphonium bromide; and chain polyethers. Examples further include halides of magnesium, calcium, lithium, zinc, aluminum, titanium, iron, zirconium, hafnium, boron, tin and rare earths; Lewis acids such as triflates; and acids such as acetic acid, trifluoroacetic acid, trifluoromethanesulfonic acid and para-tolylsulfonic acid. In the process A', the 1,4-addition reaction may be catalyzed by a copper halide such as copper chloride or copper iodide.

⟨ Reaction [B] ⟩

In Reaction [B], a base and/or a catalyst may be added to perform the reaction more efficiently. The bases and the catalysts which may be used in Reaction [B] may be similar to those described in Reaction [A].

In Reaction [B], a cyclopentadiene derivative (1a-1) may be reacted with a carbonyl compound (1a-3) and an aldehyde compound (1a-4) simultaneously, or may be reacted with a carbonyl compound (1a-3) and an aldehyde compound (1a-4) successively in any order. The carbonyl compound (1a-3) or the aldehyde compound (1a-4) may be converted into an enolate with an agent such as lithium propylamide prior to the reaction, or the reaction may involve an enolate corresponding to the carbonyl compound (1a-3) or the aldehyde compound (1a-4) that is synthesized by a known method. Alternatively, the carbonyl compound (1a-3) and the aldehyde compound (1a-4) may be subjected to the reaction under different conditions.

The pentalene compound (1a) may be synthesized by other processes such as those described in Angew. Chem. internal. Edit. 1970, 9, 892-893, J. Am. Chem. SOC. 1985, 107, 5308-5309, and J. Org. Chem. 1990, 55, 4504-4506.

Examples of solvents which may be used in Reactions [A] and [B] include organic solvents, for example, aliphatic hydrocarbons such as pentane, hexane, heptane, cyclohexane and decalin; aromatic hydrocarbons such as benzene, toluene and xylene; ethers such as tetrahydrofuran, diethyl ether, dioxane, 1,2-dimethoxyethane, tert-butyl methyl ether and cyclopentyl methyl ether; halogenated hydrocarbons such as dichloromethane and chloroform; carboxylic acids such as formic acid, acetic acid and trifluoroacetic acid; esters such as ethyl acetate and methyl acetate; amines, nitriles or nitrogen-containing compounds such as triethylamine, pyrrolidine, piperidine, aniline, pyridine and acetonitrile; alcohols such as methanol, ethanol, n-propanol, isopropanol, n-butanol, ethylene glycol and methoxyethanol; amides such as N,N-dimethylformamide, N,N-dimethylacetamide, N,N-dimethylimidazolidinone and N-methylpyrrolidone; dimethyl sulfoxide; sulfur-containing compounds such as carbon disulfide; and ketones such as acetone and methyl ethyl ketone, in particular, aldehyde and ketone used raw materials; and further include non-organic solvents such as water and ionic liquids. Mixtures of two or more of these solvents are also usable. The reaction temperature in Reactions [A] and [B] is preferably −100 to 150° C., and more preferably −40 to 120° C.

⟨ Step (2) ⟩

In an embodiment, the step (1) is followed by a step (2) in which the pentalene compound (1a) is reacted with a fluorene derivative (2a) to form a precursor compound (3a) of a transition metal compound [I].

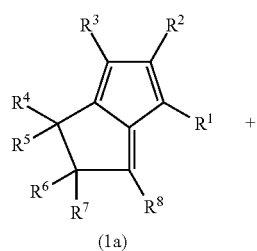

(1a)

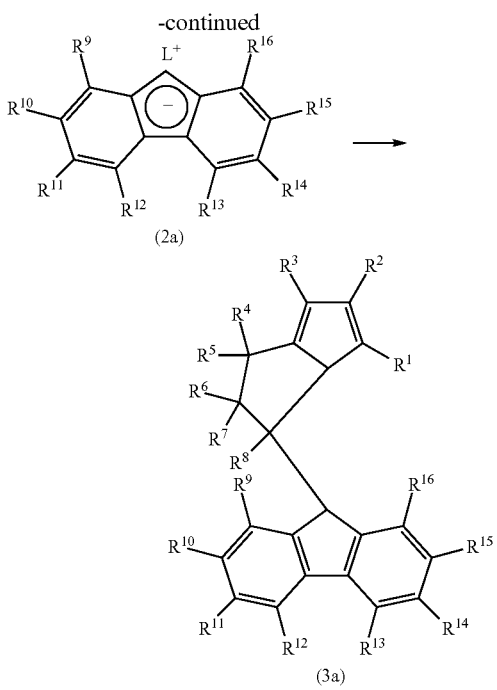

In the above reaction, $R^1$ to $R^{16}$ are as defined in General Formula [I], and L is an alkali metal or an alkaline earth metal. Examples of the alkali metals include lithium, sodium and potassium. Examples of the alkaline earth metals include magnesium and calcium.

The precursor compound (3a) can form a complex in such a manner that the hydrogen atom ($R^4$) bonded to the α-position relative to the cyclopentadiene ring comes on the same side as the central metal due to reasons such as the difference in size between $R^4$ (hydrogen atom) and $R^5$.

The fluorene derivative (2a) may be obtained by a conventional method.

Examples of organic solvents which may be used in the above reaction include aliphatic hydrocarbons such as pentane, hexane, heptane, cyclohexane and decalin; aromatic hydrocarbons such as benzene, toluene and xylene; ethers such as tetrahydrofuran, diethyl ether, dioxane, 1,2-dimethoxyethane, tert-butyl methyl ether and cyclopentyl methyl ether; halogenated hydrocarbons such as dichloromethane and chloroform; and mixtures of two or more of these solvents.

The pentalene compound (1a) and the fluorene derivative (2a) are preferably reacted in a molar ratio of 10:1 to 1:10, more preferably 2:1 to 1:2, and particularly preferably 1.2:1 to 1:1.2. The reaction temperature is preferably −100 to 150° C., and more preferably −40 to 120° C.

An example will be described below in which a transition metal compound [I] is produced from the precursor compound (3a). The scope of the invention is not limited to this example, and the transition metal compound [I] may be produced by any known processes.

⟨ Synthesis of Dialkali Metal Salt ⟩

The precursor compound (3a) is brought into contact with at least one metal component selected from alkali metals, alkali metal hydrides, alkali metal alkoxides, organic alkali metals and organic alkaline earth metals, in an organic solvent to give a dialkali metal salt.

Examples of the alkali metals for use in the above reaction include lithium, sodium and potassium. Examples of the alkali metal hydrides include sodium hydride and potassium hydride. Examples of the alkali metal alkoxides include sodium methoxide, potassium ethoxide, sodium ethoxide and potassium-tert-butoxide. Examples of the organic alkali metals include methyllithium, butyllithium and phenyllithium. Examples of the organic alkaline earth metals include methylmagnesium halides, butylmagnesium halides and phenylmagnesium halides. Two or more of these metal components may be used in combination.

Examples of the organic solvents for use in the above reaction include aliphatic hydrocarbons such as pentane, hexane, heptane, cyclohexane and decalin; aromatic hydrocarbons such as benzene, toluene and xylene; ethers such as tetrahydrofuran, diethyl ether, dioxane, 1,2-dimethoxyethane, tert-butyl methyl ether and cyclopentyl methyl ether; halogenated hydrocarbons such as dichloromethane and chloroform; and mixtures of two or more of these solvents.

The precursor compound (3a) and the metal component are preferably reacted in a molar ratio (precursor compound (3a):metal component) of 1:1 to 1:20, more preferably 1:1.5 to 1:4, and particularly preferably 1:1.8 to 1:2.5. The reaction temperature is preferably −100 to 200° C., and more preferably −80 to 120° C.

Lewis bases such as tetramethylethylenediamine, and compounds described in WO 2009/072505 such as α-methylstyrene may be used to promote the reaction.

⟨ Synthesis of Transition Metal Compound ⟩

The dialkali metal salt obtained by the above reaction is reacted with a compound represented by General Formula (4a) in an organic solvent to give a transition metal compound [I].

$$MZ_k \quad (4a)$$

In Formula (4a), M is a Group IV transition metal; Zs are each independently a halogen atom, a hydrocarbon group, an anionic ligand, or a neutral ligand coordinatable with a lone electron pair; and k is an integer of 3 to 6. The atoms, groups and the like represented by M and Z are similar to M and Q, respectively, described in General Formula [I].

Examples of the compounds (4a) include titanium (III or IV) fluoride, chloride, bromide and iodide; zirconium (IV) fluoride, chloride, bromide and iodide; hafnium (IV) fluoride, chloride, bromide and iodide; and complexes of these halides with ethers such as tetrahydrofuran, diethyl ether, dioxane and 1,2-dimethoxyethane.

Examples of the organic solvents used in the above reaction include the organic solvents described in (Synthesis of dialkali metal salt). The dialkali metal salt and the compound (4a) are preferably reacted in a molar ratio of 10:1 to 1:10, more preferably 2:1 to 1:2, and particularly preferably 1.2:1 to 1:1.2. The reaction temperature is preferably −80 to 200° C., and more preferably −75 to 120° C.

⟨ Other Processes ⟩

In another process, the precursor compound (3a) may be reacted directly with an organometallic reagent such as tetrabenzyltitanium, tetrabenzylzirconium, tetrabenzylhafnium, tetrakis(trimethylsilylmethylene)titanium, tetrakis(trimethylsilylmethylene)zirconium, tetrakis(trimethylsilylmethylene)hafnium, dibenzyldichlorotitanium, dibenzyldichlorozirconium, dibenzyldichlorohafnium, or an amide salt of titanium, zirconium or hafnium.

The transition metal compound [I] obtained by the aforementioned reaction may be isolated and purified by methods such as extraction, recrystallization and sublimation. The transition metal compound [I] obtained by the aforementioned process may be identified by analytical methods such as proton nuclear magnetic resonance spectrometry, $^{13}$C-nuclear magnetic resonance spectrometry, mass analysis and elemental analysis.

[Olefin Polymerization Catalysts]

The olefin polymerization catalyst used in the invention includes at least one transition metal compound (A) selected from the transition metal compounds represented by General Formula [I] and enantiomers thereof.

Preferably, the olefin polymerization catalyst used in the invention further includes at least one compound (B) selected from organometallic compounds (B-1), organoaluminum-oxy compounds (B-2), and compounds (B-3) capable of reacting with the transition metal compound (A) to form an ion pair (hereinafter, the compound is also written as the "compound (B)").

More preferably, the olefin polymerization catalyst of the invention further includes a carrier (C) as required.

The olefin polymerization catalyst of the invention may further include an organic compound component (D) as required.

Hereinbelow, the components other than the transition metal compound (A) will be described in detail.

⟨ Compounds (B) ⟩

⟨⟨ Organometallic Compounds (B-1) ⟩⟩

Examples of the organometallic compounds (B-1) include organometallic compounds of Group I, II, XII and XIII metals such as organoaluminum compounds represented by General Formula (B-1a), alkyl complex compounds of Group I metals and aluminum represented by General Formula (B-1b), and dialkyl compounds of Group II or XII metals represented by General Formula (B-1c).

$$Ra_mAl(ORb)_nH_pX_q \quad (B\text{-}1a):$$

In Formula (B-1a), Ra and Rb are each independently a hydrocarbon group having 1 to 15, preferably 1 to 4 carbon atoms, X is a halogen atom, $0<m\leq3$, $0\leq n<3$, $0\leq p<3$, $0\leq q<3$, and $m+n+p+q=3$. Examples of the organoaluminum compounds (B-1a) include trialkylaluminums such as trimethylaluminum, triethylaluminum and triisobutylaluminum; dialkylaluminum hydrides such as diisobutylaluminum hydride; and tricycloalkylaluminums.

$$M2AlRa_4 \quad (B\text{-}1b):$$

In Formula (B-1b), M2 is Li, Na or K, and Ra is a hydrocarbon group having 1 to 15, preferably 1 to 4 carbon atoms. Examples of the alkyl complex compounds (B-1b) include LiAl $(C_2H_5)_4$ and LiAl$(C_7H_{15})_4$.

$$RaRbM3 \quad (B\text{-}1c):$$

In Formula (B-1c), Ra and Rb are each independently a hydrocarbon group having 1 to 15, preferably 1 to 4 carbon atoms, and M3 is Mg, Zn or Cd. Examples of the compounds (B-1c) include dimethylmagnesium, diethylmagnesium, di-n-butylmagnesium, diethylzinc, di-n-butylzinc and diphenylzinc.

Of the organometallic compounds (B-1), the organoaluminum compounds (B-1a) are preferred.

The organometallic compounds (B-1) may be used singly, or two or more may be used in combination.

⟨⟨ Organoaluminum-oxy Compounds (B-2) ⟩⟩

For example, the organoaluminum-oxy compounds (B-2) may be conventional aluminoxanes, or may be organoaluminum-oxy compounds described in JP-A-H02-78687 which are insoluble or negligibly soluble in benzene. For example, the conventional aluminoxanes may be prepared by the following processes (1) to (4), and are usually obtained as a solution in a hydrocarbon solvent.

(1) An organoaluminum compound such as trialkylaluminum is added to a hydrocarbon medium suspension of a compound containing adsorbed water or a salt containing water of crystallization, for example, magnesium chloride hydrate, copper sulfate hydrate, aluminum sulfate hydrate, nickel sulfate hydrate or cerous chloride hydrate, thereby reacting the organoaluminum compound with the adsorbed water or the water of crystallization.

(2) Water, ice or water vapor is allowed to act directly on an organoaluminum compound such as trialkylaluminum in a medium such as benzene, toluene, diethyl ether or tetrahydrofuran.

(3) An organoaluminum compound such as trialkylaluminum is reacted with an organotin oxide such as dimethyltin oxide or dibutyltin oxide in a medium such as decane, benzene or toluene.

(4) An organoaluminum such as trialkylaluminum is reacted with an organic compound having a carbon-oxygen bond such as a tertiary alcohol, a ketone or a carboxylic acid, and the resultant compound is non-hydrolytically converted by thermal decomposition or the like.

The aluminoxane may contain a small amount of organometallic components. After the solvent or the unreacted organoaluminum compound is removed by distillation from the recovered solution of the aluminoxane, the residue may be redissolved in a solvent or suspended in a poor solvent for the aluminoxane.

Specific examples of the organoaluminum compounds used in preparing the aluminoxanes include the organoaluminum compounds mentioned above as the organoaluminum compounds (B-1a). Of those compounds, trialkylaluminums and tricycloalkylaluminums are preferred, and trimethylaluminum is particularly preferred.

Examples of the organoaluminum-oxy compounds (B-2) further include modified methylaluminoxanes. The modified methylaluminoxanes are aluminoxanes prepared from trimethylaluminum and an alkylaluminum other than trimethylaluminum. Such compounds are generally called MMAOs. The MMAOs may be prepared by methods described in U.S. Pat. Nos. 4,960,878 and 5,041,584. Further, aluminoxanes in which R is an isobutyl group are commercially produced from trimethylaluminum and triisobutylaluminum by manufacturers such as Toso Finechem Corporation, the compounds being sold under the trade names of MMAO and TMAO.

These MMAOs are aluminoxanes that are improved in solubility in solvents and in storage stability. Specifically, such aluminoxanes are characterized in that they are dissolved contrast to the aforementioned aluminoxanes which are insoluble or negligibly soluble in benzene.

Examples of the organoaluminum-oxy compounds (B-2) further include boron-containing organoaluminum-oxy compounds, halogen-containing aluminoxanes described in WO 2005/066191 and WO 2007/131010, and ionic aluminoxanes described in WO 2003/082879.

The compounds (B-2) may be used singly, or two or more may be used in combination.

《《 Compounds (B-3) Capable of Reacting with Transition Metal Compound (A) to Form Ion Pair 》》

Examples of the compounds (B-3) capable of reacting with the transition metal compound (A) to form an ion pair (hereinafter, also written as "ionic compounds (B-3)") include Lewis acids, ionic compounds, borane compounds and carborane compounds described in, for example, JP-A-H01-501950, JP-A-H01-502036, JP-A-H03-179005, JP-A-H03-179006, JP-A-H03-207703, JP-A-H03-207704 and U.S. Pat. No. 5,321,106. Examples further include heteropoly compounds and isopoly compounds.

Preferred ionic compounds (B-3) are compounds represented by General Formula (B-3a).

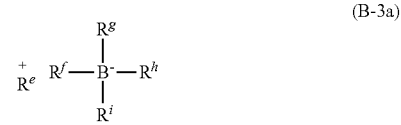

Examples of $R^{e+}$ in Formula (B-3a) include $H^+$, carbenium cations, oxonium cations, ammonium cations, phosphonium cations, cycloheptyltrienyl cations and ferrocenium cations having transition metals. $R^f$ to $R^i$ are each independently an organic group, and preferably an aryl group.

Examples of the carbenium cations include trisubstituted carbenium cations such as triphenylcarbenium cation, tris(methylphenyl)carbenium cation and tris(dimethylphenyl)carbenium cation.

Examples of the ammonium cations include trialkylammonium cations such as trimethylammonium cation, triethylammonium cation, tri(n-propyl)ammonium cation, triisopropylammonium cation, tri(n-butyl)ammonium cation and triisobutylammonium cation; N,N-dialkylanilinium cations such as N,N-dimethylanilinium cation, N,N-diethylanilinium cation and N,N-2,4,6-pentamethylanilinium cation; and dialkylammonium cations such as diisopropylammonium cation and dicyclohexylammonium cation.

Examples of the phosphonium cations include triarylphosphonium cations such as triphenylphosphonium cation, tris(methylphenyl)phosphonium cation and tris(dimethylphenyl)phosphonium cation.

For example, $R^{e+}$ is preferably a carbenium cation or an ammonium cation, and particularly preferably triphenylcarbenium cation, N,N-dimethylanilinium cation or N,N-diethylanilinium cation.

Examples of the carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

Examples of the ammonium salts include trialkyl-substituted ammonium salts, N,N-dialkylanilinium salts and dialkylammonium salts.

Examples of the trialkyl-substituted ammonium salts include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, and dioctadecylmethylammonium tetrakis(3,5-ditrifluoromethylphenyl)borate.

Examples of the N,N-dialkylanilinium salts include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, and N,N-2,4,6-pentamethylanilinium tetrakis(pentafluorophenyl)borate.

Examples of the dialkylammonium salts include di(1-propyl)ammonium tetrakis(pentafluorophenyl)borate, and dicyclohexylammonium tetraphenylborate.

Further, ionic compounds disclosed by the present applicant (for example, JP-A-2004-51676) may also be used as the ionic compounds (B-3) without limitation.

The ionic compounds (B-3) may be used singly, or two or more may be used in combination.

⟨Carriers (C)⟩

Examples of the carriers (C) include inorganic or organic compounds in the form of granular or fine particulate solid. It is preferable to use the transition metal compound (A) supported on the carrier (C).

⟨⟨Inorganic Compounds⟩⟩

Preferred inorganic compounds as the carriers (C) are porous oxides, inorganic chlorides, clays, clay minerals and ion-exchangeable layered compounds.

Examples of the porous oxides include oxides such as $SiO_2$, $Al_2O_3$, MgO, $ZrO_2$, $TiO_2$, $B_2O_3$, CaO, ZnO, BaO and $ThO_2$, and complexes and mixtures containing these oxides. For example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO may be used. Of these, porous oxides containing $SiO_2$ and/or $Al_2O_3$ as a main component are preferable.

The porous oxides have different properties depending on types and production processes. The carriers that are preferably used in the invention preferably have a particle diameter of 1 to 300 μm, more preferably 3 to 100 μm; a specific surface area of 50 to 1300 $m^2/g$, more preferably 200 to 1200 $m^2/g$; and a pore volume of 0.3 to 3.0 $cm^3/g$, more preferably 0.5 to 2.0 $cm^3/g$. Where necessary, the carriers may be used after being dried and/or calcined at 100 to 1000° C., preferably 150 to 700° C. The shapes of the particles are not particularly limited, but spherical particles are particularly preferable.

Examples of the inorganic chlorides include $MgCl_2$, $MgBr_2$, $MnCl_2$ and $MnBr_2$. The inorganic chlorides may be used as such or may be used after being crushed with a ball mill or an oscillating mill. Further, the inorganic chlorides may be dissolved in solvents such as alcohols and be precipitated as fine particles with precipitating agents.

The clays are usually composed of clay minerals as main components. The ion-exchangeable layered-compounds are compounds having a crystal structure in which planes formed by bonds such as ionic bonds are stacked in parallel on top of one another with a weak bond strength, and in which the ions contained therein are exchangeable. Most clay minerals are ion-exchangeable layered compounds. The clays, the clay minerals and the ion-exchangeable layered compounds are not limited to natural products but may be synthetic products. Examples of such clays, clay minerals and ion-exchangeable layered compounds include clays, clay minerals and ion crystalline compounds having layered crystal structures such as hexagonal closest packed structures, antimony structures, $CdCl_2$ structures and $CdI_2$ structures.

Examples of the clays and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite, halloysite, pectolite and taeniolite.

Examples of the ion-exchangeable layered compounds include crystalline acid salts of polyvalent metals such as α-$Zr(HAsO_4)_2.H_2O$, α-$Zr(HPO_4)_2$, α-$Zr(KPO_4)_2.3H_2O$, α-$Ti(HPO_4)_2$, α-$Ti(HASO_4)_2.H_2O$, α-$Sn(HPO_4)_2.H_2O$, γ-$Zr(HPO_4)_2$, γ-$Ti(HPO_4)_2$ and γ-$Ti(NH_4PO_4)_2.H_2O$.

It is also preferable that the clays and the clay minerals be subjected to chemical treatments. Any chemical treatments may be used, with examples including a surface treatment to remove impurities on the surface and a treatment to modify the crystal structure of the clay. Specific examples of the chemical treatments include acid treatments, alkali treatments, salt treatments and organic treatments.

Utilizing the ion exchange properties, the spaces between the layers in the ion-exchangeable layered compounds may be enlarged by exchanging the exchangeable ions between the layers with other larger and bulkier ions. Such bulky ions serve as columns to support the layered structures and are generally called pillars. The introduction of other substances between layers of layered compounds is called intercalation.

Examples of the guest compounds to be intercalated include cationic inorganic compounds such as $TiCl_4$ and $ZrCl_4$; metal alkoxides such as $Ti(OR)_4$, $Zr(OR)_4$, $FO(OR)_3$ and $B(OR)_3$ (R is a hydrocarbon group or the like); and metal hydroxide ions such as $[Al_{13}O_4(OH)_{24}]^{7+}$, $[Zr_4(OH)_{14}]^{2+}$ and $[Fe_3O(OCOCH_3)_6]^+$. These compounds may be used singly, or two or more may be used in combination. The intercalation of the above compounds may be carried out in the presence of polymers obtained by hydrolysis of metal alkoxides such as $Si(OR)_4$, $Al(OR)_3$ and $Ge(OR)_4$ (R is a hydrocarbon group or the like) or in the presence of colloidal inorganic compounds such as $SiO_2$.

Examples of the pillars include oxides produced by intercalation of the above metal hydroxide ions between layers followed by thermal dehydration.

Of the carriers (C), porous oxides containing $SiO_2$ and/or $Al_2O_3$ as a main component are preferable. The clays and the clay minerals are also preferable, and montmorillonite, vermiculite, pectolite, taeniolite and synthetic mica are particularly preferable.

⟨⟨Organic Compounds⟩⟩

Examples of the organic compounds as the carriers (C) include granular or fine particulate solids having a particle diameter in the range of 5 to 300 μm. Specific examples include (co)polymers produced from an α-olefin having 2 to 14 carbon atoms such as ethylene, propylene, 1-butene or 4-methyl-1-pentene as a main component; (co)polymers produced from vinylcyclohexane or styrene as a main component; and modified products of these polymers.

⟨Organic Compound Components (D)⟩

In the invention, the organic compound component (D) is used as required to improve polymerization performance and to enhance properties of the obtainable polymers. Examples of the organic compounds (D) include alcohols, phenolic compounds, carboxylic acids, phosphorus compounds, amides, polyethers and sulfonate salts.

⟨Use and Sequence of Addition of Components⟩

In the olefin polymerization, the components may be used and added in appropriately selected manners and orders. For example, the components may be used and added as described below. In the following, the transition metal compound (A), the compound (B), the carrier (C) and the organic compound component (D) are also written as "components (A) to (D)".

(1) The component (A) alone is added to a polymerization reactor.

(2) The component (A) and the component (B) are added to a polymerization reactor in any order.

(3) A catalyst component in which the component (A) is supported on the component (C), and the component (B) are added to a polymerization reactor in any order.

(4) A catalyst component in which the component (B) is supported on the component (C), and the component (A) are added to a polymerization reactor in any order.

(5) A catalyst component in which the component (A) and the component (B) are supported on the component (C) is added to a polymerization reactor.

In the methods (2) to (5), two or more of the catalyst components may be brought into contact with each other beforehand. In the methods (4) and (5) in which the component (B) is supported, an unsupported component (B) may be added in any order as required. In this case, the components (B) may be the same as or different from each other. Further, an olefin may be prepolymerized on the solid catalyst component in which the component (A) is supported on the component (C), and the solid catalyst component in which the component (A) and the component (B) are supported on the component (C). Furthermore, an additional catalyst component may be supported on the prepolymerized solid catalyst component.

[Olefin Polymer Production Processes]

The olefin polymer production process of the present invention includes a step of polymerizing at least one olefin A selected from ethylene and α-olefins having 4 to 30 carbon atoms optionally with propylene in the presence of the olefin polymerization catalyst described above. Here, the term "polymerization" is used as a collective term including homopolymerization and copolymerization. Further, the meaning of the phrase "olefins are polymerized in the presence of the olefin polymerization catalyst" includes embodiments in which olefins are polymerized while the components of the olefin polymerization catalyst are added to the polymerization reactor in an appropriate manner as described in the methods (1) to (5) above.

In the invention, the polymerization may be carried out by any of liquid-phase polymerization methods such as solution polymerization and suspension polymerization, and gas-phase polymerization methods. Examples of inert hydrocarbon solvents used in the liquid-phase polymerization methods include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; and halogenated hydrocarbons such as ethylene chloride, chlorobenzene and dichloromethane. The inert hydrocarbon solvents may be used singly, or two or more may be used in combination. A so-called bulk polymerization method may be used in which the liquefied olefin supplied to the polymerization itself is used as the solvent.

In the polymerization of olefins using the olefin polymerization catalyst, the components that form the olefin polymerization catalyst may be used in the following amounts. In the olefin polymerization catalyst, the contents of the components may be controlled as described below.

The component (A) is usually used in an amount of $10^{-10}$ to $10^{-2}$ mol, and preferably $10^{-8}$ to $10^{-3}$ mol per liter of the reaction volume. The component (B-1) may be used in such an amount that the molar ratio [(B-1)/M] of the component (B-1) to all the transition metal atoms (M) in the component (A) is usually 1 to 50,000, preferably 10 to 20,000, and particularly preferably 50 to 10,000. The component (B-2) may be used in such an amount that the molar ratio [Al/M] of the aluminum atoms in the component (B-2) to all the transition metal atoms (M) in the component (A) is usually 10 to 5,000, and preferably 20 to 2,000. The component (B-3) may be used in such an amount that the molar ratio [(B-3)/M] of the component (B-3) to all the transition metal atoms (M) in the component (A) is usually 1 to 1000, and preferably 1 to 200.

When the component (C) is used, the amount thereof may be preferably such that the weight ratio [(A)/(C)] of the component (A) to the component (C) is 0.0001 to 1, more preferably 0.0005 to 0.5, and still more preferably 0.001 to 0.1.

When the component (D) is used, the amount thereof may be such that, when the component (B) is the component (B-1), the molar ratio [(D)/(B-1)] is usually 0.01 to 10, and preferably 0.1 to 5; when the component (B) is the component (B-2), the molar ratio [(D)/(B-2)] is usually 0.005 to 2, and preferably 0.01 to 1; and when the component (B) is the component (B-3), the molar ratio [(D)/(B-3)] is usually 0.01 to 10, and preferably 0.1 to 5.

In the production process of the invention, the olefin polymerization temperature is usually −50 to +200° C., and preferably 0 to 180° C.; and the polymerization pressure is usually atmospheric pressure to 10 MPaG, and preferably atmospheric pressure to 5 MPaG. The polymerization reaction may be carried out batchwise, semi-continuously or continuously. The polymerization may be carried out in two or more stages under different reaction conditions. The molecular weight of the obtainable olefin polymers may be adjusted by the presence of hydrogen and so on in the polymerization system, by controlling the polymerization temperature, or by controlling the amount of the component (B) used.

The production process of the invention can produce olefin polymers which have high stereoregularity, high melting point and high molecular weight, in such a manner that high catalytic activity is maintained even under industrially advantageous high-temperature conditions. Under such high-temperature conditions, the polymerization temperature is usually 40° C. or above, preferably 40 to 200° C., more preferably 45 to 150° C., and particularly preferably 50 to 150° C. (In other words, the polymerization temperature is particularly preferably a temperature at which industrial production is feasible.)

In particular, hydrogen is a preferred additive which may enhance the polymerization activity of the catalyst and may increase or decrease the molecular weight of polymers. When hydrogen is added to the system, the amount thereof is appropriately about 0.00001 to 100 NL per 1 mol of the olefin. The hydrogen concentration in the system may be controlled by adjusting the amount of hydrogen supplied, or also by performing a reaction in the system which generates or consumes hydrogen, by separating hydrogen with use of a membrane, or by discharging part of the gas containing hydrogen out of the system.

Olefin polymers synthesized by the inventive production process may be subjected to known post treatment steps such as catalyst deactivation step, residual catalyst removal step and drying step as required.

⟨Olefins⟩

The olefin supplied to the polymerization reaction in the inventive production process is at least one olefin A selected from ethylene and α-olefins having 4 to 30 carbon atoms, which may be used in combination with propylene as needed.

The olefin is an α-olefin having 4 to 30 carbon atoms, more preferably an α-olefin having 4 to 20 carbon atoms, and is particularly preferably an α-olefin having 4 to 10 carbon atoms.

Examples of the α-olefins include linear or branched α-olefins. Examples of the linear or branched α-olefins include 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-heptadecene, 1-octadecene and 1-eicosene.

The polymerization may be performed in the presence of at least one selected from cyclic olefins, polar group-containing olefins, hydroxyl-terminated vinyl compounds and aromatic vinyl compounds in the reaction system. Further, the polymerization may involve polyenes. Additional monomers such as vinylcyclohexane may be copolymerized without departing from the spirit of the invention.

Examples of the cyclic olefins include cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

Examples of the polar group-containing olefins include α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic anhydride, and metal salts thereof such as sodium salts, potassium salts, lithium salts, zinc salts, magnesium salts, calcium salts and aluminum salts;

α,β-unsaturated carboxylate esters such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate;

vinyl esters such as vinyl acetate, vinyl propionate, vinyl caproate, vinyl caprate, vinyl laurate, vinyl stearate and vinyl trifluoroacetate; and unsaturated glycidyls such as glycidyl acrylate, glycidyl methacrylate and itaconic acid monoglycidyl ester.

Examples of the hydroxyl-terminated vinyl compounds include linear hydroxyl-terminated vinyl compounds such as hydroxylated-1-butene, hydroxylated-1-pentene, hydroxylated-1-hexene, hydroxylated-1-octene, hydroxylated-1-decene, hydroxylated-1-undecene, hydroxylated-1-dodecene, hydroxylated-1-tetradecene, hydroxylated-1-hexadecene, hydroxylated-1-octadecene and hydroxylated-1-eicosene; and branched hydroxyl-terminated vinyl compounds such as hydroxylated-3-methyl-1-butene, hydroxylated-3-methyl-1-pentene, hydroxylated-4-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene and hydroxylated-3-ethyl-1-hexene.

Examples of the aromatic vinyl compounds include styrene; mono- or polyalkylstyrenes such as o-methylstyrene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinyl benzyl acetate, hydroxystyrene, o-chlorostyrene, p-chlorostyrene and divinylbenzene; 3-phenylpropylene, 4-phenylpropylene and α-methylstyrene.

The polyenes are preferably selected from dienes and trienes. In a preferred embodiment, the polyene is used in the range of 0.0001 to 1 mol % relative to all the olefins supplied to the polymerization reaction.

Examples of the dienes include α,ω-nonconjugated dienes such as 1,4-pentadiene, 1,5-hexadiene, 1,4-hexadiene, 1,4-octadiene, 1,5-octadiene, 1,6-octadiene, 1,7-octadiene and 1,9-decadiene; nonconjugated dienes such as ethylidenenorbornene, vinylnorbornene, dicyclopentadiene, 7-methyl-1,6-octadiene and 4-ethylidene-8-methyl-1,7-nonadiene; and conjugated dienes such as butadiene and isoprene. Of these, the α,ω-nonconjugated dienes and dienes having a norbornene skeleton are preferred.

Examples of the trienes include nonconjugated trienes such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6,-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecanediene; and conjugated trienes such as 1,3,5-hexatriene. Of these, nonconjugated trienes having a double bond at an end, 4,8-dimethyl-1,4,8-decatriene and 4-ethylidene-8-methyl-1,7-nonadiene (EMND) are preferable.

The dienes or trienes may be used singly, or two or more may be used in combination. Further, the dienes and the trienes may be used in combination. Of the polyenes, the α,ω-nonconjugated dienes and the polyenes having a norbornene skeleton are preferred.

In the olefin polymer production process of the invention, it is more preferable that at least one of the olefin(s) A be ethylene, 1-butene, 4-methyl-1-pentene, 1-hexene, 1-octene or 1-decene. Particularly preferably, the polymerization is ethylene homopolymerization, ethylene/propylene copolymerization, ethylene/1-butene copolymerization, 1-butene homopolymerization, 1-butene/ethylene copolymerization, 1-butene/propylene copolymerization, 1-butene/1-hexene copolymerization, 1-butene/1-octene copolymerization, ethylene/1-butene/propylene copolymerization, ethylene/1-butene/1-octene copolymerization, 4-methyl-1-pentene homopolymerization, 4-methyl-1-pentene/propylene copolymerization, 4-methyl-1-pentene/1-hexene copolymerization, 4-methyl-1-pentene/1-octene copolymerization, 4-methyl-1-pentene/1-decene copolymerization, 4-methyl-1-pentene/1-hexadecene copolymerization, 4-methyl-1-pentene/1-heptadecene copolymerization, 4-methyl-1-pentene/1-octadecene copolymerization, 4-methyl-1-pentene/1-hexadecene/1-octadecene copolymerization, 1-decene homopolymerization, 1-decene/1-octene copolymerization, 1-decene/1-dodecene copolymerization, or 1-decene/1-octene/1-dodecene copolymerization.

In the case where the optional propylene is used, the at least one olefin A selected from ethylene and α-olefins having 4 to 30 carbon atoms, and the propylene are used in such amounts that the olefin(s) A:propylene ratio (by mol) is usually 1:100 to 5000:1, and preferably 1:50 to 1000:1.

[Olefin Polymers]

The olefin polymers of the invention may be obtained by polymerizing at least one olefin A selected from ethylene and α-olefins having 4 to 30 carbon atoms, and optionally propylene in the presence of the aforementioned olefin polymerization catalyst.

The olefin polymer of the invention contains constituent units derived from the at least one selected from ethylene and α-olefins having 4 to 30 carbon atoms in a total amount of from more than 50 mol % to 100 mol %, preferably from 55 to 100 mol %, and still more preferably from 70 to 100 mol %, and constituent units derived from propylene in an amount of from 0 mol % to less than 50 mol %, preferably 0 to 45 mol %, and still more preferably 0 to 30 mol %. Here, the content of the constituent units derived from the at least one selected from ethylene and α-olefins having 4 to 30 carbon atoms and the content of the constituent units derived from propylene total 100 mol %.

The contents of these units may be determined by nuclear magnetic resonance spectroscopy or, in the case where there is a reference substance, by a method such as infrared spectroscopy. The same applies to the novel 1-butene polymers and 4-methyl-1-pentene polymers described later.

The olefin polymer of the invention preferably contains constituent units derived from at least one selected from ethylene, 1-butene, 4-methyl-1-pentene, 1-hexene, 1-octene and 1-decene in a total amount of more than 50 mol %. More specifically, examples of such polymers include ethylene homopolymers, ethylene/propylene copolymers, ethylene/1-butene copolymers, 1-butene homopolymers, 1-butene/ethylene copolymers, 1-butene/propylene copolymers, 1-butene/1-hexene copolymers, 1-butene/1-octene copolymers, ethylene/1-butene/propylene copolymers, ethylene/1-butene/1-octene copolymers, 4-methyl-1-pentene homopolymers, 4-methyl-1-pentene/propylene copolymers, 4-methyl-1-pentene/1-hexene copolymers, 4-methyl-1-pentene/1-octene copolymers, 4-methyl-1-pentene/1-decene copolymers, 4-methyl-1-pentene/1-hexadecene copolymers, 4-methyl-1-pentene/1-heptadecene copolymers, 4-methyl-1-pentene/1-octadecene copolymers, 4-methyl-1-pentene/1-hexadecene/1-octadecene copolymers, 1-decene homopolymers, 1-decene/1-octene copolymers, 1-decene/1-dodecene copolymers and 1-decene/1-octene/1-dodecene copolymers. Of these polymers, particularly preferred polymers are 1-butene polymers containing more than 50 mol % of constituent units derived from 1-butene, and 4-methyl-1-pentene polymers containing more than 50 mol % of constituent units derived from 4-methyl-1-pentene.

In the olefin polymers of the invention, the weight-average molecular weight measured by gel permeation chromatography (GPC) is preferably 10,000 to 5,000,000, more preferably 50,000 to 3,000,000, and particularly preferably 100,000 to 2,500,000. The ratio of the weight-average molecular weight (Mw) to the number-average molecular weight (Mn), namely, the molecular weight distribution (Mw/Mn) is preferably 1.0 to 8.0, more preferably 1.5 to 5.0, and particularly preferably 1.8 to 3.5.

In the olefin polymers of the invention, the intrinsic viscosity [η] is preferably 0.1 to 20 dl/g, more preferably 0.3 to 10 dl/g, and still more preferably 0.5 to 8 dl/g.

In the olefin polymers of the invention, the stereoregularity of the α-olefin-derived constituent units is preferably isotactic or hemiisotactic. More preferably, the meso diad fraction measured by $^{13}$C-NMR is not less than 70%, still more preferably not less than 80%, further preferably not less than 90%, and particularly preferably not less than 95%.

Details of the measurements of these properties are described in Examples.

With the aforementioned configurations and properties (in particular, high stereoregularity), the olefin polymers of the invention are crystalline olefin polymers exhibiting high melting point, high heat resistance and high mechanical properties such as high rigidity and high strength, or amorphous or low-crystalline olefin polymers exhibiting both viscous properties and elastic properties.

The olefin polymers of the invention may be partially graft-modified with polar monomers. Examples of such polar monomers include hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids or derivatives thereof, vinyl ester compounds, vinyl chlorides, vinyl group-containing organosilicon compounds and carbodiimide compounds.

Particularly preferred polar monomers are unsaturated carboxylic acids or derivatives thereof, and vinyl group-containing organosilicon compounds.

Examples of the unsaturated carboxylic acids or derivatives thereof include unsaturated compounds having one or more carboxyl groups, esters of carboxyl compounds with alkyl alcohols, and unsaturated compounds having one or more carboxylic anhydride groups. Examples of the unsaturated groups include vinyl groups, vinylene groups and unsaturated cyclic hydrocarbon groups. These compounds may be any known compounds without limitation. Specific examples include unsaturated carboxylic acids such as (meth)acrylic acid, maleic acid, fumaric acid, tetrahydrophthalic acid, itaconic acid, citraconic acid, crotonic acid, isocrotonic acid and nadic acid [trade name] (endocis-bicyclo[2.2.1]hept-5-ene-2,3-dicarboxylic acid); and derivatives thereof such as acid halides, amides, imides, anhydrides and esters. Specific examples of such derivatives include methyl acrylate, methyl methacrylate, dimethyl maleate, monomethyl maleate, dimethyl fumarate, dimethyl itaconate, diethyl citraconate, dimethyl tetrahydrophthalate, dimethyl nadicate (dimethyl endocis-bicyclo[2,2,1]hept-5-ene-2,3-dicarboxylate), malenyl chloride, maleimide, maleic anhydride, citraconic anhydride, and glycidyl maleate. These unsaturated carboxylic acids and derivatives thereof may be used singly, or two or more may be used in combination. Of these compounds, unsaturated dicarboxylic acids or acid anhydrides thereof are preferred. In particular, maleic acid, nadic acid [trade name] and acid anhydrides thereof are preferably used.

The vinyl group-containing organosilicon compounds may be any known such compounds without limitation. Specific examples include vinyltriethoxysilane, vinyltrimethoxysilane, vinyltris(β-methoxy-ethoxysilane), γ-glycidoxypropyltrimethoxysilane, γ-aminopropyltriethoxysilane, γ-methacryloxypropyltrimethoxysilane, 2-(3,4-epoxycyclohexyl)ethyltrimethoxysilane, 3-glycidoxypropyltrimethoxysilane, 3-glycidoxypropylmethylethoxysilane, p-styryltrimethoxysilane, 3-methacryloxypropylmethyldimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-triethoxysilyl-N-(1,3-dimethyl-butylidene)propylamine, N-phenyl-3-aminopropyltrimethoxysilane, 3-ureidopropyltriethoxysilane and 3-isocyanatopropyltriethoxysilane.

γ-Glycidoxypropyltrimethoxysilane, γ-aminopropyltriethoxysilane, γ-methacryloxypropyltrimethoxysilane, vinyltriethoxysilane, vinyltrimethoxysilane and 3-acryloxypropyltrimethoxysilane are preferable. Vinyltriethoxysilane, vinyltrimethoxysilane and 3-acryloxypropyltrimethoxysilane having small steric hindrance and high graft modification efficiency are more preferable.

The polar monomer is usually used in an amount of 1 to 100 parts by weight, and preferably 5 to 80 parts by weight per 100 parts by weight of the olefin polymer of the invention.

The polar monomers may be used singly, or two or more may be used in combination.

The graft polymerization is usually performed in the presence of a radical initiator.

Examples of the radical initiators include organic peroxides and azo compounds. Any known such compounds may be used, with specific examples including dialkyl peroxides such as dicumyl peroxide, di-t-butyl peroxide, di-t-butyl peroxy-3,3,5-trimethylcyclohexane, t-butylcumyl peroxide, di-t-amyl peroxide, t-butyl hydroperoxide, 2,5-dimethyl-2,5-di(t-butylperoxy)hexyne-3,2,5-dimethyl-2,5-di(benzoylperoxy)hexane, 2,5-dimethyl-2,5-di(t-butylperoxy)hexane and α,α'-bis(t-butylperoxy-m-isopropyl)benzene; peroxyesters such as t-butyl peroxyacetate, t-butyl peroxyisobutyrate, t-butyl peroxypivalate, t-butyl peroxymaleate, t-butyl peroxyneodecanoate, t-butyl peroxybenzoate and di-t-butyl peroxyphthalate; ketone peroxides such as dicyclohexanone peroxide; and mixtures thereof.

The radical initiator may be directly mixed together with the polymer and the polar monomer, or may be used after being dissolved in a small amount of an organic solvent. The organic solvent is not particularly limited as long as the organic solvent can dissolve the radical initiator.

The graft polymerization of the polar monomer may involve a reductive substance. The use of a reductive substance may increase the amount in which the polar monomer is grafted.

The graft modification may be performed by a known method. For example, the polymer may be dissolved in an organic solvent, then the additives such as the polar monomer and the radical initiator may be added to the solution, and the reaction may be performed at 60 to 260° C., preferably 80 to 200° C. for 0.5 to 15 hours, preferably 1 to 10 hours.

Alternatively, the polymer and the polar monomer may be reacted with each other in the absence of solvents in a device such as an extruder. The reaction in this case is desirably performed at a temperature that is usually not less than the melting point of the polymer, specifically, at a temperature of 120 to 300° C. for 0.5 to 10 minutes.

The amount of modification (the amount of the polar monomer grafted) in the polymer obtained by the above method is usually 0.1 to 50 wt %, preferably 0.2 to 30 wt %, and more preferably 0.2 to 10 wt % relative to 100 wt % of the graft-modified polymer.

When the polymer in the invention includes graft-modified molecules, excellent adhesion and compatibility with respect to other resins may be obtained and the wettability of the surface of shaped articles may be improved. By being crosslinked, the graft-modified polymer may be suitably used in crosslinked electric wires and crosslinked pipes.

The olefin polymer of the invention may be halogenated. The halogenated olefin polymer may be used as a macro initiator, and a radically polymerizable monomer may be polymerized therewith by atom transfer radical polymerization to produce a block graft copolymer which has a polyolefin segment and a polar polymer segment chemically bonded to each other. The macro initiator is a polymer having an ability to initiate atom transfer radical polymerization, and has a site in the molecular chain which serves as a starting point of atom transfer radical polymerization.

The halogenated olefin polymer is produced by reacting the olefin polymer of the invention with a halogenating agent. The halogenating agents are not particularly limited as long as they can halogenate the inventive olefin polymers into halogenated olefin polymers. Specific examples include chlorine, bromine, iodine, phosphorus trichloride, phosphorus tribromide, phosphorus triiodide, phosphorus pentachloride, phosphorus pentabromide, phosphorus pentaiodide, thionyl chloride, sulfuryl chloride, thionyl bromide, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide, N,N'-dibromoisocyanuric acid, N-bromoacetamide, N-bromocarbamic acid esters, dioxane dibromide, phenyltrimethylammonium tribromide, pyridinium hydrobromide perbromide, pyrrolidone hydrotribromide, t-butyl hypochlorite, t-butyl hypobromite, copper (II) chloride, copper (II) bromide, iron (III) chloride, oxalyl chloride and IBr. Of these, preferred agents are chlorine, bromine, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide and N,N'-dibromoisocyanuric acid, and more preferred agents are bromine and compounds having a N—Br bond such as N-bromosuccinimide, N-bromocaprolactam, N-bromophthalimide, 1,3-dibromo-5,5-dimethylhydantoin, N-bromoglutarimide and N,N'-dibromoisocyanuric acid.

The reaction between the olefin polymer of the invention and the halogenating agent is preferably performed in an inert gas atmosphere. Examples of the inert gases include nitrogen, argon and helium. The reaction may involve a solvent as required. Any solvents that do not inhibit the reaction may be used, with examples including aromatic hydrocarbon solvents such as benzene, toluene and xylene; aliphatic hydrocarbon solvents such as pentane, hexane, heptane, octane, nonane and decane; alicyclic hydrocarbon solvents such as cyclohexane, methylcyclohexane and decahydronaphthalene; chlorinated hydrocarbon solvents such as chlorobenzene, dichlorobenzene, trichlorobenzene, methylene chloride, chloroform, carbon tetrachloride, tetrachloroethylene and tetrachloroethane; alcohol solvents such as methanol, ethanol, n-propanol, iso-propanol, n-butanol, sec-butanol and tert-butanol; ketone solvents such as acetone, methyl ethyl ketone and methyl isobutyl ketone; ester solvents such as ethyl acetate and dimethyl phthalate; and ether solvents such as dimethyl ether, diethyl ether, di-n-amyl ether, tetrahydrofuran and dioxyanisole.

The halogenation reaction may involve a radical initiator as required to promote the reaction. Examples of the radical initiators include those radical initiators described hereinabove.

The olefin polymer of the invention and the halogenating agent may be reacted by any of various known methods. For example, the olefin polymer may be suspended or dissolved in a solvent, and the halogenating agent and optionally additives such as the radical initiator may be admixed with the suspension or solution followed by the reaction at a temperature of −80° C. to 250° C., preferably a temperature of from room temperature to the boiling point of the solvent. Alternatively, the olefin polymer may be brought into contact with the halogenating agent and optionally the radical initiator by melt kneading at a temperature of not less than the melting point of the olefin polymer, for example, a temperature of 180 to 300° C.

The polar polymer segment is a homopolymer or a copolymer of one or more monomers selected from radically polymerizable monomers. Specific examples of the radically polymerizable monomers include (meth)acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, toluyl (meth) acrylate, benzyl (meth)acrylate, 2-methoxyethyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, 2-(dimethylamino)ethyl (meth) acrylate, γ-(methacryloyloxypropyl)trimethoxysilane, ethylene oxide adduct of (meth)acrylic acid, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth) acrylate, 2-perfluorodecylethyl (meth)acrylate and 2-perfluorohexadecylethyl (meth) acrylate; styrene monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as (meth)acrylamide, N-methyl (meth)acrylamide, N-ethyl (meth)acrylamide, N-propyl (meth)acrylamide, N-isopropyl (meth)acrylamide, N-butyl (meth)acrylamide and N,N-dimethyl (meth)acrylamide; vinyl ester monomers such as vinyl acetate, vinyl propionate, vinyl pivalate, vinyl benzoate and vinyl cinnamate; vinyl chloride, vinylidene chloride, allyl chloride and allyl alcohols. These organic compounds may be used singly, or two or more may be used in combination.

The atom transfer radical polymerization may be performed by a known method. The polymerization method is not particularly limited, and any methods such as bulk polymerization, solution polymerization, suspension polymerization, emulsion polymerization and bulk suspension polymerization may be used. The reaction temperature is not particularly limited as long as the temperature allows the radical polymerization reaction to proceed. The polymerization temperature is usually −100° C. to 250° C., but may be variable depending on the desired degree of polymerization of the polymer, and the types and the amounts of the radical initiator and the solvent used.

The olefin polymers of the invention may contain additives as required while still achieving the objects of the invention. Examples of the additives include weather stabilizers, heat stabilizers, antistatic agents, slip agents, anti-blocking agents, foaming agents, crystallization auxiliaries, antifogging agents, (transparent) nucleating agents, lubricants, pigments, dyes, plasticizers, anti-aging agents, hydrochloric acid absorbers, antioxidants, releasing agents, impact improvers, anti-UV agents (UV ray absorbers), fillers, cross-linking agents, co-crosslinking agents, crosslinking auxiliaries, tackifiers, softeners, flame-retardants and processing aids. The amount of the additives is not particularly limited, but is usually 0 to 50 parts by weight, preferably 0 to 30 parts by weight, still more preferably 0 to 10 parts by weight, and particularly preferably 0 to 1 part by weight per 100 parts by weight of the olefin polymer.

The antioxidants may be any of known antioxidants. Specific examples include hindered phenol compounds, sulfur antioxidants, lactone antioxidants, organic phosphite compounds, organic phosphonite compounds, and combinations of these compounds.

The nucleating agents may be any of known nucleating agents, and may be used to further improve the processability of the olefin polymers, namely, to further increase the crystallization temperature and the crystallization rate. Specific examples include dibenzylidenesorbitol nucleating agents, phosphate ester salt nucleating agents, rosin nucleating agents, metal benzoate salt nucleating agents, fluorinated polyethylenes, sodium 2,2-methylenebis(4,6-di-t-butylphenyl)phosphate, pimelic acid and salts thereof, and 2,6-naphthalene acid dicarboxylic acid dicyclohexylamide. The amount of the nucleating agents is not particularly limited, but is preferably 0.1 to 1 part by weight per 100 parts by weight of the olefin polymer. The nucleating agents may be added at appropriate time, for example, during or after the polymerization or during shaping.

The lubricants may be any of known lubricants. Specific examples include sodium salts, calcium salts and magnesium salts of saturated or unsaturated fatty acids such as lauric acid, palmitic acid, oleic acid and stearic acid. These lubricants may be used singly, or two or more may be used in combination. The amount of the lubricants is not particularly limited, but is usually about 0.1 to 3 parts by weight, and preferably about 0.1 to 2 parts by weight per 100 parts by weight of the polymer composition.

The slip agents may be any of known slip agents. Specifically, it is preferable to use amides of saturated or unsaturated fatty acids such as lauric acid, palmitic acid, oleic acid, stearic acid, erucic acid and behenic acid, or bisamides of these saturated or unsaturated fatty acids. Of these, erucamide and ethylenebisstearamide are particularly preferable. These fatty acid amides are preferably added in the range of 0.01 to 5 parts by weight per 100 parts by weight of the polymer composition.

The anti-blocking agents may be any of known anti-blocking agents. Specific examples include fine powdery silicas, fine powdery aluminum oxides, fine powdery clays, powdery or liquid silicon resins, tetrafluoroethylene resins, and fine powdery crosslinked resins such as crosslinked acrylic and methacrylic resin powders. Of these, fine powdery silicas and crosslinked acrylic and methacrylic resin powders are preferable.

The softeners may be any of known softeners. Specific examples include petroleum substances such as process oils, lubricating oils, paraffins, liquid paraffins, polyethylene waxes, polypropylene waxes, petroleum asphalts and vaselines; coal tars such as coal tars and coal tar pitches; fatty oils such as castor oils, linseed oils, rapeseed oils, soybean oils and coconut oils; waxes such as tall oils, beeswaxes, carnauba waxes and lanolins; fatty acids and metal salts thereof such as ricinolic acid, palmitic acid, stearic acid, 12-hydroxystearic acid, montanic acid, oleic acid and erucic acid; synthetic polymers such as petroleum resins, coumarone-indene resins and atactic polypropylenes; ester plasticizers such as dioctyl phthalate, dioctyl adipate and dioctyl sebacate; microcrystalline waxes, liquid polybutadienes and modified products or hydrogenated products thereof; and liquid Thiokols.

The crosslinking agents may be any of known crosslinking agents. Specific examples include organic peroxides such as dicumyl peroxide and 2,5-dimethyl-2,5-tert-butylperoxyhexyne; sulfur; and morpholine disulfide. The crosslinking agents may be used in combination with cross linking auxiliaries such as stearic acid and zinc oxide. When sulfur is used, the amount thereof is preferably 0.1 to 10 parts by weight per 100 parts by weight of the olefin polymer. In the case of an organic peroxide, the amount thereof is preferably 0.05 to 15 parts by weight per 100 parts by weight of the olefin polymer. In the case of a SiH group-containing compound, the amount thereof is usually 0.2 to 20 parts by weight, preferably 0.5 to 10 parts by weight, and most preferably 0.5 to 5 parts by weight per 100 parts by weight of the olefin polymer. A SiH group-containing compound may be used together with a catalyst, and a silane-coupling agent and/or a reaction inhibitor as an optional component.

[1-Butene Polymers]

The novel 1-butene polymer of the invention has a meso pentad fraction (mmmm) as measured by $^{13}$C-NMR of 98.0% to 99.8%, preferably 98.5% to 99.5%, and particularly preferably 99.0% to 99.4%.

The novel 1-butene polymer of the invention is substantially free from regioirregular structures. The term "substantially" means that the total of the proportion of regioerrors due to 2,1-insertions of 1-butene monomers (hereinafter, also written as "2,1-insertion fraction"), and the proportion of regioerrors due to 1,4-insertions (hereinafter, also written as "1,4-insertion fraction") in all the 1-butene constituent units measured by $^{13}$C-NMR spectroscopy is not more than 0.1 mol o, preferably not more than 0.06 mol %, and particularly preferably below the detection limit.

Any mmmm that is below the lower limit or the presence of regioerrors in the 1-butene polymer may cause insufficient heat resistance and rigidity. If the mmmm exceeds the upper limit, process-ability may be deteriorated.

In the novel 1-butene polymer of the invention, the melting point Tm measured by differential scanning calorimetry (DSC) (heating rate: 10° C./min) is preferably 90 to 150° C., more preferably 100 to 140° C., and still more preferably 120 to 140° C. With the melting point in this range, the 1-butene polymer achieves an excellent balance between heat resistance and process-ability.

The novel 1-butene polymer of the invention preferably has a weight-average molecular weight (Mw) and a molecular weight distribution (Mw/Mn) in the ranges described in [Olefin polymers]. The intrinsic viscosity [η] is preferably 0.1 to 10 dl/g, more preferably 0.3 to 5 dl/g, and still more preferably 0.5 to 4 dl/g.

In the novel 1-butene polymer of the invention, it is preferable that the accumulated elution amount at a temperature $[T_X]$ be 40% by weight or more relative to the whole elution amount as measured by cross fractionation chromatography (CFC) using o-dichlorobenzene as an eluent, provided that $[T_X]$ is defined as $([T_S]+[T_E])/2$ wherein $[T_S]$ is an elution start temperature (a temperature at which the accumulated elution weight percent reaches 0.5% by weight), and $[T_E]$ is an elution end temperature (a temperature at which the accumulated elution weight percent reaches 99% by weight). The accumulated elution amount at a temperature $[T_X]$ is preferably 80% by weight or less, and more preferably 70% by weight or less.

This indicator (the accumulated elution amount at $[T_X]$) indicates that the 1-butene polymer of the invention is eluted during CFC measurement in such a manner that the proportion of elution at lower temperatures is relatively higher as compared to known 1-butene polymers.

In general, 1-butene polymers with high stereoregularity have a thick crystal phase and consequently the proportion of elution at higher temperatures during CFC measurement tends to be increased as compared to low stereoregular 1-butene polymers. In contrast, the 1-butene polymer of the invention shows an inverse tendency. That is, the 1-butene polymer of the invention is eluted during CFC measurement with a relatively larger proportion at lower temperatures in spite of the fact that the inventive 1-butene polymer has higher stereoregularity than known 1-butene polymers (see FIG. 1).

In general, highly stereoregular polymers have high yield stress because of a thick crystal phase, and consequently process-ability and stretching properties may be deteriorated at times. However, the 1-butene polymer of the invention exhibiting a characteristic behavior in CFC measurement has high tensile modulus due to its high stereoregularity while the yield stress thereof is of the same level as that of known 1-butene polymers. Thus, it can be said that the 1-butene polymer of the invention is a material having an excellent rigidity/yield stress balance.

Details of the measurements of these properties are described in Examples.

The novel 1-butene polymers of the invention substantially consist of 1-butene-derived constituent units, but may include comonomer-derived constituent units without departing from the spirit of the invention. The term "substantially" means that the 1-butene polymers contain 95 wt % or more of 1-butene-derived constituent units. Examples of the comonomers include the olefins described in [Olefin polymer production processes].

For example, the 1-butene polymers having the aforementioned configurations and properties may be obtained by polymerizing 1-butene and optionally a comonomer (for example, at least one olefin selected from ethylene, propylene and α-olefins having 5 to 30 carbon atoms) in the presence of the inventive olefin polymerization catalyst described hereinabove. Detailed polymerization conditions are as described in [Olefin polymer production processes].

The 1-butene polymers of the invention having the aforementioned configurations and characteristics may be synthesized by, for example, the process described hereinabove, and are assumed to have a large amount of a uniform and thin lamella structure. This lamella structure is probably the reason why the 1-butene polymers exhibit characteristic CFC measurement results.

After synthesized by the aforementioned process, the 1-butene polymers of the invention may be subjected to known post treatment steps such as catalyst deactivation step, residual catalyst removal step and drying step as required.

The primary structure of the inventive 1-butene polymer is controlled to the specific structure described above, and consequently the 1-butene polymer exhibits high heat resistance and high mechanical properties such as high rigidity and high strength. For example, the olefin polymers of the invention have a higher melting point and a higher stereoregularity than conventional olefin polymers. Further, the 1-butene polymers of the invention according to a preferred embodiment have the specific accumulated elution amount at a temperature [$T_x$] as measured by CFC, and consequently exhibit an excellent rigidity/yield stress balance.

With the properties described hereinabove (high heat resistance and rigidity/yield stress balance), the 1-butene polymers of the invention will be suitably used as materials for products such as pipes, films and sheets. In particular, pipes of the polymers will exhibit excellent thermal creep resistance.

[First 4-methyl-1-pentene polymers]

The first 4-methyl-1-pentene polymers of the invention fulfill the following requirement (a) (constituent units), requirement (b) (stereoregularity) and requirement (c) (relationship between heat of fusion ΔHm and melting point Tm).

⟨ Requirement (a)⟩

In the first 4-methyl-1-pentene polymers of the invention, the amount of constituent units derived from 4-methyl-1-pentene is 100 to 80 mol %, preferably 100 to 90 mol %, and the amount of constituent units derived from at least one selected from olefins having 2 to 30 carbon atoms (except 4-methyl-1-pentene) is 0 to 20 mol %, preferably 0 to 10 mol %. Hereinbelow, 4-methyl-1-pentene will be also written as "4MP1", and the 4-methyl-1-pentene polymers will be also written as "4MP1 polymers".

Here, the total of the amount of constituent units derived from 4MP1 and the amount of constituent units derived from at least one selected from olefins having 2 to 30 carbon atoms (except 4MP1 monomer) is preferably 100 mol %.

The olefins are preferably α-olefins. Examples of the olefins include the olefins described in [Olefin polymer production processes]. Preferred α-olefins are those having 2 to 20 carbon atoms (except 4MP1 monomer). From the viewpoint of copolymerizability, more preferred α-olefins include ethylene, propylene, 1-butene, 1-hexene, 3-methyl-1-butene, 3-methyl-1-pentene, 1-octene, 1-decene, 1-hexadecene, 1-heptadecene and 1-octadecene, with propylene, 1-hexene, 1-octene, 1-decene, 1-hexadecene and 1-octadecene being particularly preferable.

⟨ Requirement (b)⟩

In the first 4-methyl-1-pentene polymers of the invention, the meso diad fraction (m) as measured by $^{13}$C-NMR is 98.5% to 100%. The fraction "m" is preferably 99% to 100%. Any fraction "m" that is less than the lower limit may result in insufficient heat resistance and rigidity.

⟨ Requirement (c)⟩

In the first 4-methyl-1-pentene polymers of the invention, the heat of fusion ΔHm (unit: J/g) and the melting point Tm (unit: ° C.) as measured by differential scanning calorimetry (DSC) fulfill the following relation (1):

$$\Delta Hm \ 0.5 \times Tm - 76 \qquad \text{Relation (1):}$$

Preferred ranges of ΔHm and Tm in the relation (1) are as follows.

In the first 4-methyl-1-pentene polymers of the invention, the melting point Tm measured by differential scanning calorimetry (DSC) (heating rate: 10° C./min) is preferably 100 to 260° C., more preferably 110 to 250° C., still more preferably 150° C. to 250° C., further preferably 152 to 250° C., particularly preferably 175 to 250° C., and most preferably 190 to 250° C.

In the first 4-methyl-1-pentene polymers of the invention, the heat of fusion ΔHm measured by differential scanning calorimetry (DSC) (heating rate: 10° C./min) is preferably 5 to 80 J/g, and more preferably 10 to 60 J/g.

The relation (1) indicates that the first 4MP1 polymers of the invention have a higher heat of fusion than known 4MP1 polymers (see FIG. 3). In detail, the first 4MP1 polymers of the invention have a higher heat of fusion (ΔHm), namely, a higher degree of crystallinity than known 4MP1 polymers when the polymers having approximately equal melting points (Tm) are compared. In view of the fact that the conventional 4MP1 polymers exhibit a high melting point but usually have a small heat of fusion, it can be said that the first 4MP1 polymers of the invention achieve excellent properties.

The first 4MP1 polymers of the invention have excellent properties described below. In usual crystalline polymers, an increase in crystallinity leads to an increase in rigidity such as tensile modulus usually at the cost of a decrease in toughness such as elongation at break. In contrast, the first 4MP1 polymers of the invention satisfying the requirements (a) to (c), in particular, the relation (1) are free from a decrease in elongation at break in spite of having high tensile modulus (see FIG. 2). This behavior is a very unusual characteristic for crystalline polymers.

Details as to the establishment of the relation (1) are described in Examples.

The first 4MP1 polymers of the invention preferably have a weight-average molecular weight (Mw) and a molecular weight distribution (Mw/Mn) in the ranges described in [Olefin polymers]. The intrinsic viscosity [η] is preferably 0.1 to 20 dl/g, more preferably 0.2 to 10 dl/g, and still more preferably 0.5 to 8 dl/g.

Details of the measurements of these properties are described in Examples.

For example, the first 4MP1 polymers having the aforementioned configurations and properties may be obtained by polymerizing 4MP1 and optionally a comonomer (for example, at least one olefin selected from α-olefins having 2 to 30 carbon atoms (except 4MP1)) in the presence of the inventive olefin polymerization catalyst described hereinabove. Detailed polymerization conditions are as described in [Olefin polymer production processes].

The first 4MP1 polymers of the invention having the aforementioned configurations and characteristics may be synthesized by, for example, the process described hereinabove. The characteristics of the first 4MP1 polymers of the invention are probably manifested due to factors such as the high stereoregularity of the 4MP1 polymers obtained by the aforementioned process and also the fact that the average length of 4MP1 sequences in the polymers is shorter as compared to usual 4MP1 polymers. It is considered that this configuration results in a smaller thickness and a smaller spherulite size of the crystalline lamella formed in the first 4MP1 polymers of the invention as compared to usual 4MP1 polymers. On the other hand, the first 4MP1 polymers of the invention have high crystallinity due to the high stereoregularity.

Thus, the first 4MP1 polymers of the invention will compare advantageously to usual 4MP1 polymers in that (1) the long period of the crystal structure is short, and finer spherulites are formed in large amounts, and (2) the crystalline lamella formed has a very uniform thickness and a very uniform spherulite size.

Based on the possible fact that the first 4MP1 polymers of the invention have the above characteristic crystal structure, the following assumption is possible. In the case of usual 4MP1 polymers, even when the rigidity of the polymers is enhanced by the increase in crystallinity, the crystal structure size is nonuniform and consequently the polymer contains a mixture of portions which are highly or poorly resistant to tensile deformation, with the result that a fracture occurs easily starting from, in particular, the portions which are poorly resistant to tensile deformation. In contrast, the first 4MP1 polymers of the invention have little nonuniformity in crystal structure and are thus considered to exhibit uniform resistance to tensile deformation throughout the structure, namely, have no portions which can serve as starting points of fractures and are consequently prevented from a decrease in elongation at break.

With the properties described hereinabove (rigidity/toughness balance), the first 4MP1 polymers of the invention may be suitably used as materials for products such as films, sheets, tubes, injection molded articles, hollow molded articles and fibers. For example, the polymers will be suitably used in applications such as materials for packaging films, release films, air-breathable films, reflective films, releasing papers for synthetic leather, medical tubes, industrial tubes, food containers, heat-resistant containers, medical containers, animal cages, physical and chemical science experimental equipment, mandrels for the production of rubber hoses, and nonwoven fabrics; as well as coating materials, transparent modifiers, thermoplastic resin modifiers, modifiers for modifying properties such as releasing properties and gas barrier properties of resins such as polyolefins, elastomers and rubbers, process-ability modifiers and compatibilizers (graft modifiers).

The first 4MP1 polymers may be formed into fine powders by a crushing treatment. For example, the thus-obtained fine powders may be used as additives in ink compositions or coating compositions, as additives in metallurgic powder compositions, as additives in ceramic-sintering powder compositions, as additives in pressure-sensitive adhesives, as additives in rubbers, as releasing agents in toners, and as mold releasing agents. Further, the fine powders may be used as resin additives in shaft bearings, gear wheels, cams, electric components, camera components, automobile components and household article components, or as resin additives in products such as waxes, greases, engine oils, fine ceramics and platings.

[Second 4-methyl-1-pentene polymers]

The second 4-methyl-1-pentene polymers of the invention fulfill the following requirement (d) (constituent units), requirement (e) (stereoregularity) and requirement (f) (melting point Tm).

⟨ Requirement (d)⟩

In the second 4-methyl-1-pentene polymers of the invention, the amount of constituent units derived from 4-methyl-1-pentene is more than 50 mol % and less than 80 mol %, and the amount of constituent units derived from at least one selected from olefins having 2 to 30 carbon atoms (except 4-methyl-1-pentene) is more than 20 mol % and less than 50 mol %. The amount of constituent units derived from 4MP1 is preferably more than 50 mol % and less than 78 mol %, and the amount of constituent units derived from the olefin (s) is preferably more than 22 mol % and less than 50 mol %.

Here, the total of the amount of constituent units derived from 4MP1 and the amount of constituent units derived from at least one selected from olefins having 2 to 30 carbon atoms (except 4MP1) is preferably 100 mol %.

The olefins are preferably α-olefins. Examples of the olefins include the olefins described in [Olefin polymer production processes]. Preferred α-olefins are those having 2 to 20 carbon atoms (except 4MP1 monomer). From the viewpoint of copolymerizability, more preferred α-olefins include ethylene, propylene, 1-butene, 1-hexene, 3-methyl-1-butene, 3-methyl-1-pentene, 1-octene, 1-decene, 1-hexadecene, 1-heptadecene and 1-octadecene, with ethylene, propylene and 1-butene being particularly preferable.

⟨ Requirement (e)⟩

In the second 4-methyl-1-pentene polymers of the invention, the meso diad fraction (m) as measured by $^{13}$C-NMR is 98.5% to 100%. The fraction "m" is preferably 99% to 100%. Any fraction "m" that is less than the lower limit may result in insufficient mechanical properties such as permanent compression set.

⟨ Requirement (f)⟩

In the second 4-methyl-1-pentene polymers of the invention, the melting point Tm as measured by differential scanning calorimetry (DSC) (heating rate: 10° C./min) is lower than 100° C. or is substantially absent. Here, the phrase "the melting point is substantially absent" means that the heat of fusion ΔHm (unit: J/g) is not substantially observed during differential scanning calorimetry (DSC) (heating rate: 10° C./min). The phrase "the heat of fusion ΔHm is not substantially observed" means that ΔHm is less than 5 J/g, preferably 1 J/g or below, and more preferably below the detection limit (=approximately 0.1 J/g). Thus, the second 4-methyl-1-pentene polymers of the invention are amorphous or low-crystalline polymers.

The second 4MP1 polymers of the invention preferably have a weight-average molecular weight (Mw) and a molecular weight distribution (Mw/Mn) in the ranges described in [Olefin polymers]. The intrinsic viscosity [η] is preferably 0.1 to 20 dl/g, more preferably 0.2 to 10 dl/g, and still more preferably 0.5 to 8 dl/g.

(Gel fraction) The second 4MP1 polymers of the invention preferably have a gel fraction measured by extraction with boiling p-xylene (solvent) in the range of 0 to 10 wt %, more preferably 0 to 5 wt %, and particularly preferably 0 to 0.5 wt %. The polymers exhibit excellent elastic properties in spite of such a low gel fraction.

Details of the measurements of these properties are described in Examples.

The second 4MP1 polymers of the invention satisfying the requirements (d) to (f) are characterized in that the loss tangent (tan δ) measured with respect to dynamic viscoelasticity is higher while the polymers do not show a decrease in permanent compression set that is an indicator of elastic properties as compared to known amorphous or low-crystalline 4MP1 polymers having a similar 4MP1 content.

It is generally known that when the loss tangent (tan δ=G"/G') is high, viscous properties (G") are manifested more strongly than elastic properties (G') to cause a decrease in elastic properties such as permanent compression set. In contrast, there is no decrease in the permanent compression set of the second 4MP1 polymers of the invention in spite of the high loss tangent.

For example, the second 4MP1 polymers having the aforementioned configurations and properties may be obtained by polymerizing 4MP1 and optionally a comonomer (for example, at least one olefin selected from α-olefins having 2 to 30 carbon atoms (except 4MP1)) in the presence of the inventive olefin polymerization catalyst described hereinabove. Detailed polymerization conditions are as described in [Olefin polymer production processes].

The second 4MP1 polymers of the invention having the aforementioned configurations and characteristics may be synthesized by, for example, the process described hereinabove. The present inventors assume that the above characteristics of the second 4MP1 polymers of the invention are attributed to the following reasons.

The viscous properties (G″) are predominantly governed by the magnitude of frictional force between molecular chains which depends on the primary structure (monomers). In 4MP1 polymers, this factor is dependent only on the copolymerization composition and will not significantly differ between the second 4MP1 polymers of the invention and usual 4MP1 polymers provided that the 4MP1 contents are similar.

On the other hand, the second 4MP1 polymers of the invention exhibit a smaller permanent compression set, namely, are excellent in strain recovery. The reason for this may be considered as follows. In 4MP1 polymers, it is known that even non-crystalline or amorphous regions contain spatially-ordered aggregated structures having sizes of approximately several hundreds of nanometers. The formation of such aggregated structures is considered to be because of the low mobility of molecules due to the rigidity of 4MP1 polymer chains (the rigidity being ascribed to the bulkiness of side chains).

In usual 4MP1 polymers, it is probable that such aggregated structures present in amorphous regions have nonuniform sizes and have small proportions. In contrast, the second 4MP1 polymers of the invention are probably such that amorphous regions contain uniformly-sized aggregated structures in large proportions. The reason for this assumption is because the second 4MP1 polymers of the invention have structures that are highly stereoregular and are easily aggregated even in the case where the polymers are amorphous.

Such aggregated structures in amorphous regions are considered to serve as "pseudo crosslinks" resistant to external deformations such as compression and tension. Thus, increasing the proportion of pseudo crosslinks will increase the amount of recovery from deformation when the stress such as compression is released. This is probably the reason why the second 4MP1 polymers of the invention do not show a decrease in permanent compression set in spite of the fact that the polymers have a high tan δ.

With the viscoelastic properties described hereinabove, the second 4MP1 polymers of the invention may be suitably used as materials for products such as vibration damping materials, vibration insulating materials, soundproof materials, impact absorbers and sound insulators in the forms of films, sheets and injection molded articles. For example, the polymers will be suitably used in applications such as vibration insulating mats, vibration insulating dampers and interior materials in structures such as audio equipment, OA devices, industrial machinery, automobiles, railways, bridges and ships; vibration damping materials, vibration insulating materials, soundproof materials and sound insulators in devices such as home electric appliances, for example, air conditioners and washing machines; impact absorbers such as mouth guards, sport protectors, nursing protectors, mats and inner shoe soles; pressure-sensitive adhesives such as pressure-sensitive adhesive films and pressure-sensitive adhesive layers in protective films; protective films in semiconductor manufacturing steps; gripes in products such as sport gears, stationery and health items; modifiers for polyolefins such as polypropylene, poly-4-methyl-1-pentene, polybutene and polyethylene, elastomer modifiers, rubber modifiers, acrylic pressure-sensitive adhesive modifiers, hot melt adhesive modifiers, forming modifiers such as flow mark inhibitors, weld modifiers and surface modifiers, resin modifiers such as gas barrier modifiers and release modifiers, and compatibilizers (such as graft modifiers).

The second 4MP1 polymers may be formed into fine powders by a crushing treatment. For example, the thus-obtained fine powders may be used as additives in ink compositions or coating compositions such as vibration damping coatings, as additives in metallurgic powder compositions, as additives in ceramic-sintering powder compositions, and as additives in pressure-sensitive adhesives.

[Shaped Articles]

The shaped articles of the invention include the olefin polymers, or the 1-butene polymers or the 4-methyl-1-pentene polymers described above. These olefin polymers may be shaped into desired articles such as films, sheets, hollow molded articles, injection molded articles and fibers by various shaping methods such as injection molding, extrusion, injection stretch blow molding, blow molding, casting, calendering, press molding, stamping, blown-film extrusion and rolling.

Examples of the applications of the shaped articles of the invention are described below. However, the applications are not particularly limited thereto.

Examples of containers include food containers, retort containers and bottle containers such as eating utensils, seasoning containers, retort containers, freeze preservation containers, retort pouches, microwavable heat-resistant containers, frozen food containers, frozen dessert cups, cups, baby feeding bottles and beverage bottles; blood transfusion sets, medical bottles, medical containers, medical hollow bottles, medical bags, transfusion bags, blood preservation bags, transfusion bottle chemical containers, detergent containers, softener agent containers, bleaching agent containers, shampoo containers, conditioner containers, cosmetic containers, perfume containers, toner containers, powder containers, adhesive containers, gasoline tank containers and kerosine containers.

Examples of packaging materials include food packaging materials, meat packaging materials, processed fish packaging materials, vegetable packaging materials, fruit packaging materials, fermented food packaging materials, sweets packaging materials, oxygen absorbent packaging materials, retort food packaging materials, freshness preservation films, drug packaging materials, cell culture bags, cell inspection films, bulb packaging materials, seed packaging materials, vegetable/fungus cultivation films, heat-resistant vacuum molded containers, prepared food containers, prepared food container lids, industrial wrapping films, household wrapping films and baking cartons.

Examples of films, sheets and tapes include: releasing films such as releasing films for flexible printed boards, releasing films for ACM boards, releasing films for rigid boards, releasing films for rigid flexible boards, releasing films for advanced composite materials, releasing films for the curing of carbon fiber composite materials, releasing films for the curing of glass fiber composite materials, releasing films for the curing of aramid fiber composite materials, releasing films for the curing of nano composite materials, releasing films for the curing of fillers, releasing films for the sealing of semiconductors, releasing films for polarizing plates, releasing films for diffusion sheets, releasing films for prism sheets, releasing films for reflective sheets, cushion films for releasing films, releasing films for fuel cells, releasing films for various rubber sheets, releasing films for the curing of urethanes, and releasing films for the curing of epoxies, solar battery cell sealing sheets, solar battery cell back sheets, plastic films for solar batteries, battery separators, separators for lithium ion batteries, electrolyte membranes for fuel cells, pressure-sensitive adhesive/adhesive separators, light guide plates, optical disks, substrates, pressure-sensitive adhesives and separators for semiconductor processing films such as dicing tapes, back grind tapes, die bonding films, two-layer FCCLs and films for film capacitors; pressure-sensitive adhesive films, stress releasing films, films for pellicles, films for polarizing plates; protective films such as polarizing plate protective films, liquid crystal panel protective films, optical component protective films, lens protective films, electric component/electric device protective films, mobile phone protective films, personal computer protective films, touch panel protective films, window glass protective films, films for baked paints, masking films, films for capacitors, capacitor films, films for fuel cell capacitors, reflective films, diffusion films, laminates (including glass), radiation resistant films, γ-ray resistant films, and porous films;

heat release films/sheets, frames for the manufacturing of electronic component sealants, LED molds, laminate plates for high-frequency circuits, high-frequency cable coating materials, optical waveguide substrates, glass fiber composites, carbon fiber composites, glass interlayer films, laminated glass films, building window films, bulletproof materials, bulletproof glass films, heat shield sheets, heat shield films, releasing papers such as releasing papers for synthetic leather, releasing papers for advanced composite materials, releasing papers for the curing of carbon fiber composite materials, releasing papers for the curing of glass fiber composite materials, releasing papers for the curing of aramid fiber composite materials, releasing papers for the curing of nano composite materials, and releasing papers for the curing of fillers; and heat-resistant waterproof printing papers.

Examples of other applications include:

mandrels for the production of rubber hoses, sheaths, sheaths for the production of rubber hoses, hoses, tubes, cooling-water pipes, hot-water pipes, wire coating materials, millimeter-wave signal cable coating materials, high-frequency signal cable coating materials, eco wire coating materials, vehicle cable coating materials, signal cable coating materials, insulators for high-voltage wires, wiring ducts, tubes for cosmetics and perfume sprays, medical tubes, transfusion tubes, pipes, wire harnesses, interior and exterior materials for structures such as automobiles, motorcycles, railroad vehicles, air planes and ships; abrasion-resistant automotive interior and exterior materials, instrument panel skins, door trim skins, rear package trim skins, ceiling skins, rear pillar skins, seat back garnishes, console boxes, arm rests, air bag case lids, shift knobs, assist gripes, side step mats, reclining covers, sheets in trunks, seat belt buckles; moldings such as inner/outer moldings, bumper moldings, side moldings, roof moldings and belt moldings; air spoilers; automotive seal materials such as door seals and body seals; automotive interior and exterior materials such as glass run channels, mudguards, kicking plates, step mats, number plate housings, automotive hose components, air duct hoses, air duct covers, air intake pipes, air dam skirts, timing belt cover seals, bonnet cushions, door cushions, cup holders, side break gripes, shift knob covers, seat adjustment knobs, wire harness grommets, suspension cover boots, glass guides, inner belt line seals, roof guides, trunk lid seals, molded quarter window gaskets, corner moldings, glass encapsulations, hood seals, glass run channels, secondary seals, bumper components, body panels, side shields, door skins, weather strip materials, hoses, steering wheels, wire harness covers and seat adjuster covers; special tires such as vibration damping tires, silent tires, car race tires and radio control tires; packings, automotive dust covers, lamp seals, automotive boots, rack and pinion boots, timing belts, wire harnesses, grommets, emblems, air filter packings, automotive connectors, ignition coils, switches, lamp reflectors, relays, electric control unit cases, sensor housings, electromagnetic valves, coil sealing components, skin materials for products such as furniture, shoes, garments, bags and building materials; building seal materials, waterproof sheets, building material sheets, building material gaskets, building material window films, iron-core protecting components, soil improvement sheets, water stop materials, joint materials, gaskets, doors, door frames, window frames, cornices, baseboards, open frames, floor materials, ceiling materials, wall papers, health items (e.g., nonslip mats/sheets and fall prevention films/mats/sheets), health appliance components, impact absorbing pads, protectors/protecting components (e.g., helmets and guards), sport gears (e.g., sport gripes and protectors), sport protecting equipment, rackets, mouth guards, balls, golf balls, haulage gears (e.g., haulage impact absorbing gripes and impact absorbing sheets), vibration damping pallets; impact absorbers such as impact absorbing dampers, insulators, impact absorbers for shoes, impact absorbing foams and impact absorbing films/sheets;

gripes (such as stationery, tools, sporting equipment, steering wheels, commodities, electric devices and furniture), sundries, toys, treads, shoe soles, shoe midsoles/inner soles, soles, sandals, chair skins, bags, school bags; garments such as jackets and coats; belts, sashes, ribbons, notebook covers, book covers, key chains, pencil cases, wallets, business card holders, commuter-pass holders, suckers, tooth brushes, floor materials, gymnastic mats, electrical tool components, agricultural equipment components, heat dissipation materials, transparent substrates, soundproof materials, cushion materials, wire cables, shape memory materials, connectors, switches, plugs, home appliance components (such as motor components and housings), medical gaskets, medical caps, drug caps, gaskets; packing materials used in high-temperature treatments such as boiling and high-pressure steam sterilization after the filling of bottles with items such as baby food, dairy products, drugs and sterilized water; industrial seal materials, industrial sewing machine tables, number plate housings; cap liners such as PET bottle cap liners;

pressure-sensitive adhesives such as protect film pressure-sensitive adhesive layers and hot melt pressure-sensitive adhesives;

stationery, office supplies; supporting members of precision devices and OA devices such as OA printer legs, facsimile legs, sewing machine legs, motor supporting mats and audio vibration-insulating materials; heat-resistant packings for office automation, animal cages; physical and chemical science experimental equipment such as beakers and measuring cylinders; medical films/sheets, cell culture films/sheets, syringes, cells for optical measurements, garment cases, clear cases, clear files, clear sheets, desk mats, and fibers such as monofilaments, multifilaments, cut fibers, hollow fibers, nonwoven fabrics, stretchable nonwoven fabrics, fibers, waterproof fabrics, air-breathable woven fabrics and fabrics, disposable diapers, sanitary products, hygiene products, filters, bug filters, dust-collecting filters, air cleaners, hollow fiber filters, water-purifying filters, filter fabrics, filter papers and gas separation membranes.

Examples of other suitable applications include coating materials, films and sheets obtained by coating, release materials, water repellants, insulating films, adhesives, pressure-sensitive adhesives, coated papers, transparent sealants, sealants, hot melt pressure-sensitive adhesives, solvent-based pressure-sensitive adhesives, pressure-sensitive adhesive films, fabric tapes, craft tapes and elastic adhesives.

EXAMPLES

The present invention will be described in further detail based on Examples hereinbelow. However, the scope of the invention is not limited to such Examples.

[Property Measurement Methods]
Intrinsic Viscosity ([η])

With automated kinetic viscometer VMR-053PC and a modified Ubbelohde capillary viscometer manufactured by RIGO CO., LTD., the specific viscosity ηsp at 135° C. in decalin was measured. The intrinsic viscosity ([η]) was calculated using the following equation.

$[\eta] = \eta sp / \{C(1 + K \cdot \eta sp)\}$ ($C$: solution concentration [g/dl], $K$: constant)

Weight-Average Molecular Weight (Mw) and Number-Average Molecular Weight (Mn)

With Alliance GPC 2000 manufactured by Waters, 500 μl of a 0.15 (w/v) % sample solution was pumped at a flow rate of 1.0 ml/min to measure the weight-average molecular weight (Mw) and the number-average molecular weight (Mn). Standard polystyrenes manufactured by TOSO CORPORATION were used. The molecular weights were calculated relative to the polystyrenes.

Separation columns: two TSKgel GMH6-HT columns and two TSKgel GMH6-HTL columns (each 7.5 mm in inner diameter and 300 mm in length)
Column temperature: 140° C.
Mobile phase: o-dichlorobenzene
(containing 0.025 wt % dibutylhydroxytoluene)
Detector: Differential Refractometer Melting Point (Tm), Crystallization Temperature (Tc), Heat of fusion (ΔHm) and CFC analysis ⟨ Melting Point and Crystallization Temperature of Butene Homopolymers Obtained by Normal-Pressure Polymerization ⟩

With RDC220 manufactured by Seiko Instruments Inc., approximately 5 mg of a sample was heated from 30° C. to 200° C. in a nitrogen atmosphere (50 mL/min). The sample was held at 200° C. for 5 minutes and was cooled to −50° C. at 10° C./min. After being held at −50° C. for 5 minutes, the sample was heated to 200° C. at 10° C./min. The top of the crystallization peak observed during the cooling was obtained as the crystallization temperature (Tc), and the top of the crystal fusion peak observed during the second heating was obtained as the melting point (TmII).

The sample analyzed as described above was allowed to stand at least for 10 days at 23° C., and was heated from room temperature, specifically, 30° C. to 200° C. at 10° C./min. The top of the crystal fusion peak observed during the heating was obtained as the melting point (Tm).

⟨ Melting Point and Crystallization Temperature of Butene Homopolymers Obtained by Pressure Polymerization ⟩

With EXSTAR DSC6220 manufactured by SII Nano Technology, approximately 4 mg of a sample was heated from 30° C. to 200° C. in a nitrogen atmosphere (30 mL/min). The sample was held at 200° C. for 5 minutes and was cooled to −50° C. at 20° C./min. After being held at −50° C. for 5 minutes, the sample was heated to 200° C. at 10° C./min.

The sample was allowed to stand at room temperature (20 to 25° C.) for at least 10 days, and was heated from 30° C. to 200° C. at 10° C./min. The sample was then held at 200° C. for 5 minutes and was cooled to 30° C. at 20° C./min. The top of the crystallization peak observed during the cooling was obtained as the crystallization temperature (Tc), and the top of the crystal fusion peak observed during the heating was obtained as the melting point (Tm).

⟨ Cross Fractionation Chromatography (CFC) ⟩

The following apparatus was used in the measurement.
Apparatus: cross fractionation chromatograph CFC2 (manufactured by Polymer Char)
Detector: infrared band pass filter detector IR4 (manufactured by Polymer Char)
Wavelength detection range: approximately 3000 to 2800 cm$^{-1}$
TREF column: stainless steel column (3/8 inch in outer diameter×15 cm in length, included in the apparatus)
GPC columns: Shodex HT-806M×3 (manufactured by SHOWA DENKO K.K.)
Molecular weight: polystyrene-equivalent molecular weight relative to monodispersed polystyrenes (manufactured by TOSO CORPORATION)
Eluent: o-dichlorobenzene (special grade, manufactured by Wako Pure Chemical Industries, Ltd.)
Flow rate: 1.0 mL/min
Amount of sample injection: 0.5 mL
GPC column temperature: 140° C.

A sample prepared under the conditions described later was injected into the CFC apparatus, and was held in the TREF column at 145° C. for 10 minutes and at 140° C. for 20 minutes. Thereafter, the sample was cooled to −20° C. at 1° C./min, and was allowed to stand for 60 minutes. Thereafter, the TREF column was heated in accordance with the elution fractions described later. Components that were eluted during each heating operation were transferred to the GPC columns, and the molecular weight distribution and the elution amount were determined. The accumulated elution amount at a temperature $[T_X]$ relative to the whole elution amount was measured. $[T_X]$ was defined as $([T_S]+[T_E])/2$ wherein $[T_S]$ was an elution start temperature (a temperature at which the accumulated elution weight percent reached 0.5% by weight), and $[T_E]$ was an elution end temperature (a temperature at which the accumulated elution weight percent reached 99% by weight). When $[T_X]$ did not agree with the elution fraction temperature, the accumulated elution amount at $[T_X]$ was obtained by assuming that the accumulated elution amount would have been increased linearly between the accumulated elution amounts at the immediately adjacent elution fraction temperatures below and above $[T_X]$.

⟨ Sample Preparation Conditions ⟩
Sample concentration: 120 mg/30 mL
Solvent used in sample preparation: o-dichlorobenzene (special grade, manufactured by Wako Pure Chemical Industries, Ltd.)
Sample preparation temperature: 145° C.
Elution fractions: −20, 0, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70 and 140° C. (38 fractions in total)

⟨ Melting Point, Crystallization Temperature and Heat of Fusion of 4-methyl-1-pentene Homopolymers ⟩

With EXSTAR DSC7020 manufactured by SII Nano Technology, approximately 5 mg of a sample was heated from 30° C. to 300° C. in a nitrogen atmosphere (30 mL/min). The sample was held at 300° C. for 5 minutes and was cooled to 0° C. at 10° C./min. After being held at 0° C. for 5 minutes, the sample was heated to 300° C. at 10° C./min. The top of the crystallization peak observed during the cooling was obtained as the crystallization temperature (Tc), and the top of the crystal fusion peak observed during the second heating was obtained as the melting point (Tm). The heat of fusion ΔHm was calculated by integrating the crystal fusion peak.

⟨ Melting Point, Crystallization Temperature and Heat of Fusion of 4-methyl-1-pentene/propylene Copolymers ⟩

With EXSTAR DSC7020 manufactured by SII Nano Technology, approximately 5 mg of a sample was heated from 30° C. to 250° C. in a nitrogen atmosphere (30 mL/min). The sample was held at 250° C. for 5 minutes and was cooled to 0° C. at 10° C./min. After being held at 0° C. for 5 minutes, the sample was heated to 250° C. at 10° C./min. The top of the crystallization peak observed during the cooling was obtained as the crystallization temperature (Tc), and the top of the crystal fusion peak observed during the second heating was obtained as the melting point (Tm). The heat of fusion ΔHm was calculated by integrating the crystal fusion peak.

⟨ Melting Point, Crystallization Temperature and Heat of Fusion of 4-methyl-1-pentene/1-octene Copolymers, 4-methyl-1-pentene/1-decene Copolymers and 4-methyl-1-pentene/1-hexadecene/1-octadecene Copolymers ⟩

With EXSTAR DSC6220 manufactured by SII Nano Technology, approximately 4 mg of a sample was heated from 30° C. to 280° C. in a nitrogen atmosphere (30 mL/min). The sample was held at 280° C. for 5 minutes and was cooled to −50° C. at 10° C./min. After being held at −50° C. for 5 minutes, the sample was heated to 280° C. at 10° C./min. The top of the crystallization peak observed during the cooling was obtained as the crystallization temperature (Tc), and the top of the crystal fusion peak observed during the second heating was obtained as the melting point (Tm). The heat of fusion ΔHm was calculated by integrating the crystal fusion peak.

Stereoregularity (mmmm and Regioirregularity) of Polybutenes

The meso pentad fraction (mmmm), and the regioirregularity due to 2,1-insertions and 1,4-insertions were calculated by $^{13}$C-NMR spectroscopy. In the $^{13}$C-NMR spectroscopy, 50 mg of a sample was dissolved in 0.6 ml of a 4/1 mixture solvent including o-dichlorobenzene and deuterated benzene (o-dichlorobenzene/deuterated benzene by volume), and the solution was analyzed on nuclear magnetic resonance apparatus AVANCE III cryo-500 manufactured by Bruker BioSpin K.K. under conditions of 120° C., 45° pulse, 5.5 sec repetition time and 256 scans. The reference chemical shift was 27.50 ppm assigned to the mmmm of the side-chain methylene groups. The peaks were assigned with reference to K. Matsuzaki, T. Uryu, T. Asakura, NMR SPECTROSCOPY AND STEREOREGULARITY OF POLYMERS, JAPAN SCIENTIFIC SOCIETIES PRESS.

In the measurement, the peaks assigned to mmmm and mmmr, and the peaks assigned to rmmr and mmrr were not separate from each other sufficiently. Thus, the meso pentad fraction (mmmm): F (mmmm)×100(%) was calculated using the following equation assuming that I (mmmr)=I (mmrr)+I (mrrm) and I (rmmr)=0.

$$F(mmmm)=[I(mmmm+mmmr)-I(rmmr+mmrr)-I(mrrm)]/I(CH2)$$

I (X) indicates the integral of a methylene peak at 26.2 to 28.5 ppm assigned to X. I (CH$_2$) indicates the total area of methylene peaks at 26.2 to 28.5 ppm. The detection limit was 0.01%.

Propylene Content in 4-methyl-1-pentene/propylene copolymers, and α-olefin content in 4-methyl-1-pentene/α-olefin Copolymers The propylene content in 4-methyl-1-pentene/propylene copolymers, and the α-olefin content in 4-methyl-1-pentene/α-olefin copolymers were calculated by $^{13}$C-NMR spectroscopy using the following apparatus and conditions.

The nuclear magnetic resonance apparatus was AVANCE III cryo-500 manufactured by Bruker BioSpin K.K. The solvent was an o-dichlorobenzene/benzene-d$_6$ (4/1 v/v) mixed solvent. The sample concentration was 55 mg/0.6 mL. The measurement temperature was 120° C. The nucleus observed was $^{13}$C (125 MHz). The sequence was single pulse proton broad band decoupling. The pulse width was 5.0 μsec (45° pulse). The repetition time was 5.5 sec. The number of scans was 64. The reference chemical shift was 128 ppm of benzene-d$_6$. The main-chain methine signal was integrated, and the propylene content was calculated using the following equation.

$$\text{Propylene content}(\%)=[P/(P+M)]\times 100$$

Here, P indicates the total peak area of signals assigned to methine in the propylene main chain, and M indicates the total peak area of signals assigned to methine in the 4-methyl-1-pentene main chain.

With respect to 4-methyl-1-pentene/α-olefin copolymers, the signals assigned to α-olefins (except 4MP1) were integrated, and the α-olefin contents were calculated in the similar manner.

Iso Diad Tacticity of 4-methyl-1-pentene Polymers

The iso diad tacticity (meso diad fraction) of 4-methyl-1-pentene polymers was defined as the proportion of head-to-tail coupled diad 4-methyl-1-pentene unit sequences in which the isobutyl branches were on the same side of the polymer chain shown as a planar zigzag structure. This tacticity was obtained by $^{13}$C-NMR spectroscopy using the following equation.

$$\text{Iso diad tacticity}(\%)=[m/(m+r)]\times 100$$

[In the equation, m and r indicate absorption intensities assigned to the main-chain methylene groups in head-to-tail coupled 4-methyl-1-pentene units illustrated below:

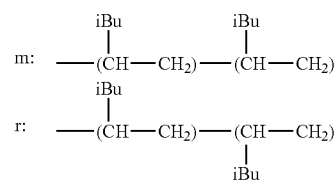

In the $^{13}$C-NMR spectroscopy, the nuclear magnetic resonance apparatus was AVANCE III cryo-500 manufactured by Bruker BioSpin K.K. The solvent was an o-dichlorobenzene/benzene-d$_6$ (4/1 v/v) mixed solvent. The sample concentration was 60 mg/0.6 mL. The measurement temperature was 120° C. The nucleus observed was $^{13}$C (125 MHz). The sequence was single pulse proton broad band decoupling. The pulse width was 5.0 μsec (45° pulse). The repetition time was 5.5 sec. The reference chemical shift was 128 ppm of benzene-d$_6$.

The peak region in the range of 41.5 to 43.3 ppm was divided at the minimum of the peak profile into a first region on the higher magnetic field side and a second region on the lower magnetic field side.

The resonance peak in the first region was assigned to the main-chain methylene in diad 4-methyl-1-pentene unit sequences illustrated in (m). This peak was regarded as representing a 4-methyl-1-pentene homopolymer, and its integral was obtained as "m". The resonance peak in the second region was assigned to the main-chain methylene in diad 4-methyl-1-pentene unit sequences illustrated in (r), and its integral was obtained as "r". The detection limit was 0.01%.

Soluble Proportion (SP) in 4-methyl-1-pentene Homopolymers

A polymer slurry was separated by filtration into a solid polymer (a white solid) and a filtrate. The solvent of the filtrate was evaporated, and thereby the polymer that had been dissolved in the filtrate was obtained. The proportion of the polymer that had been dissolved in the filtrate was calculated using the following equation.

Proportion of polymer in filtrate (wt %)=$W2/(W1+W2) \times 100$

W1: mass (g) of solid polymer (white solid) filtered
W2: mass (g) of polymer dissolved in filtrate of slurry Gel Fraction in 4-methyl-1-pentene polymers To determine the gel fraction, approximately 5 g of a sample was placed into a No. 325 mesh metal thimble of a Soxhlet extractor, and was extracted for 3 hours while boiling and refluxing p-xylene. The residue in the metal thimble was weighed, and the gel fraction was calculated using the following equation.

Gel fraction(%)=(weight of residue [g]/initial weight [g])×100

Identification of Structures and Purities of Compounds and Catalysts

The structures and purities of compounds and catalysts obtained in Examples and other studies were determined by methods such as nuclear magnetic resonance (NMR, GSH-270 manufactured by JEOL Ltd.), field desorption mass spectrometry (FD-MS, SX-102A manufactured by JEOL Ltd.) and gas chromatography mass spectrometry (GC-MS, HP6890/HP5973 manufactured by Hewlett-Packard or GC-17A/GCMS-QP5050A manufactured by Shimadzu Corporation). The steric structures of metallocene compounds were determined by comparing a spectrum obtained by $^1$H-NMR measurement to theoretical spectra calculated with respect to various stereoisomers.

Unless otherwise mentioned, all examples were carried out in a dry nitrogen atmosphere using a dried solvent.

1,1,4,4,7,7,10,10-Octamethyl-2,3,4,7,8,9,10,12-octahydro-1H-dibenzo[b,h]fluorene was synthesized in accordance with Examples described in WO 2001/27124. Hereinbelow, 1,1,4,4,7,7,10,10-octamethyl-2,3,4,7,8,9,10,12-octahydro-1H-dibenzo[b,h]fluorene will be written as "octamethylfluorene".

[Synthesis of Transition Metal Compounds]

[Synthetic Example 1] Synthesis of (1-octamethylfluoren-12'-yl-5-tert-butyl-3-isopropyl-1-methyl-1,2,3,4-tetrahydropentalene)zirconium dichloride (Catalyst A)

(1)
5-Tert-butyl-1-isopropyl-3-methyl-1,2-dihydropentalene: In a nitrogen atmosphere, a 100 ml three-necked flask was loaded with 50 ml of methanol, 2.54 g of tert-butylcyclopentadiene, 5.2 ml of pyrrolidine and 2.1 ml of isobutyl aldehyde in an ice water bath. The mixture was stirred at room temperature for 4 hours and at 40° C. for 1.5 hours. After the addition of 2.1 ml of additional isobutyl aldehyde, the mixture was stirred at room temperature for 18 hours and at 70° C. for 7 hours. 7.0 ml of acetone was added, and reaction was performed at 70° C. for 17 hours. Further, 10 ml of acetone was added, and the mixture was stirred at 70° C. for 6 hours. The reaction solution was poured into 150 ml of 0.5 M hydrochloric acid. The organic layer was separated. The aqueous layer was extracted with 150 ml of hexane. The obtained extract was combined with the previously separated organic layer, and the combined organic layer was washed with a saturated aqueous sodium hydrogen carbonate solution, water and a brine. The liquid was dried with magnesium sulfate, and the solvent was evaporated. The residue was purified by column chromatography to afford the title compound. The amount obtained was 0.96 g, and the yield was 21%.

(2)
1-Octamethylfluoren-12'-yl-5-tert-butyl-3-isopropyl-1-methyl-1,2,3,4-tetrahydropentalene: In a nitrogen atmosphere, a 100 ml three-necked flask was loaded with 1.54 g of octamethylfluorene and 30 ml of tert-butyl methyl ether. In an ice water bath, 2.60 ml of a 1.59 M hexane solution of n-butyllithium was added dropwise over a period of 12 minutes. The mixture was stirred at room temperature for 2 hours and at 40° C. for 2 hours. 15 ml of a tert-butyl methyl ether solution of 0.96 g of 5-tert-butyl-1-isopropyl-3-methyl-1,2-dihydropentalene was added at −12° C. over a period of 30 minutes. The mixture was stirred at room temperature for 21 hours. The resultant reaction solution was added to 100 ml of 0.1 N hydrochloric acid. The organic layer was separated. The aqueous layer was extracted with 80 ml of hexane. The obtained extract was combined with the previously separated organic layer, and the combined organic layer was washed one time with a saturated aqueous sodium hydrogen carbonate solution, two times with water, and one time with a brine. The liquid was dried with magnesium sulfate, and the solvent was evaporated. The resultant solid was washed with methanol to afford the title compound. The amount obtained was 1.48 g, and the yield was 62%.

The compound was identified to be the target compound based on the results of the FD-MS measurement. FD-MS: m/Z=602.5 (M$^+$).

$^1$H-NMR showed that the compound was a mixture of isomers.

(3) Catalyst A: In a nitrogen atmosphere, a 30 ml Schlenk flask was loaded with 0.699 g of 1-(octamethylfluoren-12'-yl)-5-tert-butyl-3-isopropyl-1-methyl-1,2,3,4-tetrahydropentalene, 0.140 g of α-methylstyrene, 10 g of hexane, and 1.15 ml of cyclopentyl methyl ether. In an oil bath at 26° C., 1.45 ml of a 1.65 M hexane solution of n-butyllithium was added dropwise over a period of 15 minutes. The mixture was stirred at 70° C. for 4 hours and was cooled in an ice/acetone bath. The liquid was degassed by evacuating the system for 5 minutes, and the pressure was returned to normal pressure with nitrogen. After the addition of 0.293 g of zirconium tetrachloride, reaction was performed for 17.5 hours while gradually returning the temperature to room temperature. The solvent was evaporated, and soluble components were extracted with hexane. The insolubles were removed by filtration, and the insolubles were washed with hexane. The solution obtained was concentrated and was recrystallized in hexane. The solid was filtered and was dried under reduced pressure to afford the target compound. The amount obtained was 0.189 g, and the yield was 21.4%.

The compound was identified to be the target compound based on the results of the $^1$H-NMR and FD-MS measurements.

$^1$H-NMR (270 MHz, CDCl$_3$, with reference to TMS): δ 7.98 (s, 1H), 7.90 (s, 1H), 7.66 (s, 1H), 7.42 (s, 1H), 6.22 (d, 1H), 5.26 (d, 1H), 3.74-3.67 (m, 1H), 3.00-2.91 (m, 1H), 2.62-2.54 (m, 1H), 2.31 (s, 3H), 1.80-1.68 (m, 9H), 1.55 (s, 3H), 1.42 (s, 3H), 1.40 (s, 3H), 1.39 (s, 3H), 1.28 (s, 3H), 1.27 (s, 3H), 1.25 (s, 3H), 1.09 (s, 9H), 1.04 (d, 3H), 1.01 (d, 3H).

FD-MS: m/Z=762.3 (M$^+$).

[Synthetic Example 2] Synthesis of (1-octamethylfluoren-12'-yl-3,5-di-tert-butyl-1-methyl-1,2,3,4-tetrahydropentalene) zirconium dichloride (Catalyst B)

(1) 1,5-Di-tert-butyl-3-methyl-1,2-dihydropentalene: In a nitrogen atmosphere, a 100 ml three-necked flask was loaded with 50 ml of cyclopentyl methyl ether and 2.5 g of tert-butylcyclopentadiene. In an ice water bath, 13.2 ml of a 1.57 M hexane solution of n-butyllithium was added dropwise to the solution over a period of 40 minutes. The mixture was stirred at room temperature for 2 hours. In an ice water bath, 2.02 g of pivalaldehyde was added dropwise over a period of 3 minutes, and the mixture was stirred at room temperature for 3 hours. 8.3 ml of pyrrolidine and 6.0 ml of acetone were added, and the mixture was stirred at 80° C. for 16 hours. The reaction solution was poured into 100 ml of 1.1 N hydrochloric acid. The organic layer was separated. The aqueous layer was extracted with 100 ml of hexane. The obtained extract was combined with the previously separated organic layer, and the combined organic layer was washed with a saturated aqueous sodium hydrogen carbonate solution, water and a brine. The liquid was dried with magnesium sulfate, and the solvent was evaporated. The resultant solid was added to a mixed solvent including ethanol and methanol, and the mixture was stirred. The solid precipitated was filtered and was dried under reduced pressure to afford the title compound. The amount obtained was 2.09 g, and the yield was 44%.

The compound was identified to be the target compound based on the results of the $^1$H-NMR measurement.

$^1$H-NMR (270 MHz, CDCl$_3$, with reference to TMS): δ 5.99 (s, 1H), 5.85 (s, 1H), 2.95-2.66 (m, 3H), 2.13 (s, 3H), 1.22 (s, 9H), 0.91 (s, 9H).

(2) 1-Octamethylfluoren-12'-yl-3,5-di-tert-butyl-1-methyl-1,2,3,4-tetrahydropentalene: In a nitrogen atmosphere, a 100 ml three-necked flask was loaded with 2.27 g of octamethylfluorene, 50 ml of cyclohexane and 1.4 ml of cyclopentyl methyl ether. In an ice water bath, 3.90 ml of a 1.57 M hexane solution of n-butyllithium was added dropwise over a period of 10 minutes. The mixture was stirred at 50° C. for 2 hours. 1.50 g of 1,5-di-tert-butyl-3-methyl-1,2-dihydropentalene was added, and the mixture was stirred at 80° C. for 17 hours. Thereafter, the reaction solution was added to 50 ml of 0.2 N hydrochloric acid. The organic layer was separated. The aqueous layer was extracted with 200 ml of hexane. The obtained extract was combined with the previously separated organic layer, and the combined organic layer was washed one time with a saturated aqueous sodium hydrogen carbonate solution, two times with water, and one time with a brine. The liquid was dried with magnesium sulfate, and the solvent was evaporated. The resultant solid was purified by column chromatography and was washed with hexane to afford the title compound as a light yellow powder. The amount obtained was 1.91 g, and the yield was 53%.

The compound was identified to be the target compound based on the results of the FD-MS measurement. FD-MS: m/Z=616.5 (M$^+$).

$^1$H-NMR showed that the compound was a mixture of isomers.

(3) Catalyst (B): In a nitrogen atmosphere, a 30 ml Schlenk flask was loaded with 1.00 g of 1-octamethylfluoren-12'-yl-3,5-di-tert-butyl-1-methyl-1,2,3,4-tetrahydropentalene, 0.386 g of α-methylstyrene, 16 g of cyclohexane, and 1.90 ml of cyclopentyl methyl ether. In an oil bath at 26° C., 2.10 ml of a 1.57 M hexane solution of n-butyllithium was added dropwise over a period of 10 minutes. The mixture was stirred at 70° C. for 5 hours and was cooled in an ice/acetone bath. The liquid was degassed by evacuating the system for 5 minutes, and the pressure was returned to normal pressure with nitrogen. After the addition of 0.3978 g of zirconium tetrachloride, the acetone bath was removed and reaction was performed at room temperature for 16 hours. The solvent was evaporated, and soluble components were extracted with hexane. The insolubles were removed by filtration, and the insolubles were washed with hexane. The solution obtained was concentrated and was recrystallized in hexane. The solid was filtered and was dried under reduced pressure to afford the target compound. The amount obtained was 0.423 g, and the yield was 34%.

The compound was identified to be the target compound based on the results of the $^1$H-NMR and FD-MS measurements.

$^1$H-NMR (270 MHz, CDCl$_3$, with reference to TMS): δ 7.97 (1H, s), 7.90 (1H, s), 7.67 (1H, s), 7.43 (1H, s), 6.22 (1H, d), 5.27 (1H, d), 3.58 (1H, dd), 3.08 (1H, dd), 2.63 (1H, dd), 2.31 (3H, s), 1.784-1.661 (11H, m), 1.552 (3H, s), 1.445-1.352 (3H, m), 1.30-1.28 (12H, m), 1.24 (3H, s), 1.09 (9H, s), 0.98 (9H, s).

FD-MS: m/Z=776.3 (M$^+$).

[Synthetic Example 3] Synthesis of (8-octamethylfluoren-12'-yl-(2-tert-butyl-8-methyl-3,3b,4,5,6,7,7a,8-octahydrocyclopenta[a]indene))zirconium dichloride (Catalyst C)

(1) 2-Tert-butyl-8-methyl-3,3b,4,5,6,7,7a,8-octahydrocyclopenta[a]indene: In a nitrogen atmosphere, a 100 ml three-necked flask was loaded with 50 ml of THF and 2.5 g of tert-butylcyclopentadiene. In an ice/acetone bath, 13.0 ml of a 1.65 M hexane solution of n-butyllithium was added dropwise to the solution over a period of 40 minutes. The mixture was stirred at room temperature for 17 hours. In an ice water bath, 2.19 g of magnesium chloride was added, and the mixture was stirred at room temperature for 6.5 hours. 0.432 g of copper iodide was added. In an ice/acetone bath, 7.08 g (38.3 wt %) of a hexane solution of 1-acetylcyclohexene was added dropwise over a period of 10 minutes, and the mixture was stirred at room temperature for 19 hours. 1.3 ml of acetic acid and 5.2 ml of pyrrolidine were added, and the mixture was stirred at room temperature for 17 hours. The reaction solution was poured into 120 ml of 0.5 N hydrochloric acid. The organic layer was separated. The aqueous layer was extracted with 200 ml of hexane. The obtained extract was combined with the previously separated organic layer, and the combined organic layer was washed with water, a saturated aqueous sodium hydrogen carbonate solution and a brine. The liquid was dried with magnesium sulfate, and the solvent was evaporated. The obtained product was recrystallized in methanol to afford the title compound. The amount obtained was 0.445 g, and the yield was 9.5%.

The compound was identified to be the target compound based on the results of the $^1$H-NMR and GC-MS measurements.

$^1$H-NMR (Toluene-d8): δ 6.01 (1H, s), 5.98 (1H, s), 2.88-2.73 (2H, m), 1.84 (3H, s), 1.80-1.03 (17H, m).

GC-MS: m/Z=228 (M$^+$).

(2) 8-Octamethylfluoren-12'-yl-(2-tert-butyl-8-methyl-3,3b, 4,5,6,7,7a, 8-octahydrocyclopenta[a]indene): In a nitrogen atmosphere, a 30 ml Schlenk flask was loaded with 0.655 g of octamethylfluorene and 20 ml of tert-butyl methyl ether. In an ice water bath, 1.10 ml of a 1.65 M hexane solution of n-butyllithium was added dropwise over a period of 15 minutes. The mixture was stirred for 22 hours while gradually returning the temperature to room temperature. There was added 0.453 g of 2-tert-butyl-8-methyl-3,3b, 4,5,6,7,7a, 8-octahydrocyclopenta[a]indene. The mixture was stirred at room temperature for 19 hours and at 50° C. for 6.5 hours. Thereafter, the reaction solution was added to 100 ml of 0.1 N hydrochloric acid. The organic layer was separated. The aqueous layer was extracted with 100 ml of hexane. The obtained extract was combined with the previously separated organic layer, and the combined organic layer was washed one time with a saturated aqueous sodium hydrogen carbonate solution, two times with water, and one time with a brine. The liquid was dried with magnesium sulfate, and the solvent was evaporated. The resultant solid was purified by column chromatography and was washed with acetone to afford the title compound. The amount obtained was 0.50 g, and the yield was 48%.

The compound was identified to be the target compound based on the results of the FD-MS measurement. FD-MS: m/Z=614.5 (M$^+$).

$^1$H-NMR showed that the compound was a mixture of isomers.

(3) Catalyst (C): In a nitrogen atmosphere, a 30 ml Schlenk flask was loaded with 0.503 g of 8-octamethylfluoren-12'-yl-(2-tert-butyl-8-methyl-3,3b, 4,5,6,7,7a, 8-octahydrocyclopenta[a]indene, 0.193 g of α-methylstyrene, 13.6 g of hexane, and 0.95 ml of cyclopentyl methyl ether. In an oil bath at 25° C., 1.00 ml of a 1.65 M hexane solution of n-butyllithium was added dropwise over a period of 10 minutes. The mixture was stirred at 70° C. for 4 hours and was cooled in an ice/acetone bath. The liquid was degassed by evacuating the system for 5 minutes, and the pressure was returned to normal pressure with nitrogen. After the addition of 0.193 g of zirconium tetrachloride, the acetone bath was removed and reaction was performed at room temperature for 17 hours. The solvent was evaporated, and soluble components were extracted with hexane. The insolubles were removed by filtration, and the insolubles were washed with hexane. The solution obtained was concentrated. The supernatant was removed by decantation, and the solid was washed with hexane and was dried under reduced pressure to afford the target compound. The amount obtained was 0.057 g, and the yield was 9.0%.

The compound was identified to be the target compound based on the results of the $^1$H-NMR and FD-MS measurements.

$^1$H-NMR (270 MHz, CDCl$_3$, with reference to TMS): δ 7.99 (1H, s), 7.86 (1H, s), 7.61 (1H, s), 7.32 (1H, s), 6.16 (1H, s), 5.33 (1H, s), 3.58-3.49 (2H, m), 2.34-2.29 (1H, m), 2.20 (3H, s), 1.93-1.19 (39H, m), 1.10 (9H, s).

FD-MS: m/Z=774.3 (M$^+$).

[Synthetic Example 4] Synthesis of (8-octamethylfluoren-12'-yl-(2-(adamantan-1-yl)-8-methyl-3,3b,4, 5,6,7,7a,8-octahydrocyclopenta[a]indene))zirconium dichloride (Catalyst D)

(1) 1-Adamantylcyclopentadienyllithium: In a nitrogen atmosphere, a 200 ml three-necked flask was loaded with a tert-butyl methyl ether solution of ethylmagnesium bromide (1.0M, 40 ml). While cooling the solution in an ice bath, 2.64 g of cyclopentadiene was added dropwise over a period of 20 minutes. The mixture was stirred at room temperature for 17 hours to give a solution A.

In a nitrogen atmosphere, a 500 ml three-necked flask was loaded with 200 ml of diisopropyl ether and 0.36 g of copper (II) trifluoromethanesulfonate. In a water bath, the solution A prepared above was added dropwise to the solution over a period of 20 minutes. A solution of 4.30 g of 1-bromo-adamantane in 40 mL of diisopropyl ether was added dropwise, and the mixture was stirred at 70° C. for 10 hours. The reaction liquid was cooled to room temperature. In a water bath, 200 ml of a saturated aqueous ammonium chloride solution was added. The organic layer was separated. The aqueous layer was extracted with 200 ml of hexane. The obtained extract was combined with the previously separated organic layer, and the combined organic layer was washed with water. The liquid was dried with magnesium sulfate, and the solvent was evaporated. The residue was purified by silica gel column chromatography to afford 4.2 g of a crude product.

In a nitrogen atmosphere, a 100 ml Schlenk flask was loaded with 4.2 g of the crude product and 20 mL of hexane. In an ice bath, 13.8 mL of a 1.6 M hexane solution of n-butyllithium was added dropwise to the solution over a period of 20 minutes. The mixture was stirred at room temperature for 17 hours. The precipitate was filtered out from the reaction liquid and was washed with hexane to afford the title compound. The amount obtained was 2.70 g, and the yield was 66%.

The compound was identified to be the target compound based on the results of the $^1$H-NMR measurement.

$^1$H-NMR (THF-d$^8$): δ 5.57-5.55 (2H, m), 5.52-5.50 (2H, m), 1.96 (3H, s), 1.87 (6H, s), 1.74 (6H, s).

(2) 2-(Adamantan-1-yl)-8-methyl-3,3b, 4,5,6,7,7a,8-octahydrocyclopenta[a]indene: In a nitrogen atmosphere, a 100 ml three-necked flask was loaded with 40 ml of THF and 1.57 g of magnesium chloride. To the solution, a solution of 3.09 g of 1-adamantylcyclopentadienyllithium in 10 ml of THF was added dropwise over a period of 5 minutes. The mixture was stirred at room temperature for 2 hours and at 50° C. for 3 hours. In an ice/acetone bath, a solution of 1.96 g (15.75 mmol) of 1-acetylcyclohexene in 10 ml of THF was added dropwise over a period of 10 minutes. The mixture was stirred at room temperature for 19 hours. In an ice/acetone bath, 1.0 ml of acetic acid and 3.1 ml of pyrrolidine were added, and the mixture was stirred at room temperature for 17 hours. In an ice/acetone bath, 30 ml of a saturated aqueous ammonium chloride solution was added. After the addition of 100 ml of hexane, the organic layer was separated. The aqueous layer was extracted with 200 ml of hexane. The obtained extract was combined with the previously separated organic layer, and the combined organic layer was washed with water two times. The liquid was dried with magnesium sulfate, and the solvent was evaporated.

The obtained product was recrystallized in methanol to afford the title compound. The amount obtained was 2.134 g, and the yield was 47%.

The compound was identified to be the target compound based on the results of the $^1$H-NMR and GC-MS measurements.

$^1$H-NMR (Toluene-d$^8$): δ 6.06 (1H, s), 5.98 (1H, s), 2.88-2.78 (2H, m), 1.98-1.13 (26H, m).

GC-MS: m/Z=306 (M$^+$).

(3)

8-Octamethylfluoren-12'-yl-(2-(adamantan-1-yl)-8-methyl-3,3b, 4,5,6,7,7a, 8-octahydrocyclopenta[a]indene): In a nitrogen atmosphere, a 30 ml Schlenk flask was loaded with 1.546 g of octamethylfluorene and 40 ml of tert-butyl methyl ether. In an ice/acetone bath, 2.62 ml of a 1.6 M hexane solution of n-butyllithium was added dropwise over a period of 15 minutes. While gradually returning the temperature to room temperature, the mixture was stirred for 22 hours. There was added 1.349 g of 2-(adamantan-1-yl)-8-methyl-3,3b, 4,5,6,7,7a, 8-octahydrocyclopenta[a]indene. The mixture was stirred at room temperature for 19 hours and at 50° C. for 8 hours. The reaction solution was added to 100 ml of a saturated aqueous ammonium chloride solution. The organic layer was separated. The aqueous layer was extracted with 100 ml of hexane. The obtained extract was combined with the previously separated organic layer, and the combined organic layer was washed with water two times. The liquid was dried with magnesium sulfate, and the solvent was evaporated. The resultant solid was washed with acetone to afford the title compound. The amount obtained was 1.51 g, and the yield was 54%.

The compound was identified to be the target compound based on the results of the FD-MS measurement. FD-MS: m/Z=693 (M$^+$).

$^1$H-NMR showed that the compound was a mixture of isomers.

(4) Catalyst (D): In a nitrogen atmosphere, a 100 ml Schlenk flask was loaded with 1.039 g of 8-octamethylfluoren-12'-yl-(2-(adamantan-1-yl)-8-methyl-3,3b, 4,5,6,7,7a, 8-octahydrocyclopenta[a]indene), 0.47 ml of α-methylstyrene, 30 ml of hexane and 2.62 ml of cyclopentyl methyl ether. In an oil bath at 25° C., 2.18 ml of a 1.6M hexane solution of n-butyllithium was added dropwise over a period of 10 minutes. The mixture was stirred at 50° C. for 4 hours. The precipitate was filtered and was washed with hexane to give a pink powder. A 100 ml Schlenk flask was loaded with the pink powder and 30 ml of diethyl ether. After the mixture was cooled in a dry ice/acetone bath, a suspension of 0.385 g (1.65 mmol) of zirconium tetrachloride in 30 ml of diethyl ether was added. Thereafter, the mixture was stirred for 16 hours while gradually increasing the temperature to room temperature.

The solvent was removed under reduced pressure, and soluble components were extracted from the residue using approximately 70 ml of dichloromethane. The solution obtained was concentrated, combined with 50 ml of hexane, and filtered to remove insolubles. The solution was concentrated to approximately 10 ml, and the concentrate was allowed to stand overnight at −30° C. The precipitated powder was collected by filtration and was washed with hexane to give 0.384 g of an orange powder. The orange powder was dissolved by the addition of 5 ml of diethyl ether, and the solution was allowed to stand overnight at −30° C. The precipitated powder was collected by filtration and was washed with hexane to afford the target compound. The amount obtained was 0.220 g, and the yield was 17%.

The compound was identified to be the target compound based on the results of the $^1$H-NMR measurement.

$^1$H-NMR (270 MHz, CDCl$_3$, with reference to TMS): δ 7.98 (1H, s), 7.86 (1H, s), 7.60 (1H, s), 7.37 (1H, s), 6.19 (1H, J=1.6 Hz, d), 5.33 (1H, J=1.6 Hz, d), 3.58-3.44 (2H, m), 2.35-2.28 (1H, m), 2.18 (3H, s), 1.94-1.18 (54H, m).

[Synthetic Example 5] Synthesis of (1-octamethylfluoren-12'-yl-5-adamantyl-3-isopropyl-1-methyl-1,2,3,4-tetrahydropentalene) zirconium dichloride (Catalyst E)

(1)

5-Adamantyl-1-isopropyl-3-methyl-1,2-dihydropentalene:

In a nitrogen atmosphere, a 100 ml three-necked flask was loaded with 2.5 g of adamantylcyclopentadienyllithium synthesized in Synthetic Example 4, and 60 ml of cyclopentyl methyl ether. The flask was then placed into an ice water bath. There was added 1.33 ml of isobutylaldehyde, and the mixture was stirred at room temperature for 17 hours. Further, 0.66 ml of isobutylaldehyde was added, and the mixture was stirred at room temperature for 7 hours. Furthermore, 0.66 ml of isobutylaldehyde was added, and the mixture was stirred at 50° C. for 17 hours. The mixture was then cooled to room temperature, and 5.2 ml of pyrrolidine and 4.0 ml of acetone were added. Reaction was performed at 70° C. for 18 hours. A saturated aqueous ammonium chloride solution was added. The organic layer was separated. The aqueous layer was extracted with diethyl ether. The obtained extract was combined with the previously separated organic layer, and the combined organic layer was washed with a saturated aqueous sodium hydrogen carbonate solution, water and a brine. The liquid was dried with magnesium sulfate, and the solvent was evaporated. The residue was purified by column chromatography and was washed with ethanol to afford the title compound. The amount obtained was 706 mg, and the yield was 20%.

The compound was identified to be the target compound based on the results of the $^1$H-NMR (CDCl$_3$) and FD-MS measurements.

$^1$H-NMR (270 MHz, CDCl$_3$): δ 6.03 (s, 1H), 5.83 (s, 1H), 3.07-2.97 (m, 1H), 2.78-2.73 (m, 1H), 2.66-2.60 (m, 1H), 2.14-1.74 (m, 19H), 0.961 (s, 3H), 0.936 (s, 3H).

FD-MS: m/Z=294.3 (M$^+$).

(2)

1-Octamethylfluoren-12'-yl-5-adamantyl-3-isopropyl-1-methyl-1,2,3,4-tetrahydropentalene: In a nitrogen atmosphere, a 100 ml three-necked flask was loaded with 893 mg of octamethylfluorene and 20 ml of tert-butyl methyl ether. 1.5 ml of a 1.63 M hexane solution of n-butyllithium was added dropwise over a period of 5 minutes. The mixture was stirred at room temperature for 2 hours and at 40° C. for 2 hours. The temperature was returned to room temperature. In an ice bath, a solution of 748 mg of 5-adamantyl-1-isopropyl-3-methyl-1,2-dihydropentalene in 30 ml of tert-butyl methyl ether was added. The mixture was stirred at room temperature for 24 hours. A saturated aqueous ammonium chloride solution was added. The organic layer was separated and was washed with a saturated aqueous sodium hydrogen carbonate solution, water and a brine. The liquid was dried with magnesium sulfate, and the solvent was evaporated. The resultant solid was washed with methanol to afford the title compound. The amount obtained was 1.027 g, and the yield was 64%.

The compound was identified to be the target compound based on the results of the FD-MS measurement.

¹H-NMR showed that the compound was a mixture of isomers.

FD-MS: m/Z=680.6 (M⁺).

(3) Catalyst (E): In a nitrogen atmosphere, a 100 ml Schlenk flask was loaded with 1000 mg of 1-octamethyl-fluoren-12'-yl-5-adamantyl-3-isopropyl-1-methyl-1,2,3,4-tetrahydropentalene, 30 ml of hexane, 2.57 ml of cyclopentyl methyl ether and 0.46 ml of α-methylstyrene. 2.16 ml of a 1.63 M hexane solution of n-butyllithium was added dropwise over a period of 10 minutes. The mixture was stirred at 70° C. for 4 hours. The solvent was evaporated, and 20 ml of hexane was added to the solid. The mixture was filtered to collect the solid, which was then dried under reduced pressure. The resultant solid weighing 708 mg was added to a 100 ml Schlenk flask, and 40 ml of diethyl ether was added. In a dry ice/methanol bath, 255 mg of zirconium tetrachloride was added, and the mixture was stirred for 30 minutes. The dry ice/methanol bath was removed, and the mixture was stirred for 18 hours while returning the temperature to room temperature. The solvent was evaporated, and soluble components were extracted with dichloromethane and hexane. The solution obtained was concentrated and was dissolved in 2 ml of hexane. Recrystallization was performed at −20° C. The resultant red solid precipitate was recovered by filtration, washed with hexane, and dried under reduced pressure to afford the title compound. The amount obtained was 207.6 mg, and the yield was 17%.

The compound was identified to be the target compound based on the results of the ¹H-NMR (CDCl₃) and FD-MS measurements.

¹H-NMR (270 MHz, CDCl₃): δ 7.97 (s, 1H), 7.89 (s, 1H), 7.65 (s, 1H), 7.42 (s, 1H), 6.24 (d, 1H), 5.25 (d, 1H), 3.74-3.67 (m, 1H), 3.00-2.91 (m, 1H), 2.62-2.53 (m, 1H), 2.30 (s, 3H), 1.88-1.24 (m, 48H), 1.04 (d, 3H), 1.01 (d, 3H).

FD-MS: m/Z=840.3 (M⁺).

[Comparative Synthetic Example 1] Synthesis of [3-(octamethylfluoren-12'-yl) (1,1,3-trimethyl-5-tert-butyl-1,2,3,3a-tetrahydropentalene)]zirconium dichloride (Catalyst a)

(1)

5-Tert-butyl-1,1,3-trimethyl-1,2-dihydropentalene: In a nitrogen atmosphere, a 200 ml three-necked flask was loaded with 4.83 g of tert-butylcyclopentadiene, 9.0 ml of 4-methylpent-3-en-2-one, 40 ml of methanol and 16.5 ml of pyrrolidine. The mixture was stirred for 43 hours under reflux. The reaction solution was poured into 250 ml of 1 N hydrochloric acid. The organic layer was separated. The aqueous layer was extracted with 200 ml of hexane. The obtained extract was combined with the previously separated organic layer, and the combined organic layer was washed with water and a brine. The liquid was dried with magnesium sulfate, and the solvent was evaporated. The residue was purified by column chromatography to afford the title compound. The purity was determined to be 86.8% by gas chromatography. The amount obtained was 5.46 g, and the yield was 59.4%.

¹H-NMR (270 MHz, CDCl₃, with reference to TMS): δ 5.87 (s, 1H), 5.79 (s, 1H), 2.94 (d, 1H), 2.10 (t, 3H), 1.27 (s, 1H), 1.21 (s, 9H).

GC-MS: m/Z=202 (M⁺).

(2)

3-(Octamethylfluoren-12'-yl) (1,1,3-trimethyl-5-tert-butyl-1,2,3,3a-tetrahydropentalene): In a nitrogen atmosphere, a 100 ml three-necked flask was loaded with 1.58 g of octamethylfluorene and 30 ml of diethyl ether. In an ice/acetone bath, 2.7 ml of a 1.56 M hexane solution of n-butyllithium was added dropwise over a period of 15 minutes. The mixture was stirred for 25 hours while gradually increasing the temperature to room temperature. 10 ml of a diethyl ether solution of 0.95 g of 5-tert-butyl-1,1,3-trimethyl-1,2-dihydropentalene was added over a period of 5 minutes. The mixture was stirred for 56 hours under reflux. The reaction solution was poured into 100 ml of 1 N hydrochloric acid. The organic layer was separated. The aqueous layer was extracted with 75 ml of hexane two times. The obtained extract was combined with the previously separated organic layer, and the combined organic layer was washed one time with a saturated aqueous sodium hydrogen carbonate solution, two times with water, and one time with a brine. The liquid was dried with magnesium sulfate, and the solvent was evaporated. The resultant solid was purified by column chromatography and was washed with pentane and ethanol to afford the title compound. The amount obtained was 2.02 g, and the yield was 84%.

The compound was identified to be the target compound based on the results of the ¹H-NMR and FD-MS measurements.

¹H-NMR (270 MHz, CDCl₃, with reference to TMS): δ 7.58 (s, 1H), 7.55+7.54 (s, 1H), 7.50+7.49 (s, 1H), 6.89+6.46 (s, 1H), 6.32+5.93 (s, 1H), 3.87+3.83 (s, 1H), 3.11 (q, 1H), 2.68 (d, 1H), 1.71 (s, 3H), 1.67-1.61 (m, 8H), 1.38-1.28 (m, 27H), 1.18-0.95 (m, 11H), 0.27+0.21 (s, 3H).

FD-MS: m/Z=589 (M⁺).

(3) Catalyst (a): In a nitrogen atmosphere, a 30 ml Schlenk flask was loaded with 0.884 g of 3-(octamethylfluoren-12'-yl) (1,1,3-trimethyl-5-tert-butyl-1,2,3,3a-tetrahydropentalene) and 20 ml of hexane. In an ice/acetone bath, 2.05 ml of a 1.56 M hexane solution of n-butyllithium was added, and the mixture was stirred for 15 minutes. 0.351 g (3.12 mmol) of tert-butoxypotassium was added. The mixture was stirred for 5 hours while gradually returning the temperature to room temperature. Thereafter, the mixture was filtered to give a red purple powder. The red purple powder was washed with approximately 10 ml of hexane. The red purple powder and 30 ml of diethyl ether were added to a 30 ml Schlenk flask. After cooling in an ice/acetone bath, 0.452 g (1.94 mmol) of zirconium tetrachloride was added. The mixture was stirred for 39 hours while gradually returning the temperature to room temperature. The solvent was evaporated, and soluble components were extracted with dichloromethane. The solvent was evaporated. Hexane was added to the solid obtained, and soluble components were extracted. The hexane solution was concentrated, and a solid was precipitated, removed by decantation, and dried under reduced pressure to afford the target compound. The amount obtained was 0.248 g, and the yield was 22.2%.

The compound was identified to be the target compound based on the results of the ¹H-NMR and FD-MS measurements.

¹H-NMR (270 MHz, CDCl₃, with reference to TMS): δ 7.99 (s, 1H), 7.98 (s, 1H), 7.78 (s, 1H), 7.54 (s, 1H), 6.01 (d, 1H), 5.25 (d, 1H), 3.94 (d, 1H), 2.62 (d, 1H), 2.31 (s, 3H), 1.79-1.61 (m, 8H), 1.57 (s, 3H), 1.43 (s, 3H), 1.41 (s, 3H), 1.39 (s, 9H), 1.35 (s, 3H), 1.32 (s, 3H), 1.28 (s, 3H), 1.24 (s, 3H), 1.09 (s, 9H).

FD-MS: m/Z=748 (M+).

[Comparative Synthetic Example 2] Metallocene Compound Synthesized in Accordance with Synthetic Example 1 of WO 2006/025540 (diphenylmethylene(3-tert-butyl-5-ethylcyclopentadienyl) (2,7-di-tert-butylfluorenyl)zirconium dichloride; Catalyst b)

[Comparative Synthetic Example 3] Metallocene Compound Synthesized in Accordance with Example 1 of WO 2001/027124 (dimethylmethylene(3-tert-butyl-5-methylcyclopentadienyl)fluorenylzirconium dichloride; Catalyst c)

[Comparative Synthetic Example 4] Metallocene Compound Synthesized in Accordance with Example 3c of WO 2004/087775 (diphenylmethylene(3-tert-butyl-5-methylcyclopentadienyl) (2,7-di-tert-butylfluorenyl) zirconium dichloride; Catalyst d)

Catalyst A

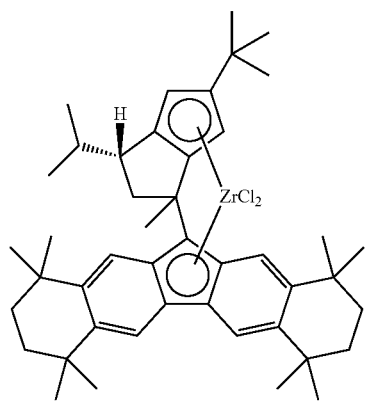

Catalyst B

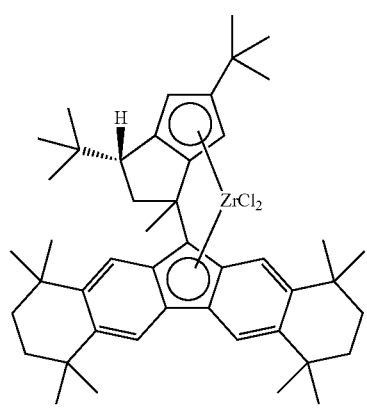

-continued

Catalyst C

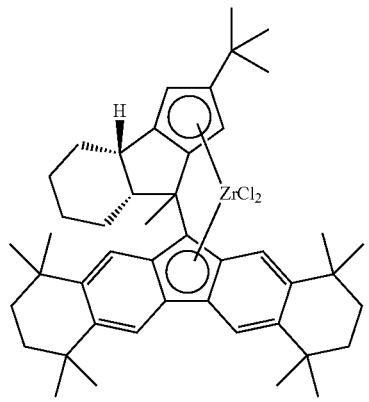

Catalyst D

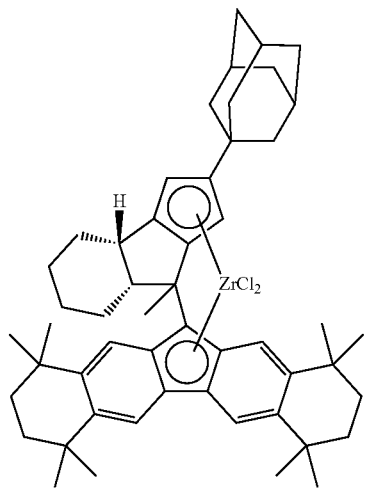

Catalyst E

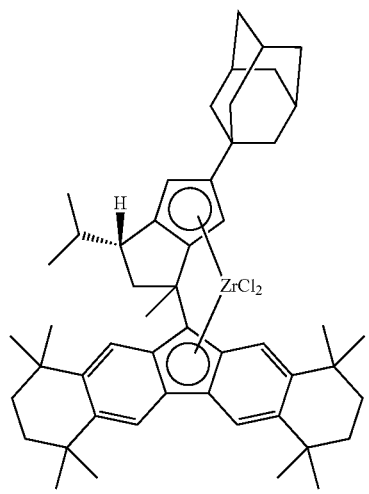

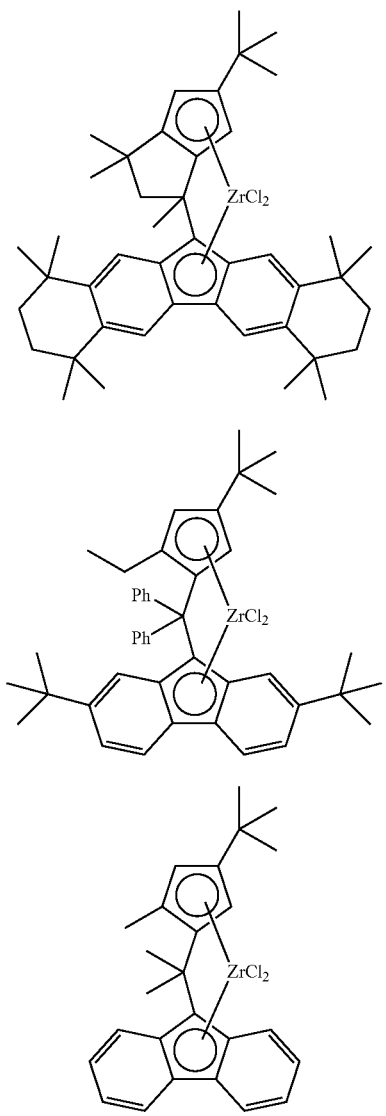

Catalyst a

Catalyst b

Catalyst c

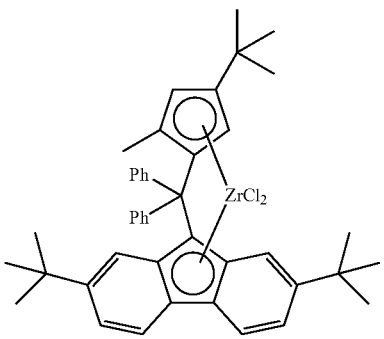

Catalyst d

Example 1A

A 500 ml-volume gas-flow glass polymerization reactor that had been thoroughly purged with nitrogen was loaded with 250 ml of hexane. At 25° C., 1-butene was supplied at 90 L/h and the system was thoroughly saturated with the gas. Next, 0.25 mmol of triisobutylaluminum was added. Further, there was added a hexane solution of a mixture including 10 μmol of a transition metal compound (the catalyst B) and 5.0 mmol (in terms of Al atoms) of methylaluminoxane (MMAO-3A) manufactured by TOSO FINECHEM CORPORATION. Polymerization was performed for 45 minutes while maintaining the system at 25° C. The polymerization was terminated by adding a small amount of isobutyl alcohol. The polymerization suspension was added to 1 L of a methanol-acetone mixed solvent (1:1 by volume) containing a small amount of hydrochloric acid, and the mixture was sufficiently stirred and filtered. The polymer was washed with a large amount of methanol and was dried at 80° C. for 10 hours. The results are described in Table 1.

Examples 2A to 4A and Comparative Examples 1A and 2A

Polymerization was performed by the same process as in Example 1A, except that the type and the amount of the transition metal compound and the amount of methylaluminoxane in the hexane solution, and the polymerization conditions in Example 1A were changed as described in Table 1. The results are described in Table 1 and Table 2.

TABLE 1

| | Hexane solution | | | | 1-Butene L/h | Hydrogen L/h | Polymerization temperature ° C. | Polymerization time min | Yield amount g | Catalytic activity kg/mmol-Zr/h | Tm ° C. | Mw ×10$^4$ | Mw/Mn |
|---|---|---|---|---|---|---|---|---|---|---|---|---|---|
| | Transition metal compound | | Methylaluminoxane (in terms of Al atoms) | | | | | | | | | | |
| Ex. 1A | Catalyst B | 10 μmol | MMAO-3A | 5.0 mmol | 90 | 0.00 | 25 | 45 | 9.27 | 1.0 | 128.2 | 74.5 | 1.92 |
| Ex. 2A | Catalyst B | 0.60 μmol | MMAO-3A | 0.30 mmol | 90 | 0.25 | 25 | 45 | 1.80 | 4.0 | 129.4 | 243 | 2.75 |
| Ex. 3A | Catalyst C | 10 μmol | MMAO-3A | 5.0 mmol | 90 | 0.00 | 25 | 7.0 | 6.33 | 5.0 | 126.7 | 35.4 | 2.04 |
| Ex. 4A | Catalyst C | 0.60 μmol | MMAO-3A | 0.30 mmol | 90 | 0.25 | 25 | 25 | 2.59 | $1.0 \times 10^1$ | 128.5 | 163 | 2.53 |
| Comp. Ex. 1A | Catalyst a | 10 μmol | MMAO-3A | 5.0 mmol | 90 | 0.00 | 25 | 60 | 0.25 | $2.5 \times 10^{-2}$ | 120.4 | 3.58 | 1.27 |
| Comp. Ex. 2A | Catalyst a | 0.60 μmol | MMAO-3A | 0.30 mmol | 90 | 0.25 | 25 | 60 | 0.43 | $7.1 \times 10^{-1}$ | 123.5 | 59.5 | 2.24 |

*Hydrogen was supplied together with 1-butene.

TABLE 2

| | | 1-Butene homopolymerization | | | | | | |
|---|---|---|---|---|---|---|---|---|
| | Catalyst | Tm °C. | TmII °C. | Tc °C. | mmmm % | Regioerrors | Mw ×10$^4$ | Mw/Mn |
| Ex. 2A | Catalyst B | 129.4 | 122.0 | 75.5 | 99.3 | Below detection limit | 243 | 2.75 |
| Ex. 4A | Catalyst C | 128.5 | 119.7 | 72.6 | 99.3 | Below detection limit | 163 | 2.53 |
| Comp. Ex. 2A | Catalyst a | 123.5 | 111.3 | 67.2 | 97.5 | Below detection limit | 59.5 | 2.24 |

Example 5A

A stirrer was placed into a 30 mL branched flask that had been purged with nitrogen. The flask was then loaded with 3.9 mg of a transition metal compound (the catalyst D), 5 mL of heptane and 0.35 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 500 mL of heptane and 1.5 mL of a 0.5 M heptane solution of triisobutylaluminum and thereafter with 100 g of 1-butene. The autoclave was heated to 70° C., and nitrogen was supplied to control the autoclave inside pressure to 0.50 MPaG.

The whole amount of the catalyst solution was added to the autoclave, and polymerization was performed at 70° C. for 20 minutes. The polymerization was terminated by adding methanol to the autoclave. The resultant polymer solution was added to 2 L of a methanol-acetone mixed solvent (1:1 by volume) and thereby the polymer was precipitated. The polymer was dried under reduced pressure at 80° C. for 10 hours. The results are described in Table 3-1.

Example 6A

Polymerization was performed by the same process as in Example 5A, except that the polymerization temperature in Example 5A was changed to 40° C. The results are described in Table 3-1.

Example 7A

Polymerization was performed by the same process as in Example 5A, except that the amount of 1-butene and the polymerization temperature in Example 5A were changed to 180 g and 50° C. The results are described in Table 3-1 and Table 3-2. The obtained polymer will be written as X1.

Example 8A

Polymerization was performed by the same process as in Example 7A, except that the polymerization temperature in Example 7A was changed to 60° C. The results are described in Table 3-1.

Example 9A

Polymerization was performed by the same process as in Example 7A, except that the amounts of the transition metal compound and the methylaluminoxane, and the polymerization temperature in Example 7A were changed as described in Table 3-1, that the addition of 1-butene was followed by the addition of 0.06 NL of hydrogen, and that the polymerization temperature was changed to 60° C. The results are described in Table 3-1.

Example 10A

Polymerization was performed by the same process as in Example 7A, except that the amounts of the transition metal compound and the methylaluminoxane, and the polymerization temperature in Example 7A were changed as described in Table 3-1, that the addition of 1-butene was followed by the addition of 0.13 NL of hydrogen, and that the polymerization temperature was changed to 60° C. The results are described in Table 3-1 and Table 3-2. The obtained polymer will be written as X2. The results of cross fractionation chromatography (CFC) with respect to the polymer X2 are described in Table 3-3.

Comparative Example 3A

Polymerization was performed by the same process as in Example 7A, except that the type of the transition metal compound in Example 7A was changed as described in Table 3-1, that the addition of 1-butene was followed by the addition of 0.012 NL of hydrogen, and that the polymerization temperature was changed to 40° C. The results are described in Table 3-1 and Table 3-2. The obtained polymer will be written as X3.

Comparative Example 4A

Polymerization was performed by the same process as in Example 7A, except that the type of the transition metal compound, and the amounts of the transition metal compound and the methylaluminoxane in Example 7A were changed as described in Table 3-1, and that the polymerization temperature was changed to 60° C. The results are described in Table 3-1. The obtained polymer will be written as X4. The results of cross fractionation chromatography (CFC) with respect to the polymer X4 are described in Table 3-3.

TABLE 3-1

1-Butene pressure homopolymerization

| | Catalyst | Amount of catalyst μmol | Amount of co-catalyst mmol | Amount of solvent L | Amount of butent g | Polymerization temperature ° C. | Polymerization time min | Yield amount g | Catalytic activity (kg/mmol-Zr · h) | [η] dl/g | Tm ° C. | Tc ° C. | Polymer |
|---|---|---|---|---|---|---|---|---|---|---|---|---|---|
| Ex. 5A | Catalyst D | 4.3 | 1.36 | 0.5 | 100 | 70 | 20 | 14.0 | 9.8 | 1.46 | 121.7 | 58.4 | — |
| Ex. 6A | Catalyst D | 4.3 | 1.36 | 0.5 | 100 | 40 | 20 | 9.6 | 6.7 | 3.29 | 128.1 | 71.5 | — |
| Ex. 7A | Catalyst D | 4.3 | 1.36 | 0.5 | 180 | 50 | 20 | 38.0 | 26.6 | 3.68 | 128.7 | 71.4 | X1 |
| Ex. 8A | Catalyst D | 4.3 | 1.36 | 0.5 | 180 | 60 | 20 | 36.6 | 25.5 | 2.81 | 127.8 | 71.4 | — |
| Ex. 9A | Catalyst D | 0.23 | 0.07 | 0.5 | 180 | 60 | 20 | 5.9 | 77.8 | 2.38 | 128.7 | 67.6 | — |
| Ex. 10A | Catalyst D | 0.46 | 0.14 | 0.5 | 180 | 60 | 20 | 21.4 | 140.1 | 1.59 | 128.1 | 68.9 | X2 |
| Comp. Ex. 3A | Catalyst c | 4.3 | 1.36 | 0.5 | 180 | 40 | 20 | 26.0 | 18.1 | 3.29 | 128.8 | 66.8 | X3 |
| Comp. Ex. 4A | Catalyst c | 12.9 | 4.08 | 0.5 | 180 | 60 | 20 | 17.6 | 4.1 | 1.33 | 120.7 | 67.0 | X4 |

TABLE 3-2

1-Butene pressure homopolymerization

| Polymer | Mw/Mn | mmmm % | Regioerrors | Tensile yield stress MPa | Tensile stress at break MPa | Tensile modulus MPa |
|---|---|---|---|---|---|---|
| X1 | 2.5 | 98.3 | Below detection limit | 18.1 | 45.5 | 465.3 |
| X2 | 2.1 | 98.5 | Below detection limit | 20.4 | 41.7 | 530.0 |
| X3 | 2.3 | 94.0 | Below detection limit | 16.5 | 46.3 | 394.4 |
| X4 | 2.2 | 94.5 | Below detection limit | 18.8 | 40.5 | 444.2 |

The properties in Table 3-2 were evaluated in the following manner.
⟨ Tensile Yield Stress, Tensile Stress at Break and Tensile Modulus of Butene Homopolymers ⟩
In accordance with JIS K 7113, a JIS K 7113 No. 2 test piece ½ that had been punched out from a 2 mm thick compression molded sheet obtained as described below was used as an evaluation sample and was tested at 23° C. and a tension rate of 30 mm/min (measurement apparatus: model 202X-5 manufactured by INTESCO Co., Ltd.).
⟨ Compression Molding Conditions ⟩
Compression molded sheets were produced under the following conditions and were stored at room temperature for 10 days before the testing.
Compression molding machine: manufactured by Kansai Roll Co., Ltd. (model: PEWE-70/50 35)
Heating time: 5 min
Heating temperature: 190° C.
Pressure during heating: 10 MPa
Cooling rate: at least 40° C./min (The sheet was cooled to room temperature by being compression molded on a separate compression molding machine set at 20° C. and 10 MPa for 4 minutes.)

TABLE 3-3

Results of cross fractionation chromatography (CFC)

| Polymer | X2 | X4 |
|---|---|---|
| Elution start temperature [TS] (° C.) | 46 | 46 |
| Elution end temperature [TE] (° C.) | 60 | 60 |
| Accumulated elution amount at [TX] (wt %) | 46.9 | 37.4 |

The CFC elution curve of the 1-butene polymer X2 is illustrated in FIG. 1A, and the CFC elution curve of the 1-butene polymer X4 is illustrated in FIG. 1B.

⟨ Evaluations ⟩
The polymer X2 was such that the mmmm was not less than 98.0% and the accumulated elution amount at a temperature $[T_X]$ defined as $([T_S]+[T_E])/2$ was not less than 40 wt %. As shown in Table 3-2, the polymer X2 exhibited a high tensile modulus while having a tensile yield stress similar to that of conventional polymers (for example, polymer X4). This result shows that the novel 1-butene polymers of the invention are excellent in the balance between rigidity and yield stress.

Example 1B

A stirrer was placed into a 30 mL branched flask that had been purged with nitrogen. The flask was then loaded with 4.6 mg of a transition metal compound (the catalyst C), 22.0 mL of toluene and 0.58 mL of methylaluminoxane (TMAO-341) manufactured by TOSO FINECHEM CORPORATION (Al/Zr=300 by mol). The mixture was stirred for at least 30 minutes to give a catalyst solution containing the catalyst C with a concentration of 0.25 mmol/L.

In a nitrogen atmosphere, a reactor of a parallel polymerization reactor manufactured by Biotage Japan Ltd. was loaded with 0.4 mL of a 0.05 M 4-methyl-1-pentene solution of triisobutylaluminum, and 2.7 mL of 4-methyl-1-pentene. The mixture was heated to 70° C.

0.2 mL of the catalyst solution was fed to the reactor, and subsequently 0.7 mL of toluene was added, thereby initiating polymerization. The polymerization was performed for 20 minutes and was terminated by the addition of isobutyl alcohol. The resultant polymer solution was added to methanol to precipitate the polymer. The polymer was dried at 80° C. under reduced pressure for 12 hours. The results are described in Table 4.

Examples 2B to 4B and Comparative Example 1B

Polymerization was performed by the same process as in Example 1B, except that the type of the transition metal compound and the catalyst concentration in the catalyst solution in Example 1B were changed as described in Table 4. The results are described in Table 4.

After 0.25 NL of hydrogen was fed to the autoclave, the whole amount of a solution of 0.2 mL of the catalyst solution in 4.8 mL of toluene was added. Polymerization was performed at 50° C. for 15 minutes and was terminated by the addition of methanol. The resultant polymer solution was added to 2 L of a methanol-acetone mixed solvent (1:1 by volume) and thereby the polymer was precipitated. The

TABLE 4

4-Methyl-1-pentene homopolymerization

| | Catalyst | Catalyst concentration | Amount of catalyst μmol | Yield amount mg | Catalytic activity kg/mmol-Zr/h | Mw ×10$^4$ | Mn ×10$^4$ | Tm ° C. | Tc ° C. |
|---|---|---|---|---|---|---|---|---|---|
| Ex. 1B | Catalyst C | 0.25 mmol/L | 0.050 | 113 | 6.8 | 70.8 | 32.2 | 241.1 | 214.4 |
| Ex. 2B | Catalyst A | 0.50 mmol/L | 0.10 | 578 | 17 | 131 | 53.2 | 241.7 | 212.3 |
| Ex. 3B | Catalyst D | 0.25 mmol/L | 0.050 | 144 | 8.7 | 78.0 | 33.2 | 242.9 | 217.1 |
| Ex. 4B | Catalyst E | 0.50 mmol/L | 0.10 | 279 | 8.4 | 241 | 102 | 243.6 | 216.0 |
| Comp. Ex. 1B | Catalyst a | 0.50 mmol/L | 0.10 | 106 | 3.2 | 28.5 | 14.3 | 234.8 | 211.6 |

Example 1C

A stirrer was placed into a 30 mL branched flask that had been purged with nitrogen. The flask was then loaded with 3.4 mg of a transition metal compound (the catalyst D), 5 mL of toluene and 0.30 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene, 75 mL of 1-octene and 1.5 mL of a 0.5 M toluene solution of triisobutylaluminum. The autoclave was heated to 50° C.

The whole amount of the catalyst solution was added to the autoclave, and polymerization was performed at 50° C. for 15 minutes. The polymerization was terminated by adding methanol to the autoclave. The resultant polymer solution was added to 2 L of a methanol-acetone mixed solvent (1:1 by volume) and thereby the polymer was precipitated. The polymer was dried under reduced pressure at 80° C. for 10 hours. The results are described in Table 5.

Examples 2C to 4C

Polymerization was performed by the same process as in Example 1C, except that the amount of octene and the polymerization time in Example 1C were changed as described in Table 5. The results are described in Table 5.

Example 5C

A stirrer was placed into a 30 mL branched flask that had been purged with nitrogen. The flask was then loaded with 4.4 mL of a toluene solution containing 0.25 mg/mL of a transition metal compound (the catalyst D), and 0.10 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene, 8 mL of 1-octene and 1.5 mL of a 0.5 M toluene solution of triisobutylaluminum. The autoclave was heated to 50° C.

polymer was dried under reduced pressure at 80° C. for 10 hours. The results are described in Table 5.

Examples 6C to 8C

Polymerization was performed by the same process as in Example 5C, except that the amounts of octene and hydrogen, and the polymerization time in Example 5C were changed as described in Table 5. The results are described in Table 5.

Example 9C

A stirrer was placed into a 30 mL branched flask that had been purged with nitrogen. The flask was then loaded with 3.4 mg of a transition metal compound (the catalyst D), 5 mL of toluene, and 0.30 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 400 mL of 4-methyl-1-pentene, 350 mL of cyclohexane, 4 mL of 1-octene and 1.5 mL of a 0.5 M toluene solution of triisobutylaluminum. The autoclave was heated to 65° C.

The whole amount of the catalyst solution was added to the autoclave, and polymerization was performed at 65° C. for 20 minutes. The polymerization was terminated by adding methanol to the autoclave. The resultant polymer solution was added to 2 L of a methanol-acetone mixed solvent (1:1 by volume) and thereby the polymer was precipitated. The polymer was dried under reduced pressure at 80° C. for 10 hours. The results are described in Table 5.

Example 10C

Polymerization was performed by the same process as in Example 9C, except that the transition metal compound in Example 9C was changed to 3.4 mg of the catalyst E. The results are described in Table 5.

Example 11C

A stirrer was placed into a 30 mL branched flask that had been purged with nitrogen. The flask was then loaded with 4.6 mg of a transition metal compound (the catalyst E), 8.8 mL of toluene, and 0.41 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 400 mL of 4-methyl-1-pentene, 350 mL of cyclohexane, 4 mL of 1-octene and 1.5 mL of a 0.5 M toluene solution of triisobutylaluminum. The autoclave was heated to 65° C.

After 0.06 NL of hydrogen was fed to the autoclave, the whole amount of a solution of 0.4 mL of the catalyst solution in 4.6 mL of toluene was added. Polymerization was performed at 65° C. for 20 minutes and was terminated by the addition of methanol. The resultant polymer solution was added to 2 L of a methanol-acetone mixed solvent (1:1 by volume) and thereby the polymer was precipitated. The polymer was dried under reduced pressure at 80° C. for 10 hours. The results are described in Table 5.

3.3 mg of a transition metal compound (the catalyst C), 5 mL of toluene and 0.30 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.40 MPaG. Thereafter, propylene was supplied to control the pressure to 0.50 MPaG.

The whole amount of the catalyst solution was added to the autoclave, and polymerization was performed at 70° C. for 20 minutes. During the polymerization, propylene was supplied to maintain the autoclave inside pressure at 0.50 MPaG. The polymerization was terminated by adding

TABLE 5

4-Methyl-1-pentene/1-octene copolymerization

| Example | Catalyst | Amount of catalyst µmol | Amount of octene Ml | Amount of hydrogen NL | Polymerization temperature ° C. | Polymerization time min | Yield amount g | Catalytic activity kg/mmol-Zr/h | [η] dl/g | Tm ° C. | Tc ° C. |
|---|---|---|---|---|---|---|---|---|---|---|---|
| Ex. 1C | Catalyst D | 3.7 | 75 | 0.00 | 50 | 15 | 13.85 | $1.5 \times 10^1$ | 6.63 | 179.7 | 149.7 |
| Ex. 2C | Catalyst D | 3.7 | 38 | 0.00 | 50 | 12 | 11.86 | $1.6 \times 10^1$ | 6.52 | 207.9 | 178.2 |
| Ex. 3C | Catalyst D | 3.7 | 26 | 0.00 | 50 | 10 | 10.54 | $1.7 \times 10^1$ | 6.30 | 217.3 | 188.2 |
| Ex. 4C | Catalyst D | 3.7 | 8 | 0.00 | 50 | 10 | 11.12 | $1.8 \times 10^1$ | 6.73 | 231.6 | 203.4 |
| Ex. 5C | Catalyst D | 0.055 | 8 | 0.25 | 50 | 15 | 17.78 | $1.3 \times 10^3$ | 2.89 | 234.2 | 204.2 |
| Ex. 6C | Catalyst D | 0.055 | 8 | 0.31 | 50 | 20 | 3.77 | $2.1 \times 10^2$ | 2.40 | 233.8 | 204.5 |
| Ex. 7C | Catalyst D | 0.055 | 26 | 0.25 | 50 | 15 | 26.14 | $1.9 \times 10^3$ | 2.75 | 219.7 | 190.0 |
| Ex. 8C | Catalyst D | 0.055 | 26 | 0.31 | 50 | 20 | 9.62 | $5.2 \times 10^2$ | 2.31 | 219.3 | 189.5 |
| Ex. 9C | Catalyst D | 3.7 | 4 | 0.00 | 65 | 20 | 13.65 | $1.0 \times 10^1$ | 3.35 | 233.2 | 204.1 |
| Ex. 10C | Catalyst E | 3.8 | 4 | 0.00 | 65 | 20 | 6.60 | 5.3 | 4.68 | 231.6 | 205.9 |
| Ex. 11C | Catalyst E | 0.22 | 4 | 0.06 | 65 | 20 | 53.0 | $7.2 \times 10^3$ | 2.06 | 234.2 | 207.8 |

Example 1D

A stirrer was placed into a 30 mL branched flask that had been purged with nitrogen. The flask was then loaded with 1.1 mg of a transition metal compound (the catalyst C), 5 mL of toluene and 0.11 mL of methylaluminoxane (TMAO-341) manufactured by TOSO FINECHEM CORPORATION (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.30 MPaG. Thereafter, propylene was supplied to control the pressure to 0.50 MPaG.

The whole amount of the catalyst solution was added to the autoclave, and polymerization was performed at 70° C. for 20 minutes. During the polymerization, propylene was supplied to maintain the autoclave inside pressure at 0.50 MPaG. The polymerization was terminated by adding methanol to the autoclave. The resultant polymer solution was added to 2 L of a methanol-acetone mixed solvent (1:1 by volume) and thereby the polymer was precipitated. The polymer was dried under reduced pressure at 80° C. for 12 hours. The results are described in Table 6.

Example 2D

A stirrer was placed into a 30 mL branched flask that had been purged with nitrogen. The flask was then loaded with methanol to the autoclave. The rest of the procedure was the same as in Example 1D. The results are described in Table 6.

Example 3D

A stirrer was placed into a 30 mL branched flask that had been purged with nitrogen. The flask was then loaded with 2.2 mg of a transition metal compound (the catalyst C), 5 mL of toluene and 0.22 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.45 MPaG. Thereafter, propylene was supplied to control the pressure to 0.50 MPaG.

The whole amount of the catalyst solution was added to the autoclave, and polymerization was performed at 70° C. for 20 minutes. During the polymerization, propylene was supplied to maintain the autoclave inside pressure at 0.50 MPaG. The polymerization was terminated by adding methanol to the autoclave. The rest of the procedure was the same as in Example 1D. The results are described in Table 6.

Example 4D

A stirrer was placed into a 30 mL branched flask that had been purged with nitrogen. The flask was then loaded with 3.5 mg of a transition metal compound (the catalyst D), 5 mL of toluene and 0.35 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. After the addition of 0.13 NL of hydrogen to the autoclave, nitrogen was supplied to control the autoclave inside pressure to 0.40 MPaG. Thereafter, propylene was supplied to control the pressure to 0.50 MPaG.

The whole amount of a solution of 0.2 mL of the catalyst solution in 4.8 mL of toluene was added to the autoclave, and polymerization was performed at 70° C. for 10 minutes. During the polymerization, propylene was supplied to maintain the autoclave inside pressure at 0.50 MPaG. The polymerization was terminated by adding methanol to the autoclave. The rest of the procedure was the same as in Example 1D. The results are described in Table 6.

Example 5D

A stirrer was placed into a 30 mL branched flask that had been purged with nitrogen. The flask was then loaded with 2.9 mg of a transition metal compound (the catalyst D), 2.9 mL of toluene and 0.25 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 80° C. After the addition of 0.06 NL of hydrogen to the autoclave, nitrogen was supplied to control the autoclave inside pressure to 0.40 MPaG. Thereafter, propylene was supplied to control the pressure to 0.50 MPaG.

The whole amount of a solution of 0.2 mL of the catalyst solution in 4.8 mL of toluene was added to the autoclave, and polymerization was performed at 80° C. for 10 minutes. During the polymerization, propylene was supplied to maintain the autoclave inside pressure at 0.50 MPaG. The polymerization was terminated by adding methanol to the autoclave. The rest of the procedure was the same as in Example 1D. The results are described in Table 6.

Example 6D

A stirrer was placed into a 30 mL branched flask that had been purged with nitrogen. The flask was then loaded with 1.7 mg of a transition metal compound (the catalyst D), 5 mL of toluene and 0.15 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.25 MPaG. Thereafter, propylene was supplied to control the pressure to 0.50 MPaG.

The whole amount of the catalyst solution was added to the autoclave, and polymerization was performed at 70° C. for 20 minutes. During the polymerization, propylene was supplied to maintain the autoclave inside pressure at 0.50 MPaG. The polymerization was terminated by adding methanol to the autoclave. The rest of the procedure was the same as in Example 1D. The results are described in Table 6.

Example 7D

A stirrer was placed into a 30 mL branched flask that had been purged with nitrogen. The flask was then loaded with 3.2 mg of a transition metal compound (the catalyst D), 3.2 mL of toluene and 0.15 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.20 MPaG. Thereafter, propylene was supplied to control the pressure to 0.50 MPaG.

1.7 mL of the catalyst solution was added to the autoclave, and polymerization was performed at 70° C. for 20 minutes. During the polymerization, propylene was supplied to maintain the autoclave inside pressure at 0.50 MPaG. The polymerization was terminated by adding methanol to the autoclave. The rest of the procedure was the same as in Example 1D. The results are described in Table 6.

Example 8D

Polymerization was performed by the same process as in Example 2D, except that the transition metal compound in Example 2D was changed to 3.0 mg of the catalyst A. The results are described in Table 6.

Example 9D

A stirrer was placed into a 30 mL branched flask that had been purged with nitrogen. The flask was then loaded with 4.2 mg of a transition metal compound (the catalyst E), 6.2 mL of toluene and 0.37 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C., and nitrogen was supplied to control the autoclave inside pressure to 0.20 MPaG. Thereafter, propylene was supplied to control the pressure to 0.60 MPaG.

5.3 mL of the catalyst solution was added to the autoclave, and polymerization was performed at 70° C. for 20 minutes. During the polymerization, propylene was supplied to maintain the autoclave inside pressure at 0.60 MPaG. The polymerization was terminated by adding methanol to the autoclave. The rest of the procedure was the same as in Example 1D. The results are described in Table 6.

Example 10D

A stirrer was placed into a 30 mL branched flask that had been purged with nitrogen. The flask was then loaded with 2.9 mg of a transition metal compound (the catalyst E), 2.7 mL of toluene and 0.26 mL of methylaluminoxane (TMAO-341) (Al/Zr=310 by mol). The mixture was stirred for at least 30 minutes to give a catalyst solution.

A 1,500 mL-volume SUS autoclave that had been purged with nitrogen was loaded with 750 mL of 4-methyl-1- pentene and 1.5 mL of a 0.5 M toluene solution of triisobutylaluminum. The autoclave was heated to 70° C. After the addition of 0.06 NL of hydrogen to the autoclave, nitrogen was supplied to control the autoclave inside pressure to 0.20 MPaG. Thereafter, propylene was supplied to control the pressure to 0.60 MPaG.

The whole amount of a solution of 0.5 mL of the catalyst solution in 4.5 mL of toluene was added to the autoclave, and polymerization was performed at 70° C. for 10 minutes. During the polymerization, propylene was supplied to maintain the autoclave inside pressure at 0.60 MPaG. The polymerization was terminated by adding methanol to the autoclave. The rest of the procedure was the same as in Example 1D. The results are described in Table 6.

Comparative Example 1D

Polymerization was performed by the same process as in Example 3D, except that the transition metal compound in Example 3D was changed to 3.2 mg of the catalyst b, and the amount of methylaluminoxane (TMAO-341) was changed to 0.30 mL. The results are described in Table 6.

Comparative Example 2D

Polymerization was performed by the same process as in Example 2D, except that the transition metal compound in Example 2D was changed to 2.9 mg of the catalyst a, and the amount of methylaluminoxane (TMAO-341) was changed to 0.30 mL. The results are described in Table 6.

by mol), and polymerization was performed at 60° C. for 20 minutes. The polymerization was terminated by adding methanol to the autoclave. The resultant polymer solution was added to 2 L of a methanol-acetone mixed solvent (1:1 by volume) and thereby the polymer was precipitated. The polymer was dried under reduced pressure at 80° C. for 12 hours. The amount of the polymer obtained was 16.7 g. The results are described in Table 7-1.

Example 2E

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. After the addition of 0.06 NL of hydrogen to the autoclave, nitrogen was supplied to control the autoclave inside pressure to 0.40 MPaG. Propylene was supplied to control the pressure to 0.50 MPaG. There was supplied a toluene solution of a mixture including 0.22 µmol of a transition metal compound (the catalyst D) and 0.07 mmol of methylaluminoxane (TMAO-341) (Al/Zr=310 by mol), and polymerization was performed at 70° C. for 18.5 minutes. During the polymerization, propylene was supplied to maintain the autoclave inside pressure at 0.50 MPaG. The polymerization was terminated by adding methanol to the autoclave. The rest of the procedure was the same as in Example 1E. The amount of the polymer obtained was 50.9 g. The results are described in Table 7-1.

TABLE 6

4-Methyl-1-pentene/propylene copolymerization

| Example | Catalyst | Amount of catalyst µmol | Propylene pressure MPaG | Amount of hydrogen NL | Polymerization temperature ° C. | Polymerization time min | Yield amount g | Catalytic activity kg/mmol-Zr/h | Propylene content mol % | [η] dl/g | Tm ° C. | Tc ° C. |
|---|---|---|---|---|---|---|---|---|---|---|---|---|
| Ex. 1D | Catalyst C | 1.4 | 0.20 | 0.00 | 70 | 20 | 2.54 | 5.0 | 16.4 | 2.31 | 134.2 | 85.9 |
| Ex. 2D | Catalyst C | 4.1 | 0.10 | 0.00 | 70 | 20 | 30.98 | $2.3 \times 10^1$ | 7.1 | 3.18 | 190.9 | 159.4 |
| Ex. 3D | Catalyst C | 2.8 | 0.05 | 0.00 | 70 | 20 | 3.27 | 3.0 | 5.6 | 2.37 | 216.3 | 189.5 |
| Ex. 4D | Catalyst D | 0.22 | 0.10 | 0.13 | 70 | 10 | 53.66 | $1.5 \times 10^3$ | 8.0 | 2.36 | 189.3 | 157.9 |
| Ex. 5D | Catalyst D | 0.22 | 0.10 | 0.06 | 80 | 10 | 37.60 | $1.0 \times 10^3$ | Not measured | 2.36 | 188.4 | 157.5 |
| Ex. 6D | Catalyst D | 1.9 | 0.25 | 0.00 | 70 | 20 | 16.65 | $2.7 \times 10^1$ | Not measured | 3.50 | Not detected | Not detected |
| Ex. 7D | Catalyst D | 1.9 | 0.30 | 0.00 | 70 | 20 | 15.63 | $2.5 \times 10^1$ | 22.8 | 3.51 | Not detected | Not detected |
| Ex. 8D | Catalyst A | 3.7 | 0.10 | 0.00 | 70 | 20 | 10.99 | 8.0 | 6.8 | 3.22 | 197.1 | 167.5 |
| Ex. 9D | Catalyst E | 3.8 | 0.40 | 0.00 | 70 | 20 | 74.30 | $5.9 \times 10^1$ | Not measured | 3.11 | Not detected | Not detected |
| Ex. 10D | Catalyst E | 0.55 | 0.40 | 0.06 | 70 | 10 | 80.10 | $8.7 \times 10^2$ | Not measured | 1.81 | Not detected | Not detected |
| Comp. Ex. 1D | Catalyst b | 3.9 | 0.05 | 0.00 | 70 | 20 | 20.50 | $1.6 \times 10^1$ | 5.0 | 1.60 | 194.9 | 167.6 |
| Comp. Ex. 2D | Catalyst a | 3.8 | 0.10 | 0.00 | 70 | 20 | 9.00 | 7.0 | 9.3 | 1.78 | 179.8 | 149.2 |

Example 1E

A 1,500 mL-volume SUS autoclave that had been purged with nitrogen was loaded with 500 mL of 4-methyl-1-pentene, 250 mL of cyclohexane, 85 mL of 1-octene, and 1.5 mL of a 0.5 M toluene solution of triisobutylaluminum. The autoclave was heated to 60° C. After the addition of 0.09 NL of hydrogen to the autoclave, nitrogen was supplied to control the autoclave inside pressure to 0.10 MPaG. There was supplied a toluene solution of a mixture including 0.11 µmol of a transition metal compound (the catalyst D) and 0.03 mmol of methylaluminoxane (TMAO-341) (Al/Zr=310

Example 3E

A 1,500 mL-volume SUS autoclave that had been purged with nitrogen was loaded with 500 mL of 4-methyl-1-pentene, 250 mL of cyclohexane, 10.4 mL of LINEALENE 168 manufactured by Idemitsu Kosan Co., Ltd., and 1.5 mL of a 0.5M toluene solution of triisobutylaluminum. LINEALENE 168 was an α-olefin mixture including 1-hexadecene and 1-octadecene. The autoclave was heated to 60° C. After the addition of 0.13 NL of hydrogen to the autoclave, nitrogen was supplied to control the autoclave inside pressure to 0.14 MPaG. There was supplied a toluene solution of a mixture including 0.11 µmol of a transition metal compound (the catalyst D) and 0.04 mmol of methylaluminoxane (TMAO-341) (Al/Zr=310 by mol), and polymerization was performed at 60° C. for 20 minutes. The polymerization was terminated by adding methanol to the autoclave. The rest of the procedure was the same as in Example 1E. The amount of the polymer obtained was 54.7 g. The results are described in Table 7-1.

Example 4E

A 1,500 mL-volume SUS autoclave that had been purged with nitrogen was loaded with 750 mL of 4-methyl-1-pentene, 26 mL of 1-octene, and 1.5 mL of a 0.5 M toluene solution of triisobutylaluminum. The autoclave was heated to 50° C. After the addition of 0.25 NL of hydrogen to the autoclave, nitrogen was supplied to control the autoclave inside pressure to 0.14 MPaG. There was supplied a toluene solution of a mixture including 0.06 µmol of a transition metal compound (the catalyst D) and 0.02 mmol of methylaluminoxane (TMAO-341) (Al/Zr=310 by mol), and polymerization was performed at 50° C. for 15 minutes. The polymerization was terminated by adding methanol to the autoclave. The rest of the procedure was the same as in Example 1E. The amount of the polymer obtained was 45.5 g. The results are described in Table 7-1.

Example 5E

A 1,500 mL-volume SUS autoclave that had been purged with nitrogen was loaded with 500 mL of 4-methyl-1-pentene, 250 mL of cyclohexane, 9.8 mL of 1-decene, and 1.5 mL of a 0.5 M toluene solution of triisobutylaluminum. The autoclave was heated to 60° C. After the addition of 0.13 NL of hydrogen to the autoclave, nitrogen was supplied to control the autoclave inside pressure to 0.14 MPaG. There was supplied a toluene solution of a mixture including 0.11 µmol of a transition metal compound (the catalyst D) and 0.04 mmol of methylaluminoxane (TMAO-341) (Al/Zr=310 by mol), and polymerization was performed at 60° C. for 20 minutes. The polymerization was terminated by adding methanol to the autoclave. The rest of the procedure was the same as in Example 1E. The amount of the polymer obtained was 49.0 g. The results are described in Table 7-1.

Example 6E

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. After the addition of 0.06 NL of hydrogen to the autoclave, nitrogen was supplied to control the autoclave inside pressure to 0.50 MPaG. There was supplied a toluene solution of a mixture including 0.11 µmol of a transition metal compound (the catalyst D) and 0.04 mmol of methylaluminoxane (TMAO-341) (Al/Zr=310 by mol), and polymerization was performed at 70° C. for 20 minutes. The polymerization was terminated by adding methanol to the autoclave. The rest of the procedure was the same as in Example 1E. The amount of the polymer obtained was 29.6 g. The results are described in Table 7-1.

Comparative Example 1E

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. Nitrogen was supplied to control the autoclave inside pressure to 0.40 MPaG, and propylene was supplied to control the pressure to 0.50 MPaG. There was supplied a toluene solution of a mixture including 3.87 µmol of a transition metal compound (the catalyst b) and 1.17 mmol of methylaluminoxane (TMAO-341) (Al/Zr=310 by mol), and polymerization was performed at 70° C. for 20 minutes. During the polymerization, propylene was supplied to maintain the autoclave inside pressure at 0.50 MPaG. The polymerization was terminated by adding methanol to the autoclave. The rest of the procedure was the same as in Example 1E. The amount of the polymer obtained was 20.5 g. The results are described in Table 7-2.

Comparative Example 2E

A 1,500 mL-volume SUS autoclave that had been purged with nitrogen was loaded with 500 mL of 4-methyl-1-pentene, 250 mL of cyclohexane, 5.0 mL of LINEALENE 168 manufactured by Idemitsu Kosan Co., Ltd., and 1.5 mL of a 0.5 M toluene solution of triisobutylaluminum. The autoclave was heated to 50° C. Nitrogen was supplied to control the autoclave inside pressure to 0.16 MPaG. There was supplied a toluene solution of a mixture including 11 µmol of a transition metal compound (the catalyst b) and 1.17 mmol of methylaluminoxane (TMAO-341) (Al/Zr=100 by mol), and polymerization was performed at 50° C. for 40 minutes. The polymerization was terminated by adding methanol to the autoclave. The rest of the procedure was the same as in Example 1E. The amount of the polymer obtained was 43.2 g. The results are described in Table 7-2.

Comparative Example 3E

A 1,500 mL-volume SUS autoclave that had been purged with nitrogen was loaded with 500 mL of 4-methyl-1-pentene, 250 mL of cyclohexane, 7.5 mL of 1-octene, and 1.5 mL of a 0.5 M toluene solution of triisobutylaluminum. The autoclave was heated to 50° C. Nitrogen was supplied to control the autoclave inside pressure to 0.16 MPaG. There was supplied a toluene solution of a mixture including 3.87 µmol of a transition metal compound (the catalyst b) and 1.17 mmol of methylaluminoxane (TMAO-341) (Al/Zr=310 by mol), and polymerization was performed at 50° C. for 20 minutes. The polymerization was terminated by adding methanol to the autoclave. The rest of the procedure was the same as in Example 1E. The amount of the polymer obtained was 11.1 g. The results are described in Table 7-2.

Comparative Example 4E

A 1,500 mL-volume SUS autoclave that had been purged with nitrogen was loaded with 500 mL of 4-methyl-1-pentene, 250 mL of cyclohexane, 3.5 mL of 1-decene, and 1.5 mL of a 0.5 M toluene solution of triisobutylaluminum. The autoclave was heated to 50° C. Nitrogen was supplied to control the autoclave inside pressure to 0.16 MPaG. There was supplied a toluene solution of a mixture including 3.87 µmol of a transition metal compound (the catalyst b) and 1.17 mmol of methylaluminoxane (TMAO-341) (Al/Zr=310 by mol), and polymerization was performed at 50° C. for 20 minutes. The polymerization was terminated by adding methanol to the autoclave. The rest of the procedure was the same as in Example 1E. The amount of the polymer obtained was 19.8 g. The results are described in Table 7-2.

Comparative Examples 5E to 8E

The following TPX polymers (methyl pentene polymers) manufactured by Mitsui Chemicals, Inc. were used as titanium-catalyzed 4-methylpentene-1 copolymers. The results are described in Table 7-2.

Comparative Example 5E: MX002 (MFR=21 g/10 min, Tm=224° C.)

Comparative Example 6E: MX004 (MFR=26 g/10 min, Tm=228° C.)

Comparative Example 7E: RT18 (MFR=25 g/10 min, Tm=233° C.)

Comparative Example 8E: MX019 (MFR=90 g/10 min, Tm=243° C.)

TABLE 7-1

|  |  |  | Example | | | | | |
|---|---|---|---|---|---|---|---|---|
|  |  |  | Ex. 1E | Ex. 2E | Ex. 3E | Ex. 4E | Ex. 5E | Ex. 6E |
| Polymerization conditions | Catalyst | | Catalyst D | Catalyst D | Catalyst D | Catalyst D | Catalyst D | Catalyst D |
|  | Comonomer | | 1-Octene | Propylene | LINEALENE 168 | 1-Octene | 1-Decene | — |
| Composition | Amount of comonomer | mol % | 16 | 7.4 | 1.2 | 4 | 1.7 | 0 |
| Stereoregularity | Meso diad fraction (m) | % | Fraction r was below detection limit. | Fraction r was below detection limit. | Fraction r was below detection limit. | Fraction r was below detection limit. | Fraction r was below detection limit. | Fraction r was below detection limit. |
| Thermal properties | Tm | ° C. | 153 | 191 | 221 | 220 | 234 | 243 |
|  | Tc | ° C. | 119 | 156 | 189 | 190 | 210 | 215 |
|  | Heat of fusion ΔHm (2nd) | J/g | 17 | 25 | 36 | 40 | 50 | 55 |
|  | 0.5 × Tm − 76 | J/g | 0.5 | 19.5 | 34.5 | 34 | 41 | 45.5 |
|  | Relation (1) |  | Y | Y | Y | Y | Y | Y |
| Molecular weight | [η] | dl/g | 2.7 | 2.4 | 2.5 | 2.4 | 2.2 | 2.4 |
| Mechanical properties | Young's modulus | MPa |  | 1500 | 1300 | 1400 | 1600 | 2000 |
|  | Elongation at break | % |  | 200 | 200 | 180 | 130 | 100 |
|  | Izod impact strength of unnotched specimen | kJ/m2 |  | 5 | 6 | 7 | 10 | 8 |
| Heat resistance | Vicat softening temperature | ° C. |  | 150 | 170 | 170 | 190 | 200 |

Relation (1): Y = The polymer satisfied the relation (1). N = The polymer did not satisfy the relation (1).

TABLE 7-2

|  |  |  | Comparative Example | | | | | | | |
|---|---|---|---|---|---|---|---|---|---|---|
|  |  |  | Comp. Ex. 1E | Comp. Ex. 2E | Comp. Ex. 3E | Comp. Ex. 4E | Comp. Ex. 5E | Comp. Ex. 6E | Comp. Ex. 7E | Comp. Ex. 8E |
| Polymerization conditions | Catalyst | | Catalyst b | Catalyst b | Catalyst b | Catalyst b | Ti catalyst | Ti catalyst | Ti catalyst | Ti catalyst |
|  | Comonomer | | Propylene | LINEALENE 168 | 1-Octene | 1-Decene | LINEALENE 168 | LINEALENE 168 | 1-Decene | — |
| Composition | Amount of comonomer | mol % | 8 | 0.6 | 2.5 | 1 | 2.8 | 2 | 1.9 | 0 |
| Stereoregularity | Meso diad fraction (m) | % | 97.5 | 97.4 | 97.6 | 97.1 | 98 | 98.2 | 97.5 | 97.9 |
| Thermal properties | Tm | ° C. | 181 | 220 | 218 | 230 | 224 | 228 | 233 | 243 |
|  | Tc | ° C. | 148 | 190 | 188 | 205 | 207 | 210 | 214 | 218 |
|  | Heat of fusion ΔHm (2nd) | J/g | 13 | 27 | 29 | 33 | 23 | 30 | 39 | 45 |
|  | 0.5 × Tm − 76 | J/g | 14.5 | 34 | 33 | 39 | 36 | 38 | 40.5 | 45.5 |
|  | Relation (1) |  | N | N | N | N | N | N | N | N |
| Molecular weight | [η] | dl/g | 1.6 | 2.1 | 2.2 | 1.9 | 2.2 | 2.2 | 2.2 | 2.4 |
| Mechanical properties | Young's modulus | MPa | 1000 | 830 | 950 | 1200 | 800 | 1200 | 1400 | 1800 |
|  | Elongation at break | % | 190 | 190 | 150 | 100 | 370 | 80 | 40 | 10 |
|  | Izod impact strength of unnotched specimen | kJ/m2 | 3 | 3 | 3 | 2 | Not broken | 15 | 9 | 4 |
| Heat resistance | Vicat softening temperature | ° C. | 130 | 163 | 162 | 175 | 140 | 155 | 170 | 185 |

Relation (1): Y = The polymer satisfied the relation (1). N = The polymer did not satisfy the relation (1).

The properties in Table 7-1 and Table 7-2 were evaluated as follows.

⟨ Tensile Test (Compression Molded Sheets) ⟩

To evaluate tensile properties, namely, Young's modulus (YM) and elongation at break (EL), a JIS K 7113 No. 2 test piece ½ that had been punched out from a 1 mm thick compression molded sheet obtained as described below was used as an evaluation sample and was tested at 23° C. and a tension rate of 200 mm/min.

Compression molding conditions: With a hydraulic hot compression molding machine manufactured by Shinto Metal Industries Corporation, the workpiece was heated at 270° C. under a pressure of 10 MPa for 5 minutes and was cooled at 30° C. under a pressure of 10 MPa for 5 minutes.

⟨ Izod Impact Test (Compression Molded Sheets) ⟩

A 3 mm thick compression molded sheet fabricated as described below was subjected to an impact test in accordance with Izod ASTM under conditions in which the hammer energy was 3.92 J, the swing angle was 149.1° and the test temperature was 23° C.

Compression molding conditions: With a hydraulic hot compression molding machine manufactured by Shinto Metal Industries Corporation, the workpiece was heated at 270° C. under a pressure of 10 MPa for 5 minutes and was cooled at 30° C. under a pressure of 10 MPa for 5 minutes.

⟨ Vicat Softening Temperature (Compression Molded Sheets) ⟩

A 3 mm thick compression molded sheet fabricated as described below was subjected to a Vicat softening temperature test in accordance with ASTM D1525 at a heating rate of 50° C./hr and a testing load of 10 N using a tester manufactured by Yasuda Seiki Seisakusho Ltd.

Compression molding conditions: With a hydraulic hot compression molding machine manufactured by Shinto Metal Industries Corporation, the workpiece was heated at 270° C. under a pressure of 10 MPa for 5 minutes and was cooled at 30° C. under a pressure of 10 MPa for 5 minutes.

⟨ Evaluations ⟩

In the studies described in Table 7-1, the Young's modulus as an indicator of rigidity was high and the elongation at break as an indicator of toughness was approximately of the same level as conventional products. On the other hand, the studies described in Table 7-2 resulted in poor Young's modulus. The values of Young's modulus described in Table 7-1 and Table 7-2 are plotted versus elongation at break in FIG. 2.

Based on the results described in Table 7-1 and Table 7-2, the heat of fusion ($\Delta Hm$) is plotted versus melting point (Tm) in FIG. 3. The results in Table 7-1 and Table 7-2 (FIG. 2 and FIG. 3) show that the polymers with an excellent balance between rigidity and toughness have a larger $\Delta Hm$ than the polymers with similar toughness but with poor rigidity when the polymers having similar melting points Tm are compared.

In crystalline polymers, Tm and $\Delta Hm$ are generally in an approximately proportional relationship. Thus, it will be possible to draw a line between 4MP1 polymers with an excellent rigidity/toughness balance (written as "Examples" for convenience) and 4MP1 polymers with similar toughness but with poor rigidity (written as "Comparative Examples" for convenience) in FIG. 3 based on the values of Tm and $\Delta Hm$ in the above studies. A numerical analysis was then made with respect to such a line so as to fit the line between the data of Examples and the data of Comparative Examples, resulting in $\Delta Hm=0.5 \times Tm-76$.

From the comparison of the polymers described in Table 7-1 and Table 7-2, it is understood that the polymers achieve an excellent balance between rigidity and toughness when the polymers satisfy the relation (1): $\Delta Hm \geq 0.5 \times Tm-76$.

Example 1F

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. After the addition of 0.13 NL of hydrogen to the autoclave, nitrogen was supplied to control the autoclave inside pressure to 0.20 MPaG. Propylene was supplied to control the pressure to 0.60 MPaG. There was supplied a toluene solution of a mixture including 0.22 μmol of a transition metal compound (the catalyst D) and 0.07 mmol of methylaluminoxane (TMAO-341) (Al/Zr=310 by mol), and polymerization was performed at 70° C. for 10 minutes. During the polymerization, propylene was supplied to maintain the autoclave inside pressure at 0.60 MPaG. The polymerization was terminated by adding methanol to the autoclave. The rest of the procedure was the same as in Example 2E. The amount of the polymer obtained was 53.2 g. The results are described in Table 8.

Example 2F

A 1,500 mL-volume SUS autoclave that had been purged with nitrogen was loaded with 750 mL of 4-methyl-1-pentene and 1.5 mL of a 0.5 M toluene solution of triisobutylaluminum. The autoclave was heated to 70° C. Nitrogen was supplied to control the autoclave inside pressure to 0.20 MPaG, and propylene was supplied to control the pressure to 0.60 MPaG. There was supplied a toluene solution of a mixture including 3.8 μmol of a transition metal compound (the catalyst D) and 1.18 mmol of methylaluminoxane (TMAO-341) (Al/Zr=310 by mol), and polymerization was performed at 70° C. for 20 minutes. During the polymerization, propylene was supplied to maintain the autoclave inside pressure at 0.60 MPaG. The polymerization was terminated by adding methanol to the autoclave. The rest of the procedure was the same as in Example 2E. The amount of the polymer obtained was 63.0 g. The results are described in Table 8.

Comparative Example 1F

A 1,500 mL-volume SUS autoclave that had been purged with nitrogen was loaded with 400 mL of 4-methyl-1-pentene, 300 mL of hexane, and 0.75 mL of a 1.0 M toluene solution of triisobutylaluminum. The autoclave was heated to 60° C., and propylene was supplied to control the autoclave inside pressure to 0.40 MPaG. There was supplied a toluene solution of a mixture including 10 μmai__ of a transition metal compound (the catalyst b) and 1.00 mmol of methylaluminoxane (TMAO-341) (Al/Zr=100 by mol), and polymerization was performed at 60° C. for 60 minutes. During the polymerization, propylene was supplied to maintain the autoclave inside pressure at 0.40 MPaG. The polymerization was terminated by adding methanol to the autoclave. The rest of the procedure was the same as in Example 1E. The results are described in Table 8. The amount of the polymer obtained was 36.9 g.

TABLE 8

|  |  |  | Ex. 1F | Ex. 2F | Comp. Ex. 1F |
|---|---|---|---|---|---|
| Polymerization conditions | Catalyst | | Catalyst D | Catalyst D | Catalyst b |
| | Comonomer | | Propylene | Propylene | Propylene |
| Composition | Amount of comonomer | mol % | 28 | 27 | 28 |
| Stereoregularity | Meso diad fraction (m) | % | Fraction r was below detection limit. | Fraction r was below detection limit. | 97.5 |
| Thermal properties | Tm | °C. | Not detected | Not detected | Not detected |
| | Tc | °C. | Not detected | Not detected | Not detected |
| | Heat of fusion ΔHm (2nd) | J/g | Not detected | Not detected | Not detected |
| Molecular weight | [η] | dl/g | 1.5 | 3.2 | 1.5 |
| Vibration damping properties | Maximum value of loss tangent (tanδ) | — | 2.8 | 2.8 | 2.7 |
| Rubber elasticity | Permanent tensile elongation (150%) | — | 9.9 | 8.2 | 13.4 |
| Strain recovery | Permanent compression set (23° C.) | % | 38 | 23 | 45 |
| Gel fraction | | % | Not more than 0.5 | Not more than 0.5 | Not more than 0.5 |

The properties in Table 8 were evaluated as follows.

⟨ Loss Tangent Tan δ (Compression Molded Sheets)⟩

A 3 mm thick compression molded sheet was fabricated under the following conditions and was cut to give a 45 mm×10 mm×3 mm rectangular piece for dynamic viscoelasticity measurement. With MCR301 manufactured by ANTON Paar, the temperature dependency of dynamic viscoelasticity was measured at a frequency of 10 rad/s in the range of −70 to 180° C. The maximum value of loss tangent (tan δ) at the glass transition temperature was obtained.

Compression molding conditions: With a hydraulic hot compression molding machine manufactured by Shinto Metal Industries Corporation, the workpiece was heated at 200° C. under a pressure of 10 MPa for 5 minutes and was cooled at 30° C. under a pressure of 10 MPa for 5 minutes.

⟨ Permanent Tensile Elongation (150%)⟩

A 1 mm thick compression molded sheet was fabricated under the following conditions, and a JIS K7113 No. 2 test piece ½ was punched out from the compression molded sheet as an evaluation sample. The test piece was stretched by 150% at a tension rate of 30 mm/min, and the distance between the chucks was measured. The test piece was held at 23° C. for 10 minutes. After 10 minutes after the stress was released, the distance between the chucks on the test piece was measured. The difference between the distances was obtained as the permanent tensile elongation.

Compression molding conditions: With a hydraulic hot compression molding machine manufactured by Shinto Metal Industries Corporation, the workpiece was heated at 200° C. under a pressure of 10 MPa for 5 minutes and was cooled at 30° C. under a pressure of 10 MPa for 5 minutes.

⟨ Permanent Compression Set (Compression Molded Sheets)⟩

A 3 mm thick compression molded sheet was fabricated under the conditions described below. Four such sheets were stacked on top of one another, and the resultant 12 mm thick sample was compressed by 25% and was heat treated at 23° C. for 22 hours in accordance with JIS K6262. After the sample was allowed to stand at 23° C. for 2 hours, the thickness was measured. The amount of strain calculated from the difference in thickness between before and after the test was taken as the permanent compression set.

Compression molding conditions: With a hydraulic hot compression molding machine manufactured by Shinto Metal Industries Corporation, the workpiece was heated at 200° C. under a pressure of 10 MPa for 5 minutes and was cooled at 30° C. under a pressure of 10 MPa for 5 minutes.

⟨ Evaluations⟩

The polymers obtained in Examples 1F and 2F had a meso diad fraction (m) of not less than 98.5%, and did not show a melting point Tm. As described in Table 8, these polymers exhibited a small permanent compression set in spite of the fact that the loss tangent was approximately the same as the polymer in Comparative Example 1F. That is, it has been demonstrated that the novel amorphous 4-methyl-1-pentene polymers of the invention have an excellent balance of viscoelastic properties.

4-Methyl-1-pentene Polymerization using Supported Catalysts

Example 1G (1) Preparation of Supported Catalyst Using Catalyst D 8.5 kg of a silica (SUNSPHERE H-31 manufactured by AGC Si-Tech Co., Ltd.) that had been dried at 200° C. for 3 hours was suspended into 33 L of toluene. Thereafter, 124.5 L of a toluene solution of methylaluminoxane (Al=1.42 mol/L) was added dropwise over a period of 30 minutes. The temperature was then increased to 115° C. in 1.5 hours, and reaction was performed at the temperature for 4 hours. Thereafter, the temperature was decreased to 60° C., and the supernatant liquid was removed by decantation. The resultant solid catalyst component was washed with toluene three times, and was resuspended into toluene (0.16 g/mL, 1.5 mmol-Al/mL). Thus, a silica-supported methylaluminoxane (MAO/Si=1.25 by mol) was obtained.

In a 100 mL three-necked flask that had been thoroughly purged with nitrogen, 4.5 mmol in terms of aluminum of the silica-supported methylaluminoxane was added and was suspended by the addition of 39 mL of toluene. To the suspension, 15.5 mg (18 μmol) of the transition metal compound (the catalyst D) synthesized in [Synthetic Example 4] was added in the form of a toluene solution (2.3 mmol/L). Stirring was stopped after 1 hour, and the suspension was washed by decantation three times, and thereby the solvent was replaced by decane. Next, 2.0 mmol of diisobutylaluminum hydride (as a 1.0 mmol/mL decane solution) was added, and further 3-methyl-1-pentene (2.2 mL) was added. Stirring was stopped after 1 hour, and the suspension was washed by decantation three times. Thus, a catalyst suspension (a 5 g/L decane slurry, 0.18 mmol-Zr/L) was obtained.

(2) 4-Methyl-1-pentene Polymerization

In a stream of nitrogen, 300 mL of 4-methyl-1-pentene was added to a 500 mL-volume glass polymerization reactor at room temperature. The temperature was increased. A mixed gas of 0.5 L/h hydrogen and 15 L/h nitrogen was passed. Further, 0.1 mmol of triisobutylaluminum (as a 1.0 mmol/mL decane solution) and 0.001 mmol in terms of zirconium atoms of the catalyst suspension prepared above were added. Stirring was performed while maintaining the inside of the polymerization reactor at 40° C. After the polymerization was performed for 1 hour, isobutyl alcohol was added into the polymerization reactor to terminate the polymerization. Immediately thereafter, the polymerization liquid was filtered and thereby a solid polymer was obtained. Drying under reduced pressure at 80° C. for 8 hours resulted in 11.0 g of the polymer. The polymer had an intrinsic viscosity [η] of 5.58 dl/g and Tm of 242.6° C. The soluble proportion (SP) was 0.38 wt %.

Comparative Example 1G

The polymerization of 4-methyl-1-pentene was carried out in the same manner as in Example 1G, except that the catalyst in the catalyst suspension was prepared from 12.5 mg (17 μmol) of the transition metal compound (the catalyst d) of Comparative Synthetic Example 4 and 4.6 mmol in terms of aluminum of the silica-supported methylaluminoxane, and that the polymerization involved the catalyst in an amount of 0.4 mmol in terms of zirconium atoms. The amount of the polymer obtained was 5.8 g. The polymer had an intrinsic viscosity [η] of 1.50 dl/g and Tm of 232.8° C. The soluble proportion (SP) was 17 wt %.

INDUSTRIAL APPLICABILITY

The olefin polymer production processes of the invention can produce useful olefin polymers having high heat resistance and high molecular weight in an economically efficient manner. Thus, the production processes of the invention are highly valuable in industry. Further, the novel 1-butene polymers and 4-methyl-1-pentene polymers of the invention have various excellent properties.

The invention claimed is:

1. A 4-methyl-1-pentene polymer fulfilling the following requirements (a) to (c):
   (a) the amount of constituent units derived from 4-methyl-1-pentene is 100 to 80 mol %, and the amount of constituent units derived from at least one selected from olefins having 2 to 30 carbon atoms (except 4-methyl-1-pentene) is 0 to 20 mol %;
   (b) the meso diad fraction (m) as measured by $^{13}$C-NMR is 98.5% to 100%; and
   (c) the heat of fusion ΔHm (unit: J/g) and the melting point Tm (unit: ° C.) as measured by Differential Scanning calorimetry (DSC) fulfill the following relation (1):

$$\Delta Hm \geq 0.5 \times Tm - 76. \qquad \text{Relation (1):}$$

* * * * *